May 23, 1944.    L. M. POTTS    2,349,304
SELECTIVE SIGNALING SYSTEM AND APPARATUS
Original Filed March 25, 1931    20 Sheets-Sheet 1

INVENTOR
LOUIS M. POTTS
BY
ATTORNEY

May 23, 1944.  L. M. POTTS  2,349,304
SELECTIVE SIGNALING SYSTEM AND APPARATUS
Original Filed March 25, 1931   20 Sheets-Sheet 2

INVENTOR
LOUIS M. POTTS
BY
ATTORNEY

May 23, 1944. L. M. POTTS 2,349,304
SELECTIVE SIGNALING SYSTEM AND APPARATUS
Original Filed March 25, 1931   20 Sheets-Sheet 3
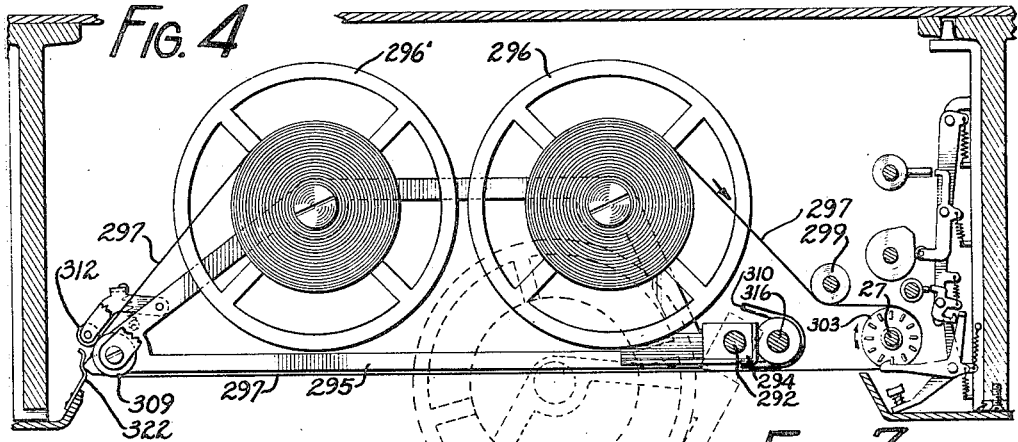
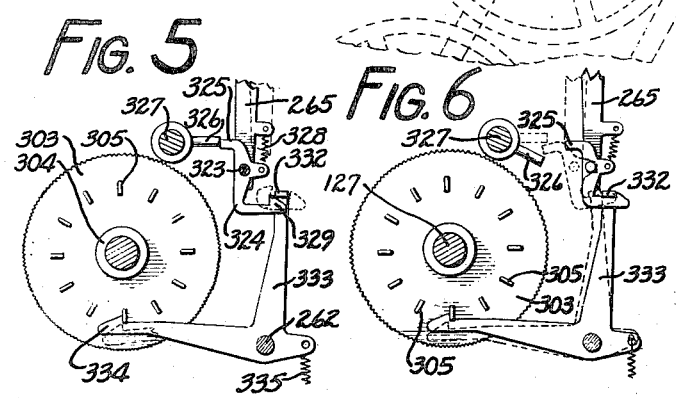
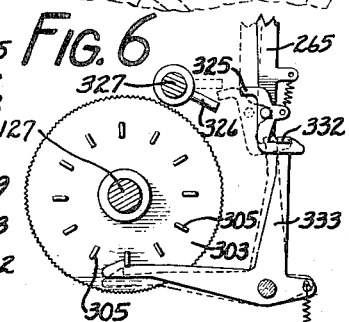
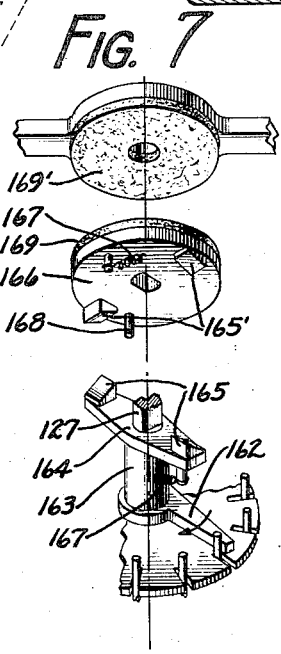
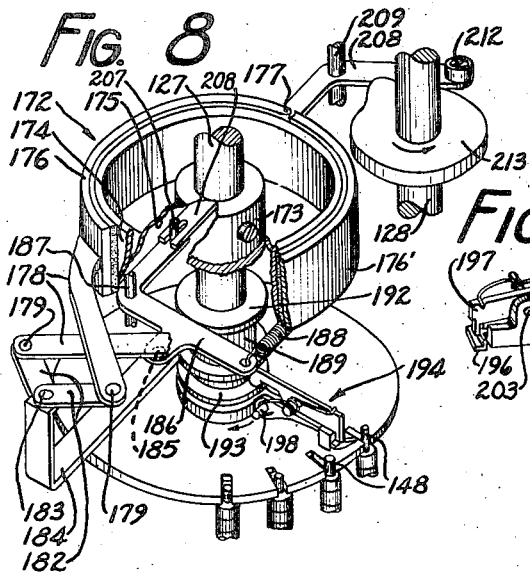
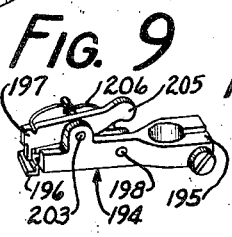
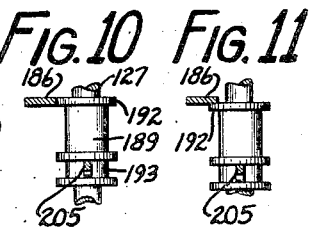
INVENTOR
LOUIS M. POTTS
BY
ATTORNEY May 23, 1944. L. M. POTTS 2,349,304
SELECTIVE SIGNALING SYSTEM AND APPARATUS
Original Filed March 25, 1931 20 Sheets-Sheet 4
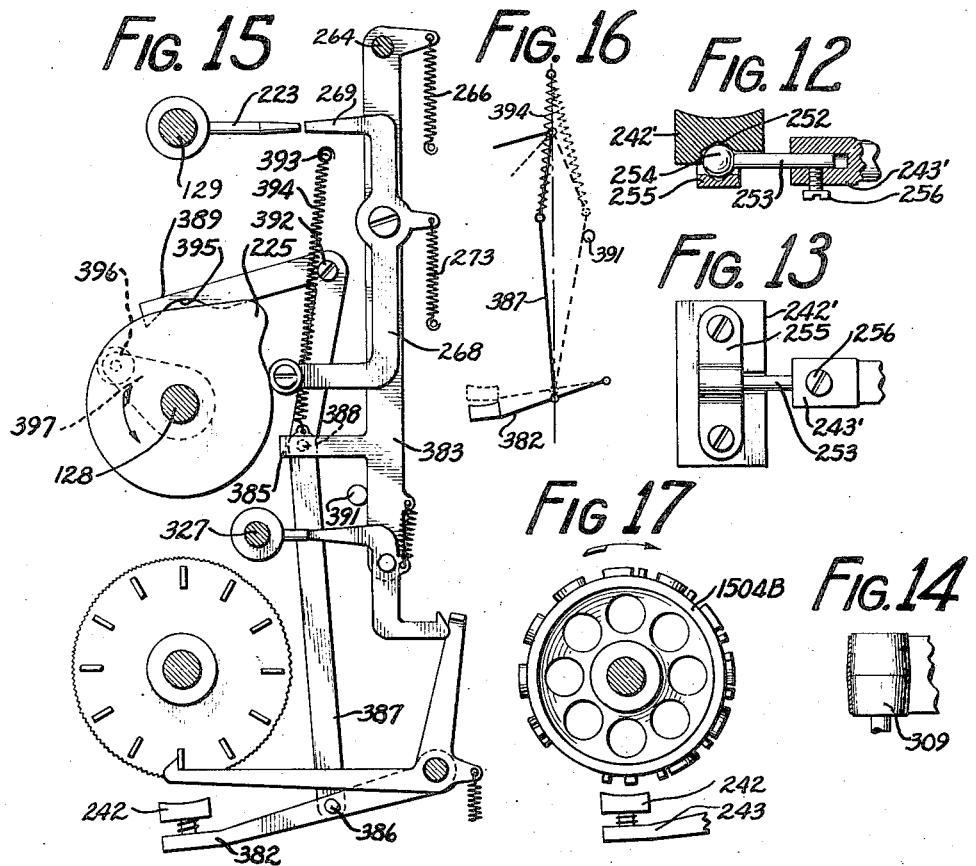
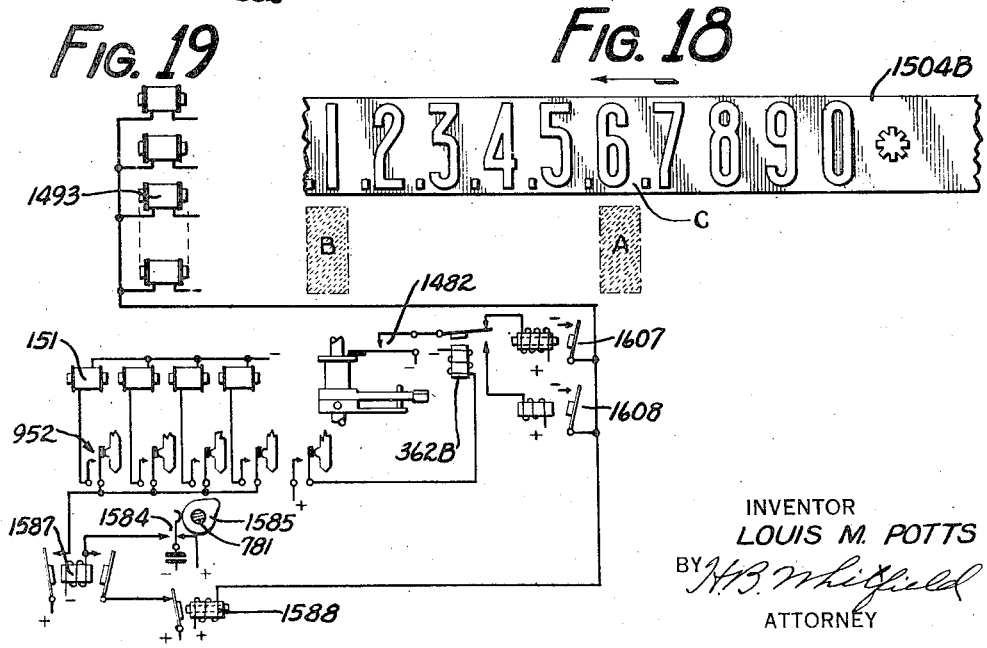
INVENTOR
LOUIS M. POTTS
ATTORNEY

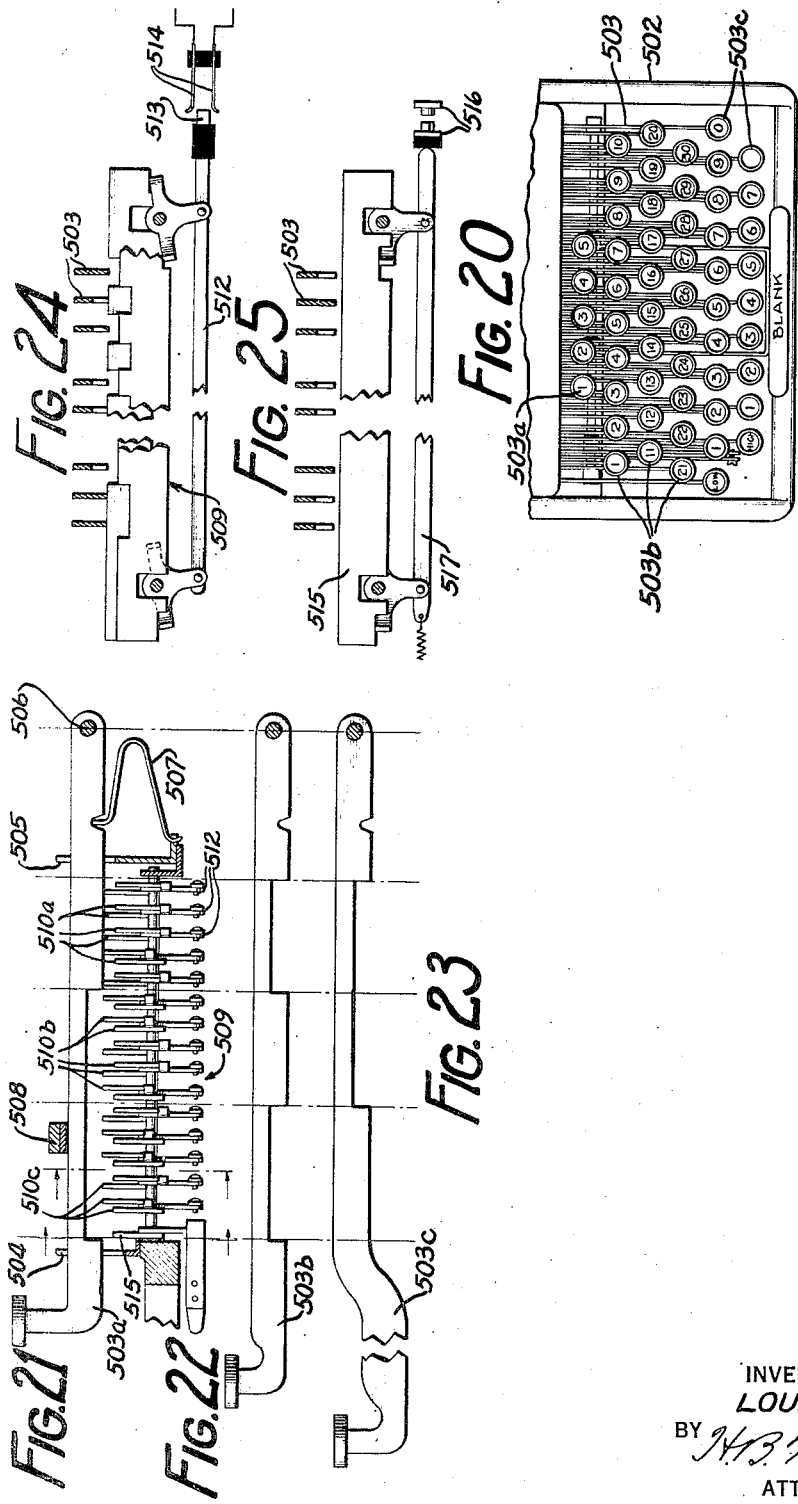

May 23, 1944.	L. M. POTTS	2,349,304
SELECTIVE SIGNALING SYSTEM AND APPARATUS
Original Filed March 25, 1931	20 Sheets-Sheet 6
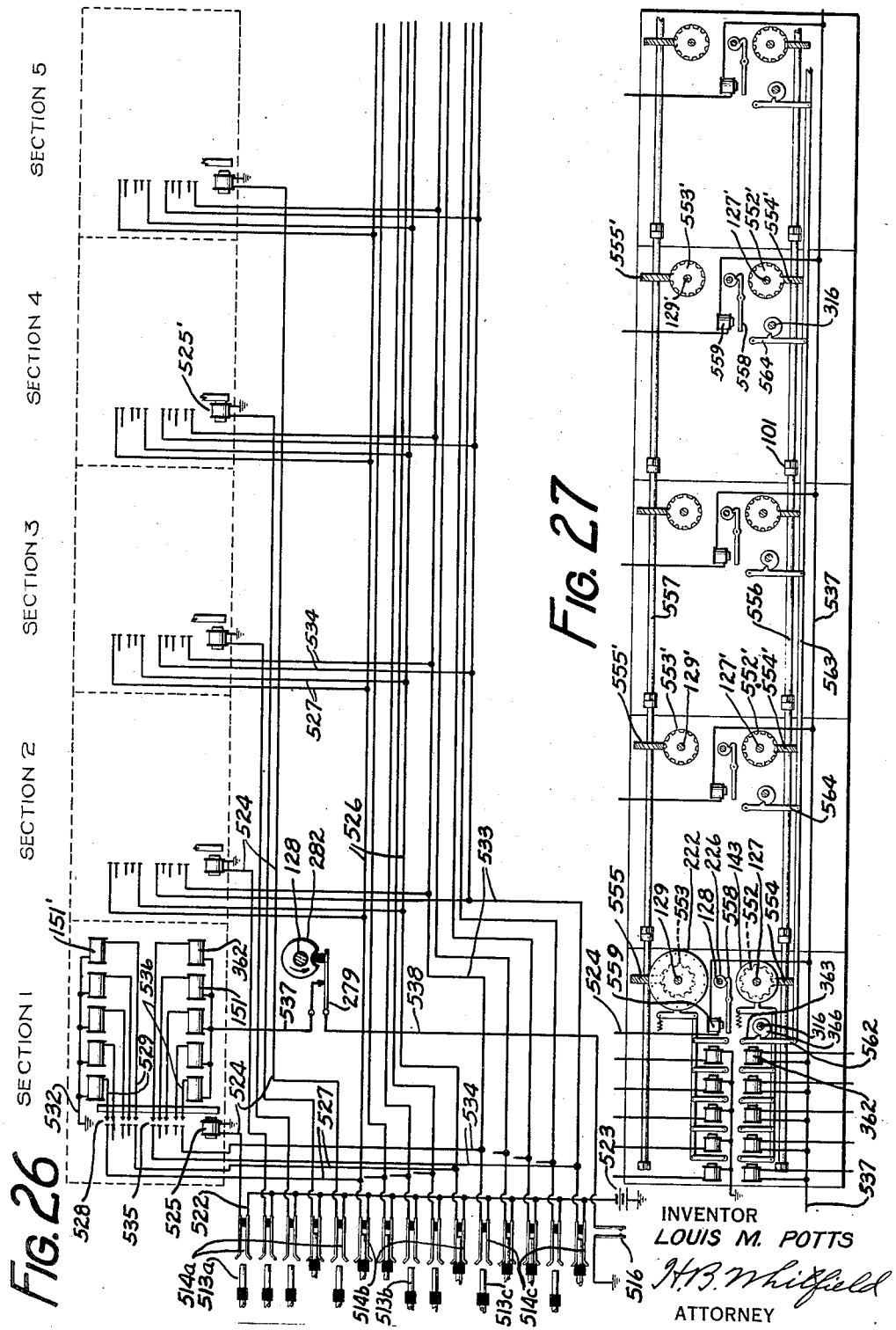
INVENTOR
LOUIS M. POTTS
ATTORNEY May 23, 1944.  L. M. POTTS  2,349,304
SELECTIVE SIGNALING SYSTEM AND APPARATUS
Original Filed March 25, 1931  20 Sheets-Sheet 7
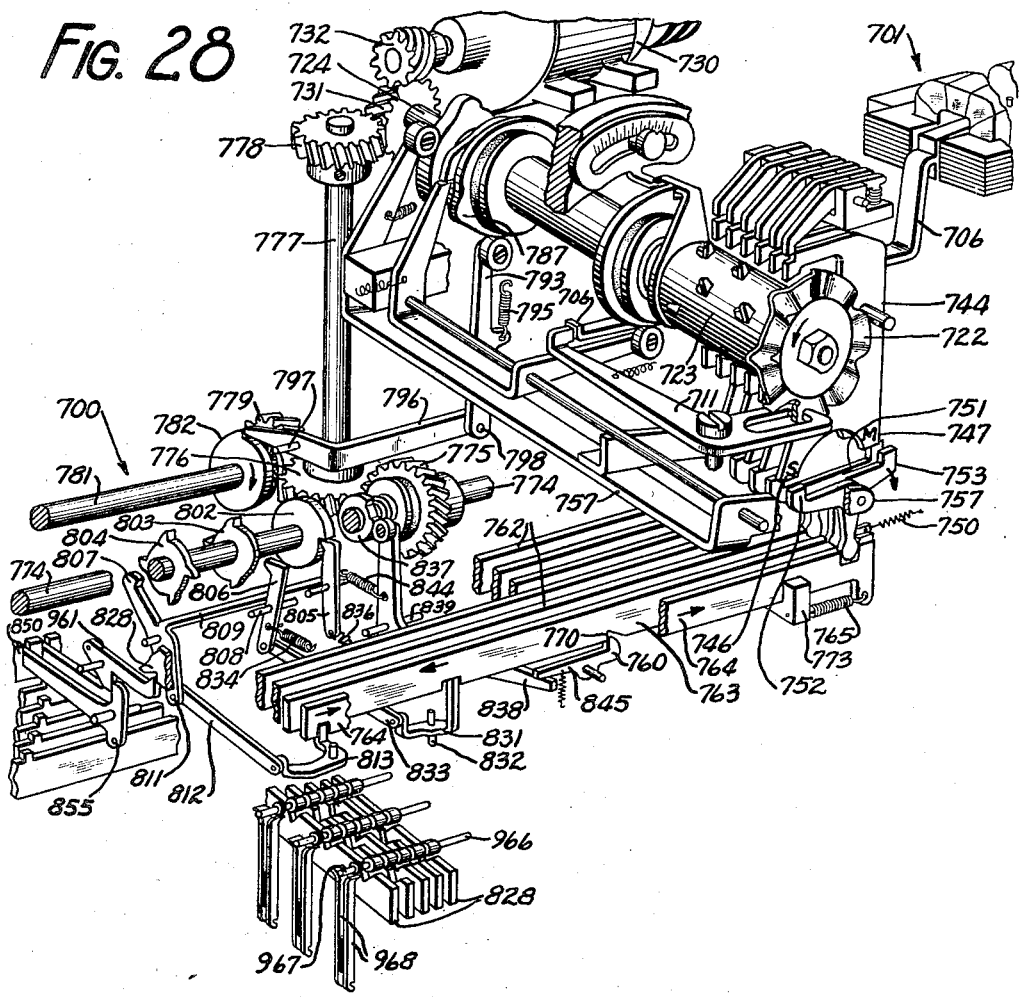
Fig. 28
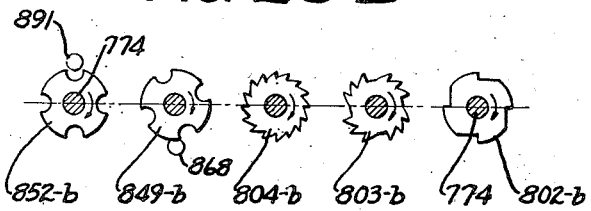
Fig. 28-B
INVENTOR
LOUIS M. POTTS
BY
ATTORNEY May 23, 1944.  L. M. POTTS  2,349,304
SELECTIVE SIGNALING SYSTEM AND APPARATUS
Original Filed March 25, 1931   20 Sheets-Sheet 8
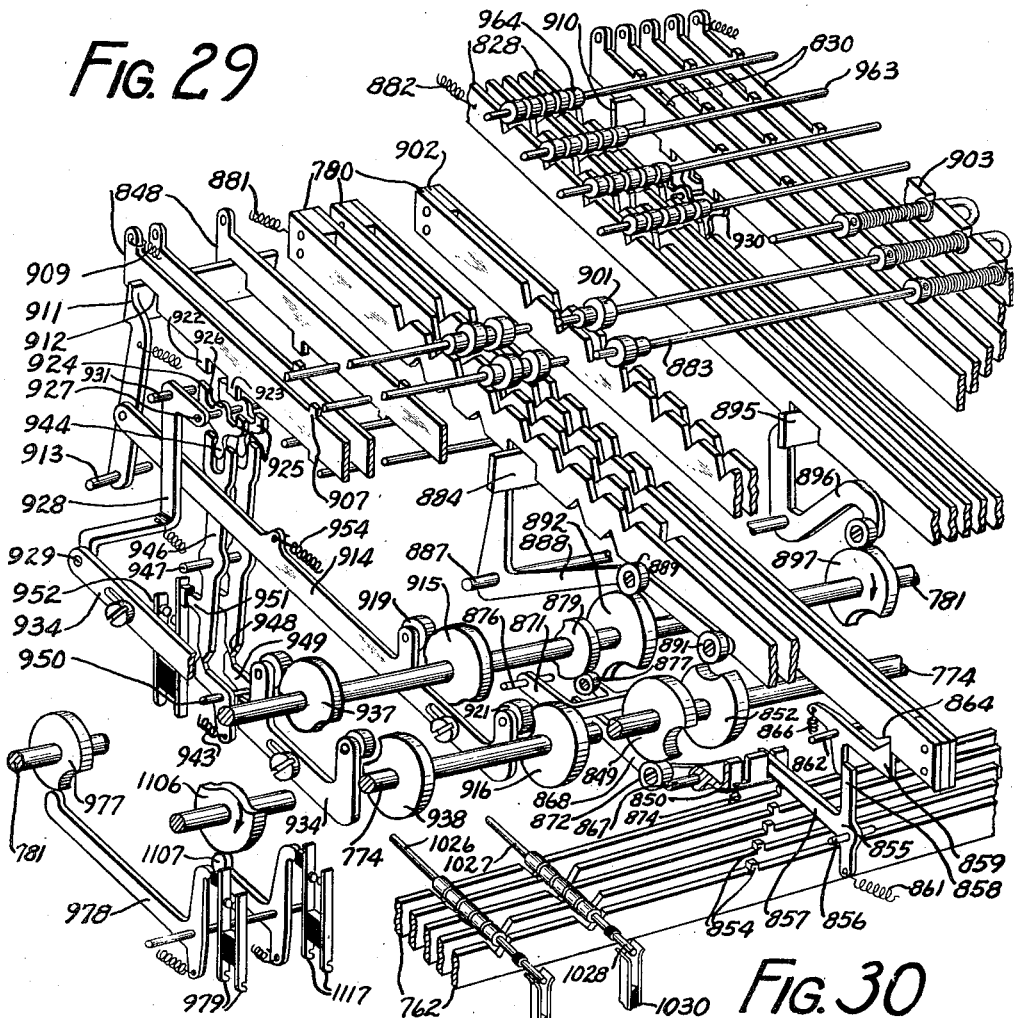
Fig. 29
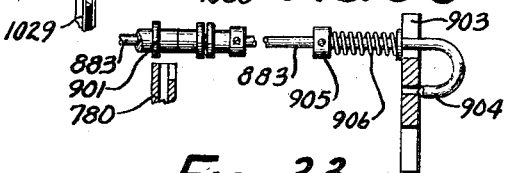
Fig. 30
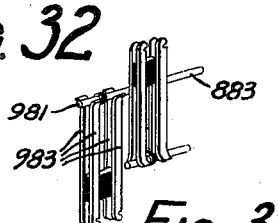
Fig. 32
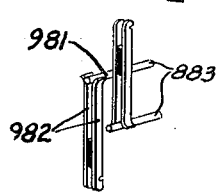
Fig. 31
Fig. 33
| AT | P.M | | SHARES |
|---|---|---|---|
| ( | 212 | 20000 | ) |
INVENTOR
LOUIS M. POTTS
BY
ATTORNEY May 23, 1944.  L. M. POTTS  2,349,304
SELECTIVE SIGNALING SYSTEM AND APPARATUS
Original Filed March 25, 1931  20 Sheets-Sheet 9
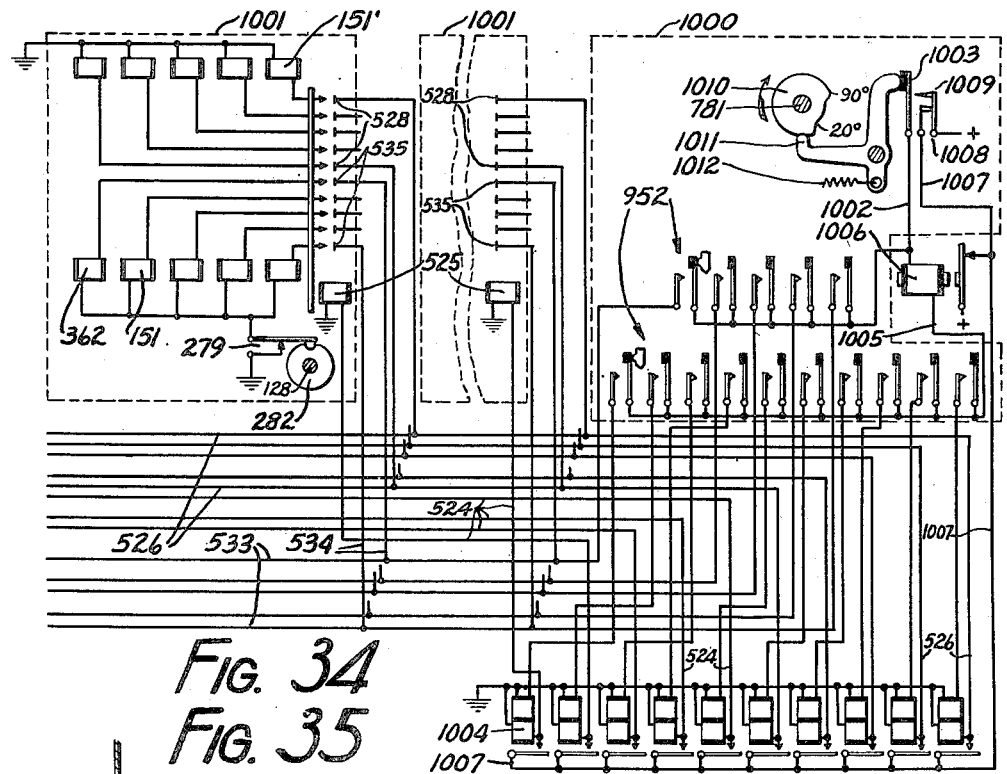
FIG. 34
FIG. 35
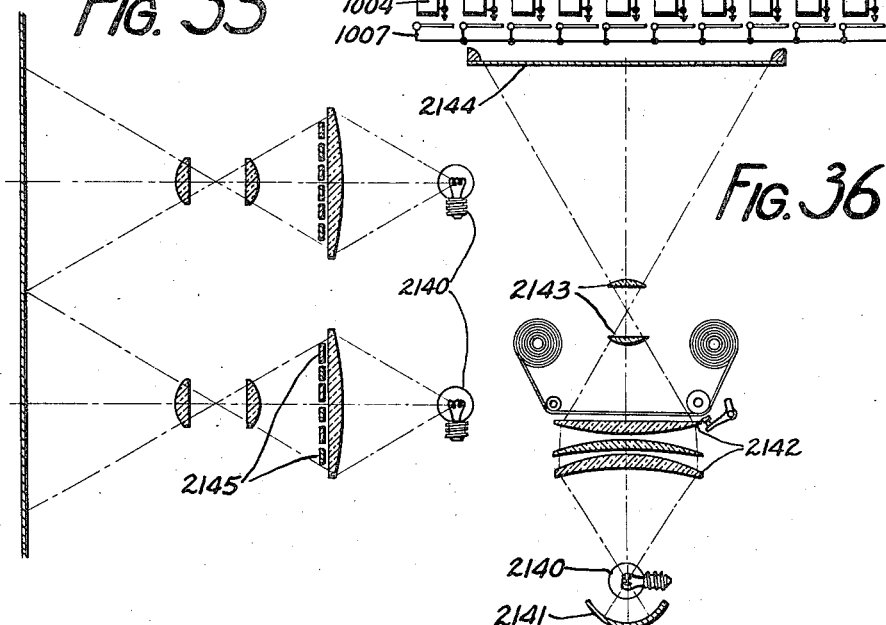
FIG. 36
INVENTOR
LOUIS M. POTTS
BY
ATTORNEY

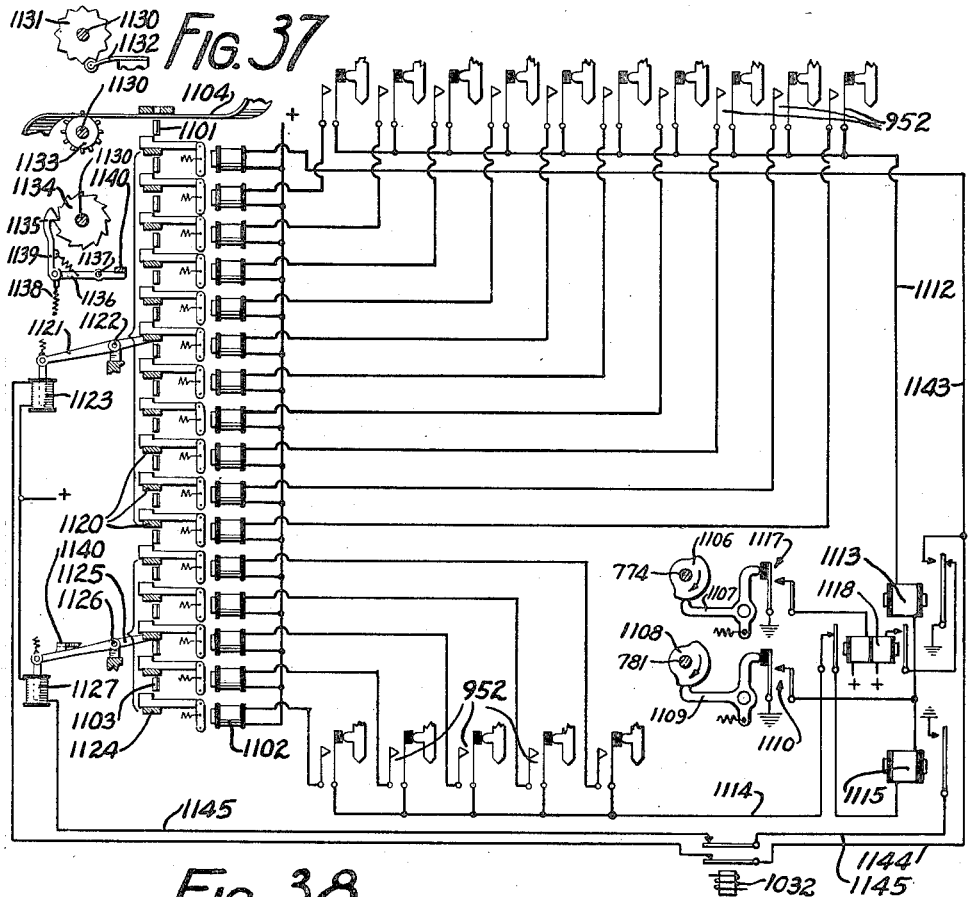
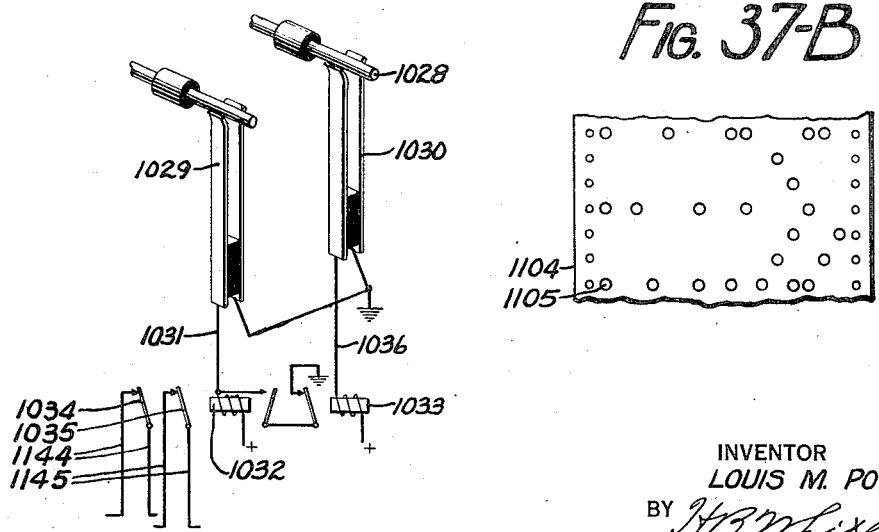

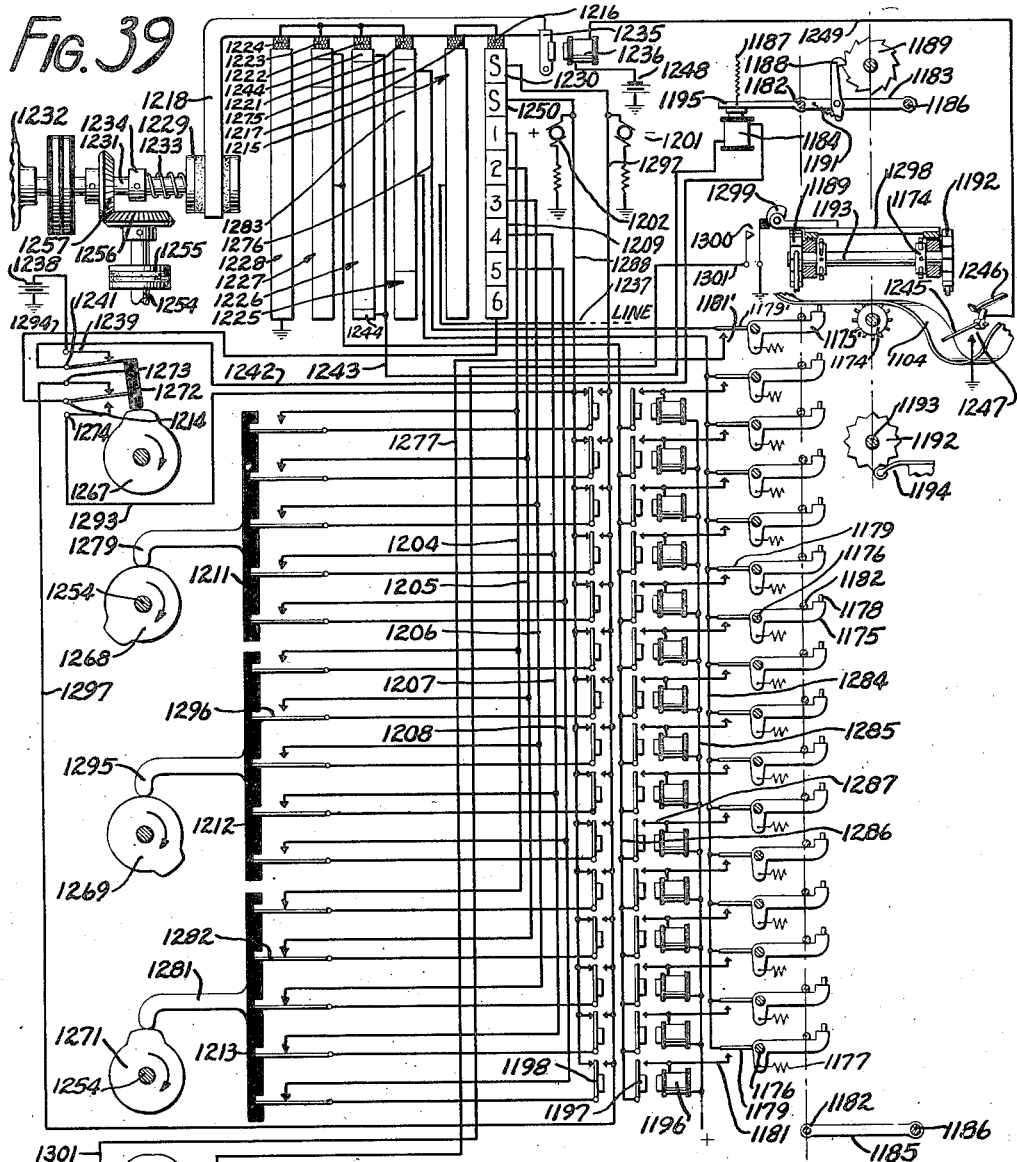

May 23, 1944.  L. M. POTTS  2,349,304
SELECTIVE SIGNALING SYSTEM AND APPARATUS
Original Filed March 25, 1931   20 Sheets-Sheet 12
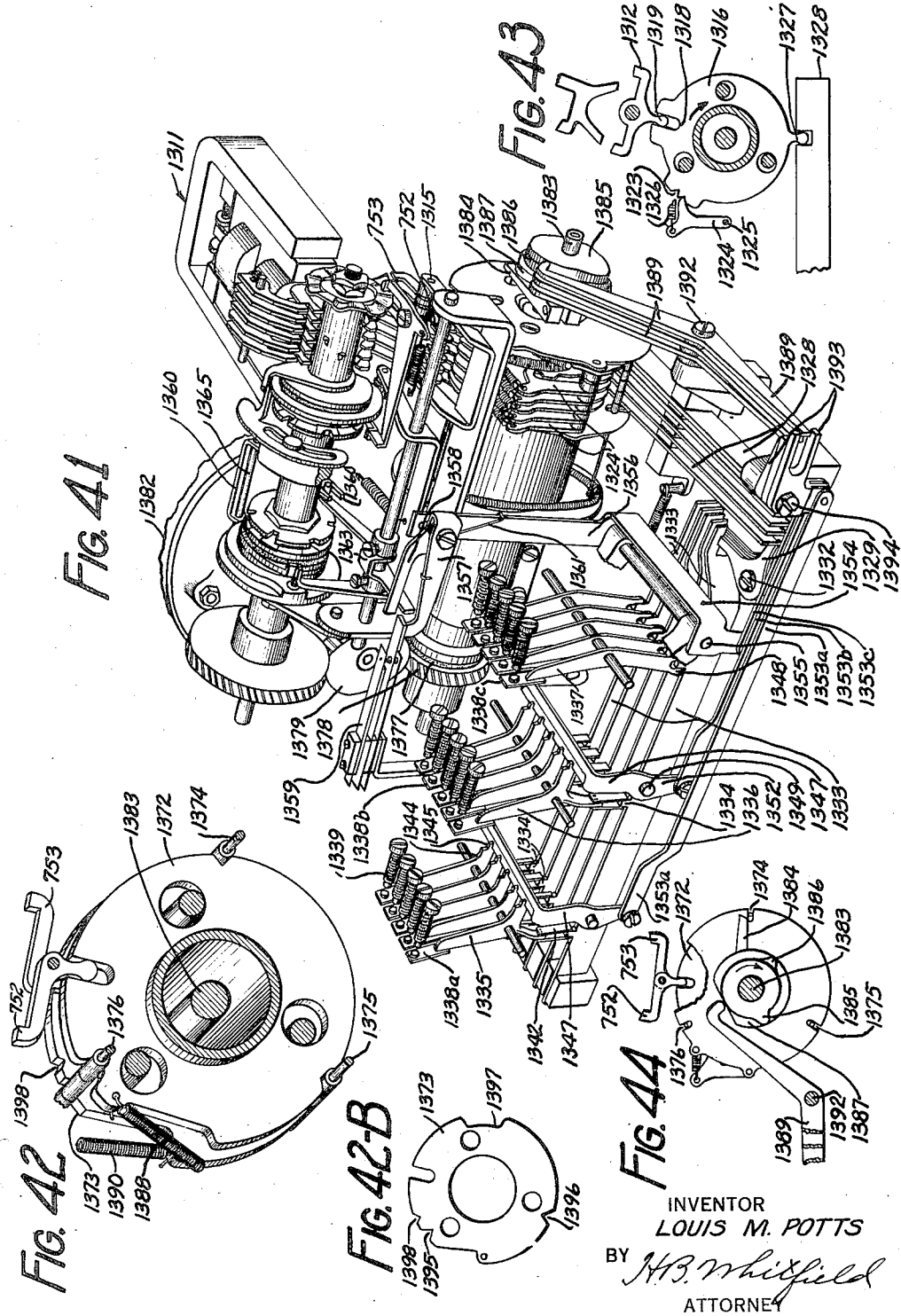
INVENTOR
LOUIS M. POTTS
BY
ATTORNEY May 23, 1944.　　　　L. M. POTTS　　　　2,349,304
SELECTIVE SIGNALING SYSTEM AND APPARATUS
Original Filed March 25, 1931　　20 Sheets-Sheet 13
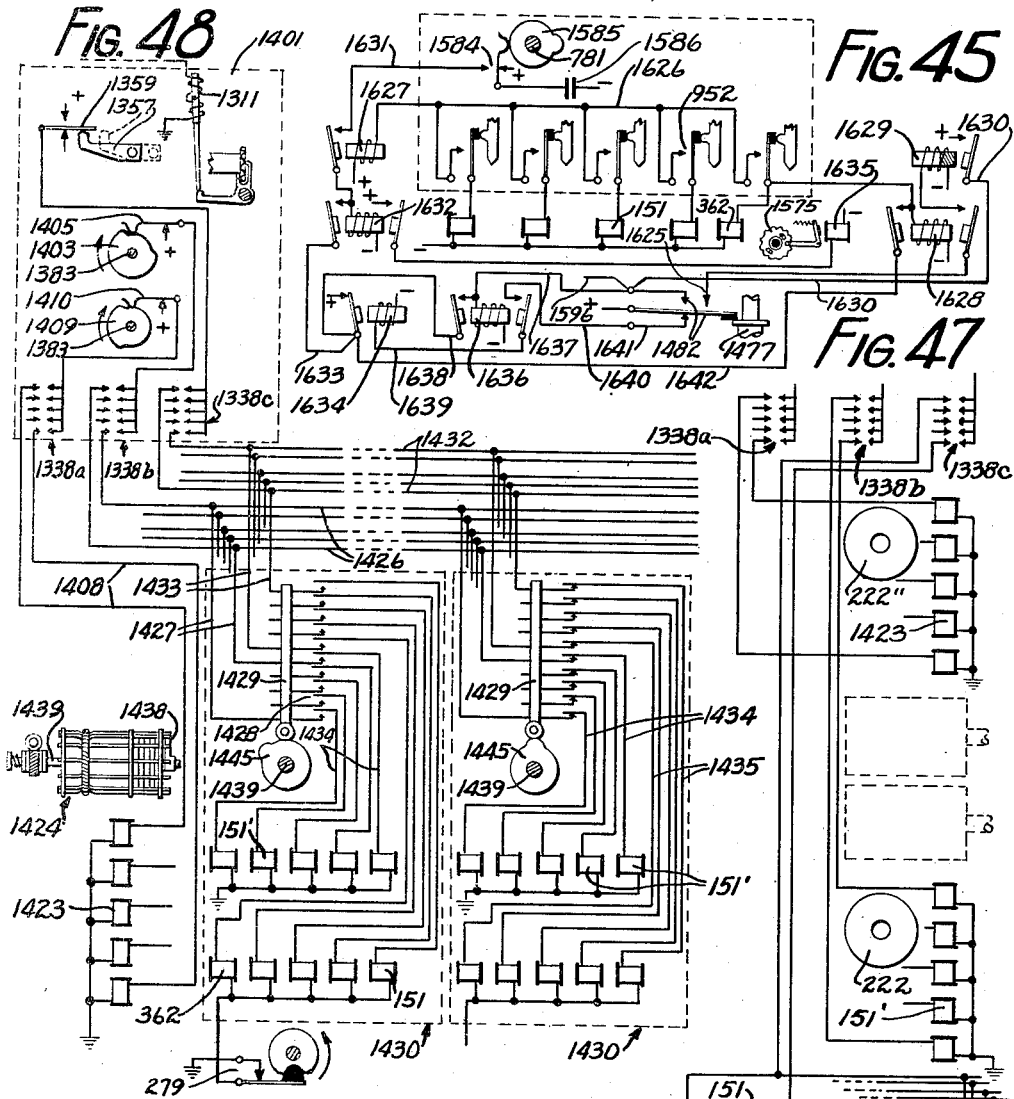
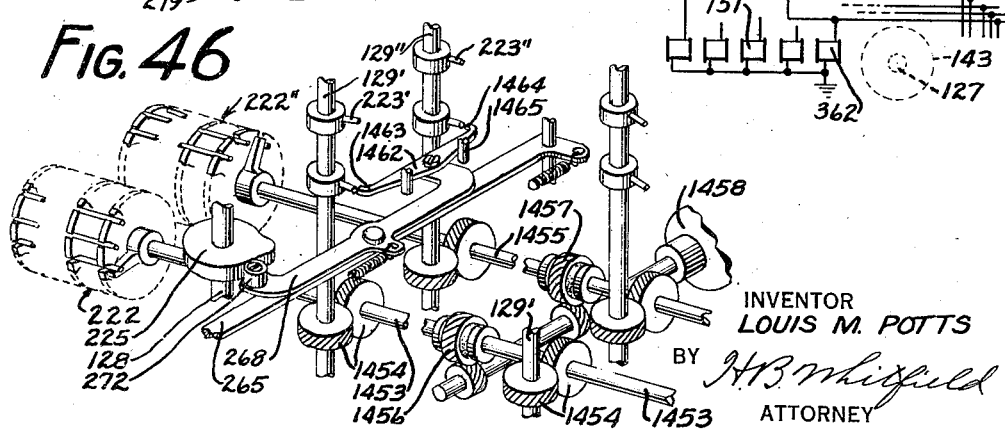
INVENTOR
LOUIS M. POTTS
BY
ATTORNEY May 23, 1944.    L. M. POTTS    2,349,304
SELECTIVE SIGNALING SYSTEM AND APPARATUS
Original Filed March 25, 1931    20 Sheets-Sheet 14
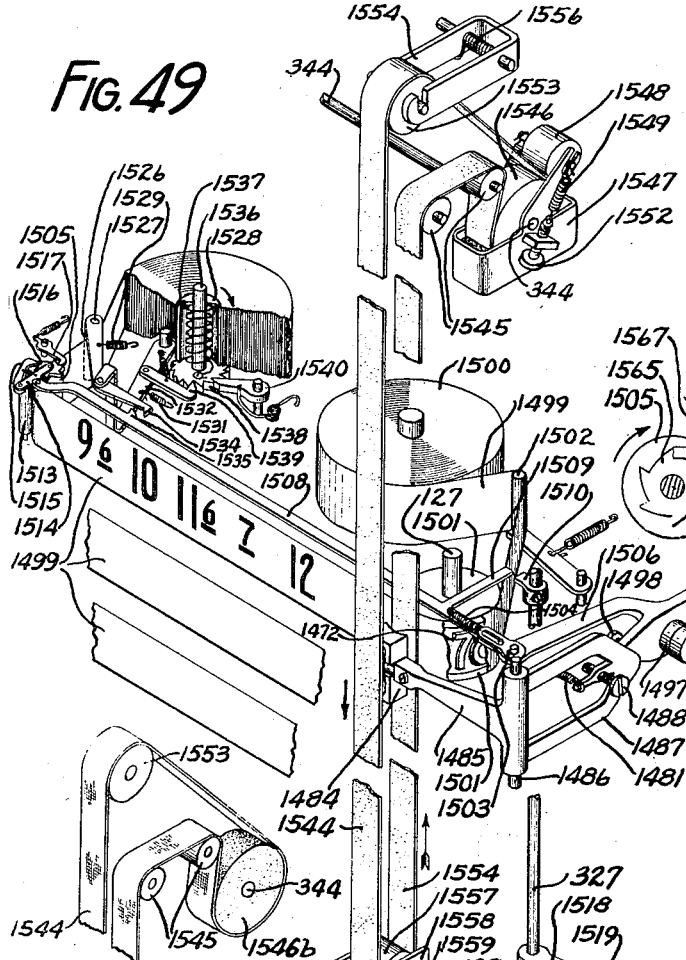
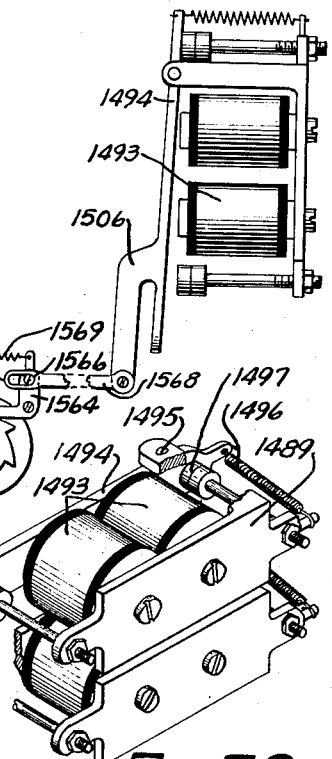
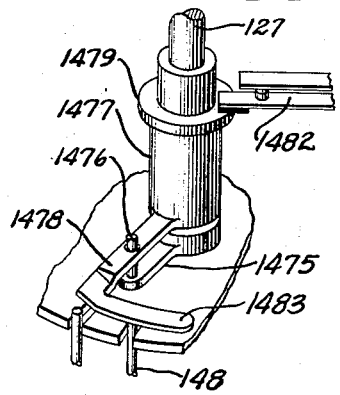
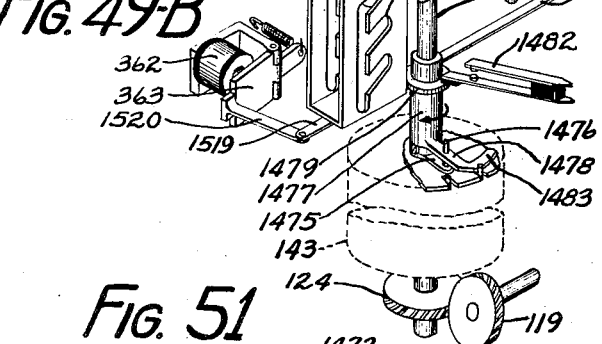
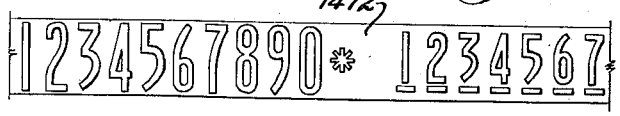
INVENTOR
LOUIS M. POTTS
BY H.B. Whitfield
ATTORNEY May 23, 1944.  L. M. POTTS  2,349,304
SELECTIVE SIGNALING SYSTEM AND APPARATUS
Original Filed March 25, 1931   20 Sheets-Sheet 15
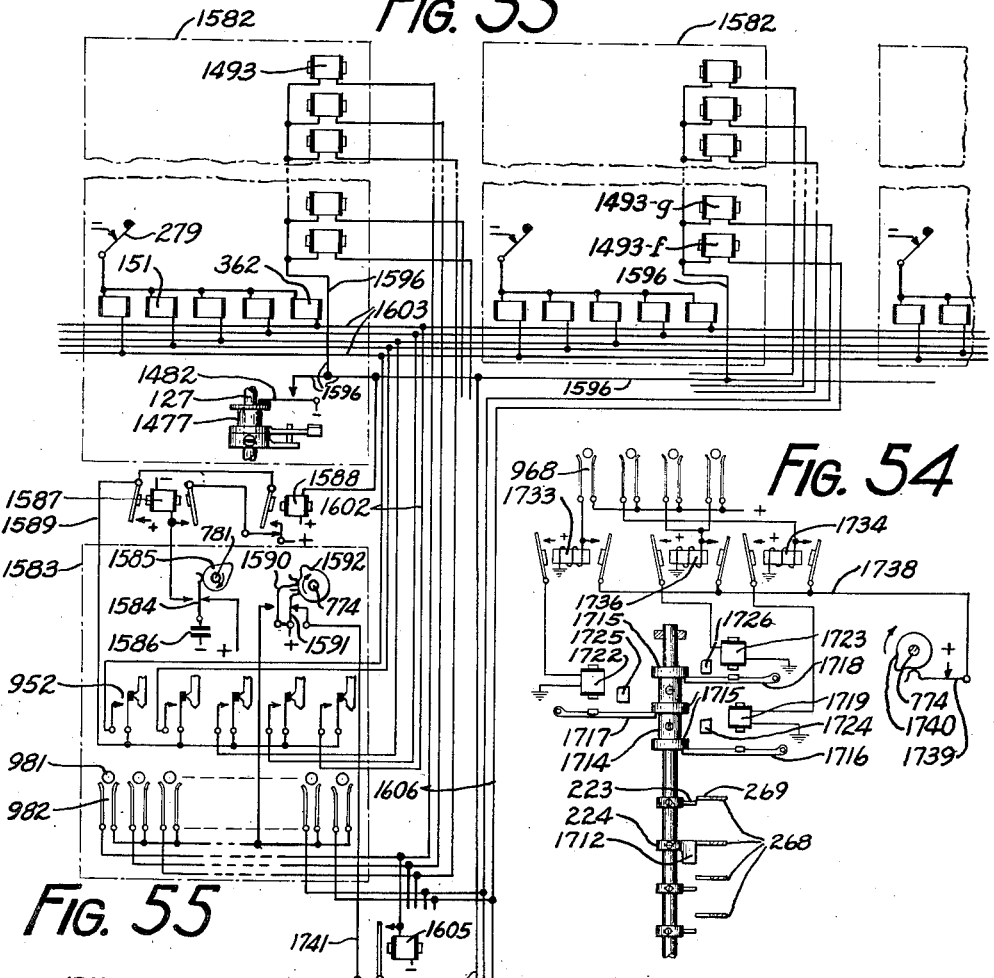
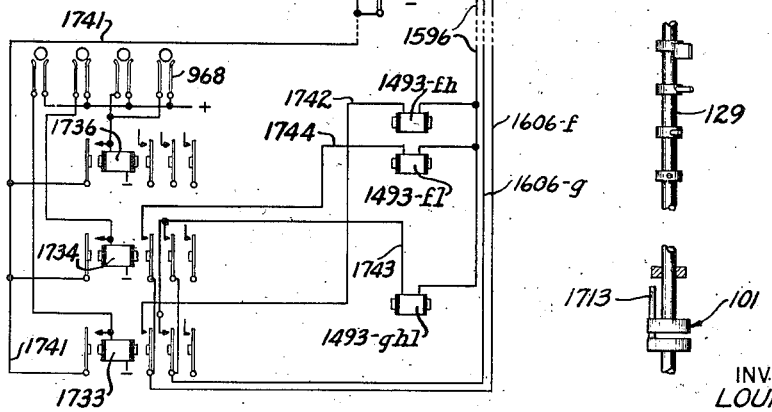
INVENTOR
LOUIS M. POTTS
BY
ATTORNEY May 23, 1944.　　　　L. M. POTTS　　　　2,349,304
SELECTIVE SIGNALING SYSTEM AND APPARATUS
Original Filed March 25, 1931　　20 Sheets-Sheet 16

INVENTOR
LOUIS M. POTTS
BY J. H. B. Whitfield
ATTORNEY

May 23, 1944.        L. M. POTTS        2,349,304
SELECTIVE SIGNALING SYSTEM AND APPARATUS
Original Filed March 25, 1931    20 Sheets-Sheet 17
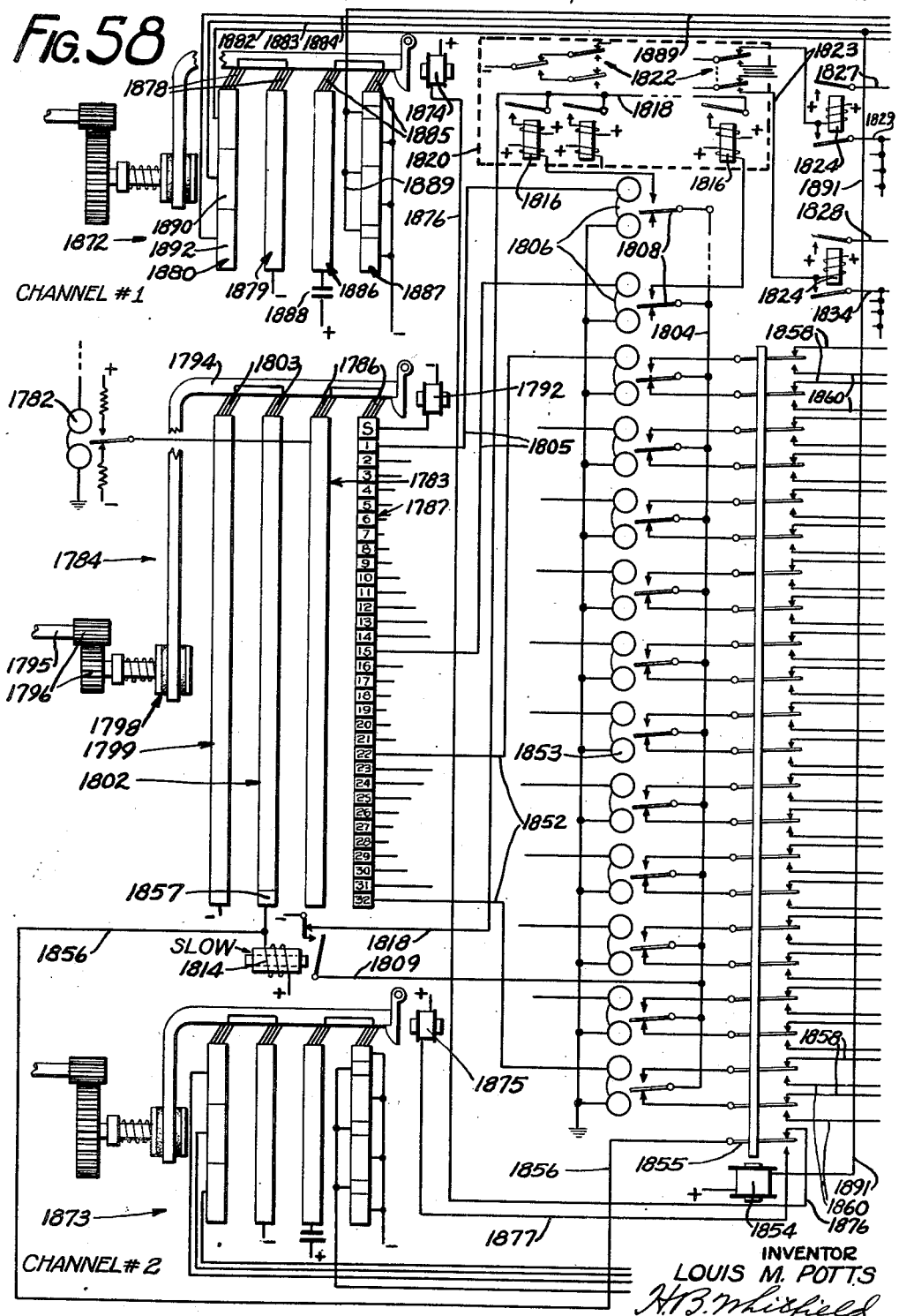
INVENTOR
LOUIS M. POTTS
ATTORNEY May 23, 1944. L. M. POTTS 2,349,304
SELECTIVE SIGNALING SYSTEM AND APPARATUS
Original Filed March 25, 1931 20 Sheets-Sheet 18

INVENTOR
LOUIS M. POTTS
ATTORNEY

May 23, 1944.    L. M. POTTS    2,349,304
SELECTIVE SIGNALING SYSTEM AND APPARATUS
Original Filed March 25, 1931    20 Sheets-Sheet 19
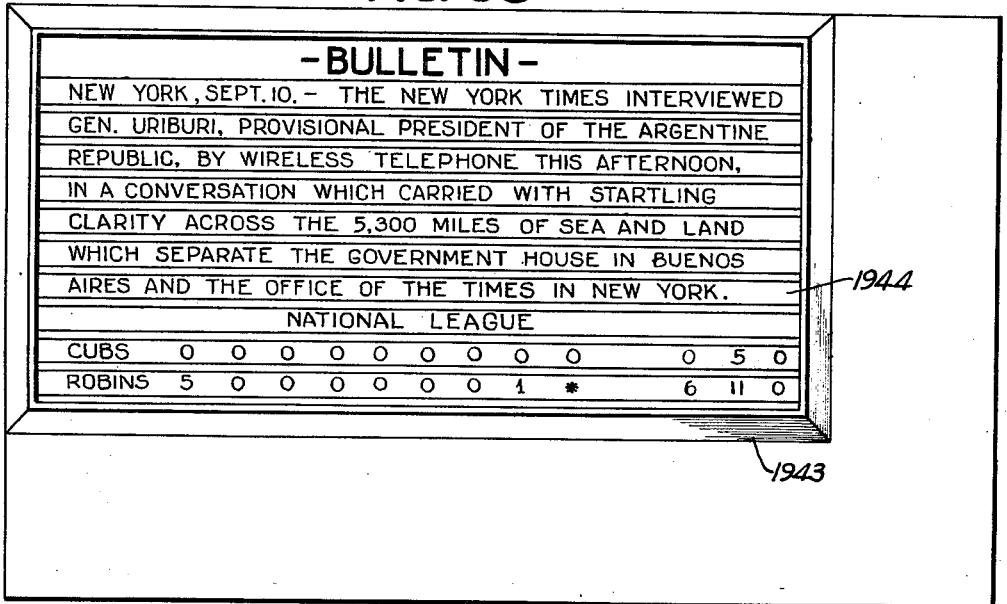
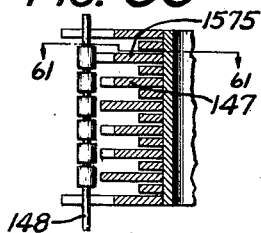
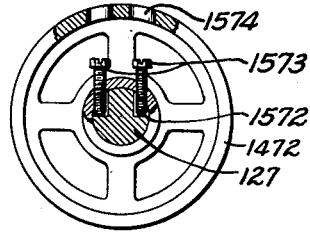
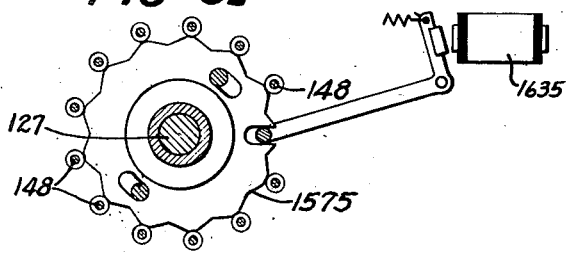
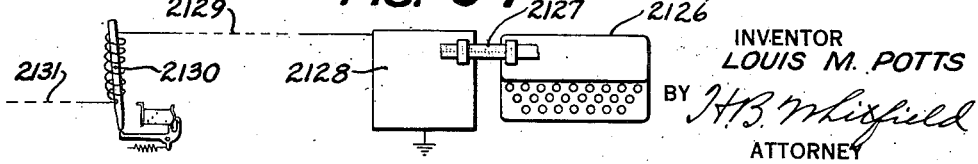
INVENTOR
LOUIS M. POTTS
BY
ATTORNEY

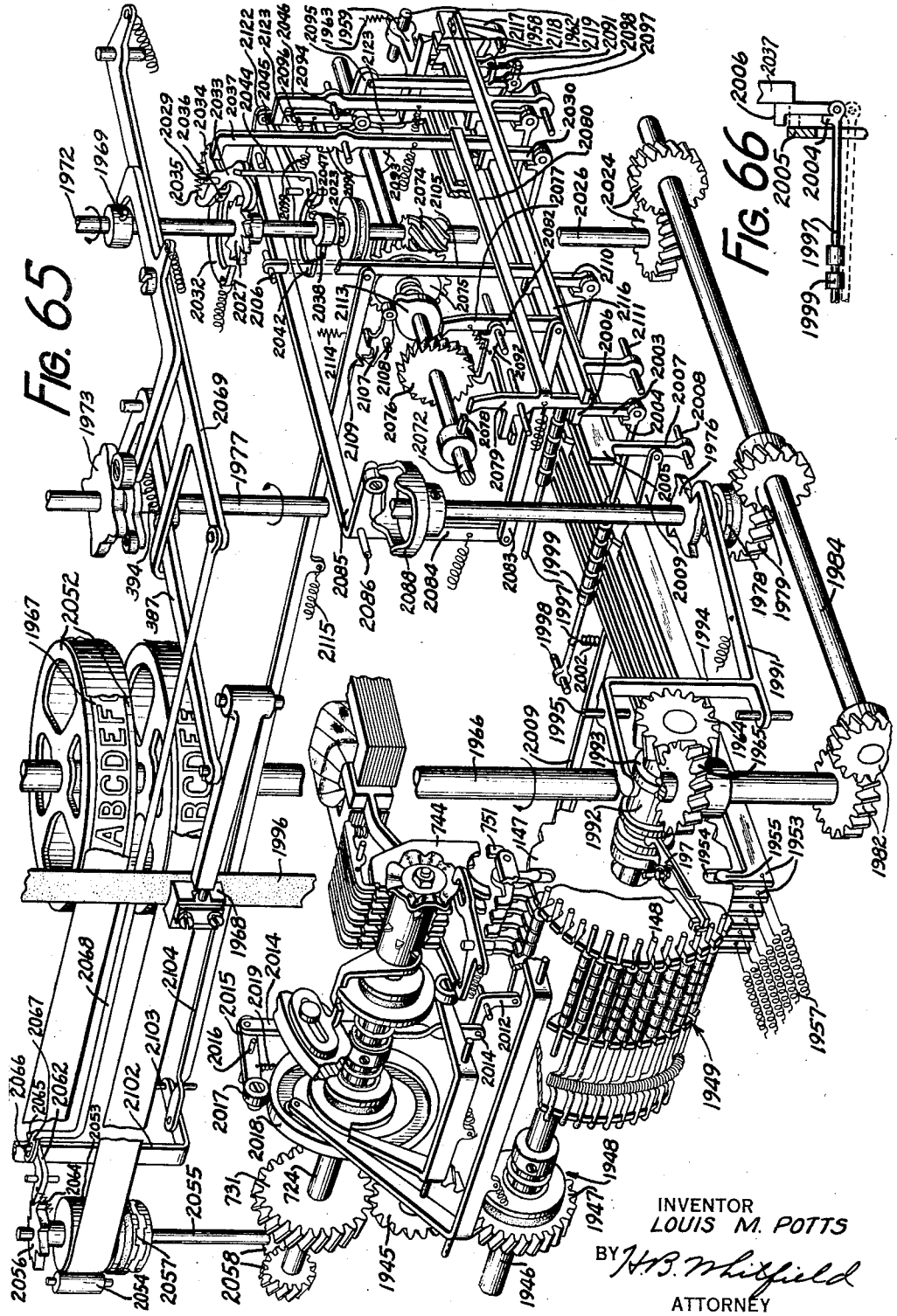

Patented May 23, 1944

2,349,304

UNITED STATES PATENT OFFICE 2,349,304

SELECTIVE SIGNALING SYSTEM AND APPARATUS

Louis M. Potts, Evanston, Ill., assignor to Teletype Corporation, Chicago, Ill., a corporation of Delaware Application March 25, 1931, Serial No. 525,189
Renewed May 3, 1939

74 Claims. (Cl. 178—23)

This invention pertains to selective-signaling and remote-control systems and apparatus and may be adapted to the remote control of telegraphic printing devices. The description herein given will refer mainly to its use as a market-bulletin board or quotation-posting board which uses a printed record.

This invention relates to selective signaling and remote control systems and apparatus, and is particularly adapted to the selective control of remotely disposed bulletin boards or registers which are controlled from a central dispatching station, the boards or registers being of a type wherein the characters are printed.

A large network of circuits is at present in use for the distribution of market quotations from one point of origin to destination points in all parts of the country. These circuits are given commercial precedence over all others and are maintained at a high standard of efficiency. Market quotations which are distributed over this network of circuits are recorded by telegraphic printers or "tickers" in brokers' offices, the record being in type-printed-tape form. The quotations then are posted upon quotation boards, this posting being done manually by "marker boys" who read the ticker tape for quotations to be posted.

This invention provides an automatic quotation board, or more specifically a remotely controlled, telegraphic quotation board, which will be operated by electrical signals and which will avoid both the delay and the errors of manual posting.

A broad object of the present invention is to provide apparatus which will permit the use of a single network of circuits operating according to modern machine telegraph methods for the control of quotation or bulletin boards as well as tickers, so that the minimum number of elaborately serviced and expensive circuits will be required. In this way a minimum of manual transmission will be required and the possibility of human errors will be a minimum.

Further objects of this invention are to provide a printing bulletin board having large or small characters according to its use; to provide systems of operating such boards so that they shall be adapted to be used effectively by brokers requiring only a limited amount of information, such as market prices, or by other customers requiring a greater amount; to provide a system suitable for use in small areas having a concentration of customers as well as for the isolated customer; and to provide such boards suitable for displaying news as well as price indications.

A further object is to provide a means for editing a ticker transmission circuit so that it will be suitable to operate tickers and quotation boards, and also news bulletin boards by transmitting on the ticker circuit "deleting" and "enabling" signals before and after portions (such as news items) not intended to operate the price quotation board, so that such signals will in no case cause the posting of erroneous prices, but will operate the news bulletin board only.

A further object is to provide a telegraphic remote control system in which start-stop code signals are used, and a condition added to the permutation code determines which of two kinds of devices each signal shall operate, for example, stock selector or price selector. Another object is to use this added condition to control a sequence shaft which enables various devices to be controlled successively by the same selecting devices.

A further object is to provide a system for high speed over long lines and at lower speed over short service lines to a customer's office, by providing parallel service wires to the customer's office to carry signals corresponding to those of the long line.

This invention provides a bulletin board in which the record is made on a plurality of strips of record receiving material or tapes by a plurality of similar typewheels.

In quotation boards it is important to produce the record in as small an area as is consistent with legibility. This is attained by the arrangement of the several tapes, and still further by printing at times only a part of the price, the significance being evident from previous prices as is usual in ordinary ticker tapes.

This arrangement lends itself to operation from ordinary ticker signals, since a long sequence of consecutive quotations can be printed. To render possible the printing of such a sequence of characters with the minimum number of signals, the system is so operated that any number of characters can be printed with a single tape selecting signal, or stock designation in the case of quotation boards; that is to say, one tape remains selected ready to receive a record until another tape is selected.

An object of this invention is to provide a simple multiplex method of operating the printing device so that the board is able to record in total at a greater rate than the rate at which a single printing device can operate, and in this way adapt the system to receive signals at high speeds of telegraphic transmission.

Another object of the present invention is to provide in the case of the preferred method of type-stop printing first outlined above, an energy absorbing mechanism to reduce the jar and noise of stopping the typewheels for the printing operation, which in conjunction with the means for reducing the inertia of the typewheels makes possible a moderately high speed of operation for this type of mechanism, and makes it available where it is desirable to have as few constantly rotating parts as possible.

Especially in the case of boards using large characters to be visible at a distance, the inertia of the typewheels become an extremely serious problem, in view of the high speed required to meet modern conditions. The momentum is objectionable because it is difficult to start and stop the typewheel. Accordingly a modified form of this invention is to provide a means for printing from a continuously rotating typewheel.

A further related object is to provide a method of printing from a constantly rotating typewheel in which ordinary start-stop telegraphic transmission is used.

An important object is to provide a printing telegraph in which the typewheel is constantly rotating, but no exact speed or phase relationship is required between the rotating typewheel and any moving part of the control or transmitting apparatus.

A further object is the provision of a printing mechanism having a sharp, quick printing action to reduce the time of contact between the record material and the constantly rotating typewheel to prevent smudging of the record.

Two different forms of such a printing mechanism are provided, each having important advantages and best under different conditions. First, a mechanical printing mechanism having the advantages of simplicity and cheapness of construction; and second, an electrically operated platen having advantages of flexibility of control and providing for the separation of the tape selecting mechanism from the board so that this may be serviced without disturbing the board.

Another advantage of using a single shaft or axis for carrying all the typewheels and arranging said typewheels with their characters of the same kind in vertical alignment is that a single ink ribbon suffices for printing from all the typewheels.

Another object is the provision of an automatic device which constantly and uniformly supplies to the ink ribbon an adjustable and controllable quantity of ink.

Another object is provision for printing in two colors from one typewheel, as integers black and fractions red, to minimize the size of typewheel.

A further object is to avoid the necessity of cleaning the typewheels, and produce a substantially flat front to the board by placing the typewheels and all the operating mechanism back of the paper and only the platens and ink ribbon in front.

A further object of this invention is the provision of a stock and price selector, which combines in a single unit all the mechanism required to operate the quotation board of this invention.

Another object is to provide a stock selector in which the selectable elements, corresponding to individual stocks, may be made to correspond to any stock by the manner in which the parts are assembled.

There is also provided in connection with this invention a receiving control unit to operate a quotation board carrying only a small number, perhaps 150, items. A further advantage of this unit is that it is a modification of a stock ticker of a common type, which enables it to be built economically by factories already equipped for the manufacture of these tickers, and mechanics skilled in ticker servicing may also maintain the control unit.

A further object is to provide a device to translate standard-ticker stock designations into shorter designation suitable for operating a simple selecting device. Another object of the translating device is to shorten the code and thus give more time for the functioning of some parts of the apparatus; and also to improve the transmission of the signals to control the board.

Remotely controlled boards of dial type have been designed, as shown in copending application S. N. 333,161 filed by L. M. Potts, January 17, 1929. A highly specialized code of control signals is used. Accordingly an object of this invention is to modify the fundamental form of the invention to permit the board of this invention to cooperate with dial-type boards by operating under control of the special signals.

A further object is to provide more than one tape for each item so that information having different characteristics such as "high" or "low" prices may be recorded on different tapes.

A further object is to provide a retransmitting device which will retransmit only selected units of received information, as determined by the setting of the device.

A further object is to provide for operating joint tape-and-dial boards.

A further object is to provide a retransmitter which will not retransmit certain received information, the discrimination being under control of certain signals transmitted especially for that purpose.

A further object of this invention is to provide a device to route different messages to different destinations, the several destinations being determined from the received signals, and to provide such a device in which the controlling designation for destination may be of varying length and in which the subsequent message may be of varying length.

A further object is to provide a board having a plurality of tapes and also typewheels carrying an alphabet as well as numerals, the whole being so arranged that the page functions of a page printing device are provided for in the operation of the tapes. As a result the complete record will be as if the board were a giant page printer. Additional functions are provided so that the record on any line can be changed without affecting other lines.

A further object is the provision of a multiple tape printing board of small or large size which is self-contained, and is operated under the control of a single electromagnet, whose armature through mechanical means controls all the functions of the entire board.

A further object is to provide for isolated offices a method of operating the board locally from a keyboard.

A further object is to provide means for optically projecting the printing on the board in enlarged size so that the same size of mechanism may be available for different moderately sized displays, and a practicable size of mechanism may be used for very large displays.

An object of this system is to provide a telegraphic bulletin system in which such methods of operation are included that, regardless of the ultimate form of the display of the transmitted intelligence, the original form of transmission may be the same, hence one original transmission may serve to provide all of the kinds of ultimate service demanded by the system.

In the drawings:

Figure 4 is a typical cross section on a line such as 4—4 of Figure 1 and Figure 3, showing the mechanism individual to one tape.

Figure 5 is a detail of the tape spacing mechanism of Figure 1, illustrating single spacing.

Figure 6 is a view similar to Figure 5 but illustrating double spacing.

Figure 7 is an expanded detail, in perspective, of the brake of Figure 3.

Figure 8 is a perspective detail of an alternative form of brake for use with the mechanism of Figure 3.

Figure 9 is a perspective detail of the control arm of Figure 8.

Figure 10 is a detail of the trip sleeve and crank of Figure 8 in normal or reset position.

Figure 11 is a detail of the same with the parts in tripped position.

Figure 12 is a sectional detail of a ball-and-socket type of printing platen.

Figure 13 is a front elevation of the platen of Figure 12.

Figure 14 is a detail showing the crowning of the tape feed roller.

Figure 15 is a detail of a toggle-joint form of printing mechanism.

Figure 16 is a diagram in connection with Figure 15.

Figure 17 is a plan view of a modified form of typewheel and the platen.

Figure 18 is a composite view, showing a development of the periphery of the typewheel of Figure 17 with its relation to the platen under two different conditions of printing.

Figure 19 is the circuit diagram for operating with the typewheel of Figures 17 and 18.

Figure 20 is a partial plan of a keyboard for local operation.

Figure 21 is a transverse section through the keyboard showing the relationship of the code bars and one of the section selecting keylevers.

Figure 22 is a detail of one of the tape-selecting keylevers.

Figure 23 is a detail of one of the type-selecting keylevers.

Figure 24 is a section through the keyboard mechanism, showing a typical contact-closing arrangement.

Figure 25 is a view similar to Figure 24, showing the universal bar and contacts.

Figure 26 is a diagrammatic view showing a portion of the keyboard of Figure 20, in addition to a circuit and arrangement for local control, in the same figure.

Figure 27 shows a modified arrangement for local control.

Figures 28 and 29 show on two sheets the Stock and Price Selector. When united, the figures form one perspective view.

Figure 28—B shows a modification of Figure 28.

Figure 30 is a detail view of a stock rod of Figure 29.

Figure 31 is a detail of single pairs of stock selecting contacts.

Figure 32 is a detail of double-pairs of stock selecting contacts.

Figure 33 is a view of a piece of ticker tape showing the desirability of "deleting" and "enabling" signals.

Figure 3:
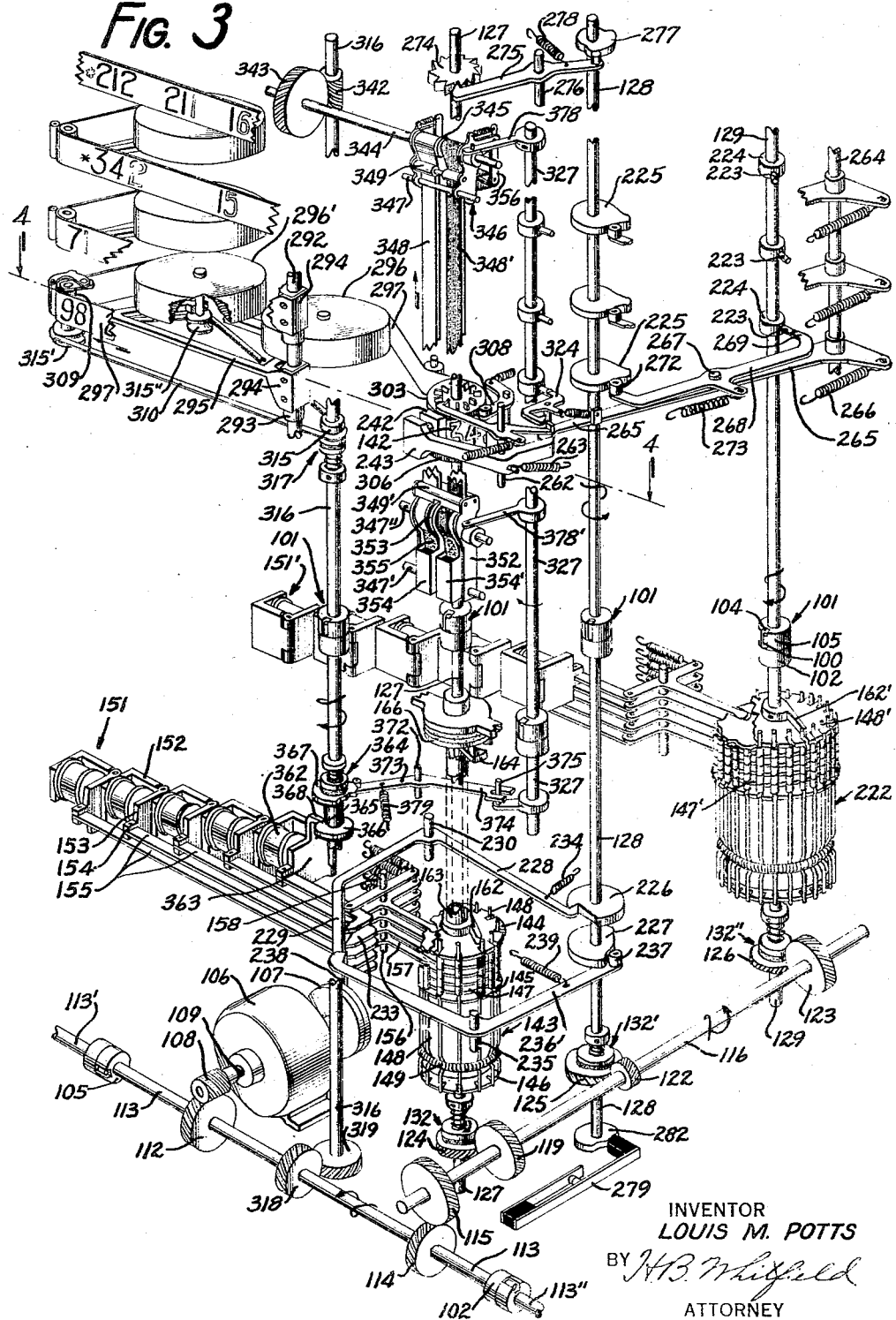
Figure 3 is a somewhat diagrammatic perspective representation of the preferred form of mechanism for operating the board of Figures 1 and 2, wherein the typewheels are stopped and started.

Figure 34 is a circuit for the operation of the board mechanism of Figure 3 under control of the stock and price selector of Figures 28 and 29.

Figure 35 is a schematic view of an optical projecting arrangement, in horizontal section.

Figure 36 is a vertical section of the optical arrangement as applied to a printing quotation board.

Figure 37 is a diagrammatic representation of a reperforator and circuit therefor used in the remote control of the "ticker type" of selector.

Figure 37—B shows the tape produced by the reperforator of Figure 28.

Figure 38 shows a circuit controlled by the "deleting" and "enabling" signals.

Figure 39 is a diagrammatic representation of a retransmitter for the remote control of the "ticker type" selector.

Figure 40 is a perspective of the phasing device of Fig. 39.

Figure 41 is a perspective view of the ticker-type selector.

Figure 42 is a perspective of an operating detail of the device of Figure 41.

Figure 42—B is a view of a disc of Figure 42.

Figure 43 is a detail of the code-control discs of Fig. 41.

Figure 44 is a detail showing the sequence cams of the device of Figure 41.

Figure 45 is a circuit arrangement for the operation of the board mechanism of Figure 3 under the control of the ticker-type selector of Figure 41.

Figure 46 shows detail of an alternative method of stock selection using the printing method of Figure 3.

Figure 47 is a circuit for the control of the mechanism of Figure 46.

Figure 48 is a modified circuit arrangement used in connection with the magnetic type of printing mechanism shown in Figure 49.

Figure 49 is a perspective representation of an alternative method of printing using a magnetically operated hammer.

Figure 49—B shows a modification of the inking device of Figure 49.

Figure 50 is a detail of the type selecting member of Figure 49.

Figure 51 is a developed view of the face of the typewheel of Figure 49.

Figure 52 is a detail of an alternative form of tape spacing mechanism used in connection with Figure 49.

Figure 53 is a circuit arrangement for the operation of the mechanism of Figure 49, from the stock and price selector of Figures 28 and 29.

Figure 54 shows a method of selecting among the tapes of a multiple-tape stock when mechanical printing is used.

Figure 55 shows a method of accomplishing the same purpose, when magnetic printing is used.

Figure 56:
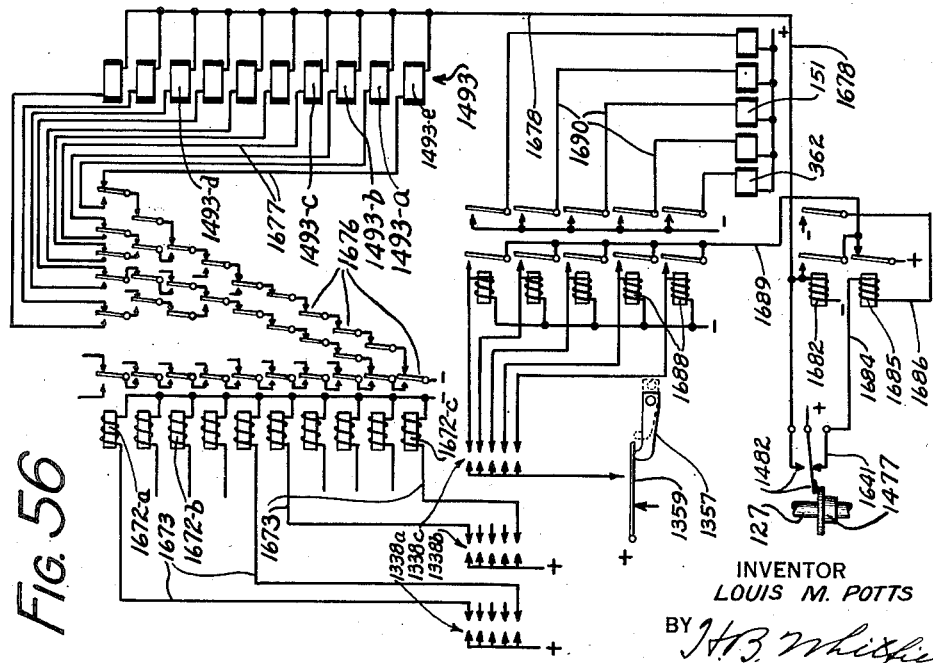

Figure 56 shows a circuit for the operation of the magnetic printing board under the control of the ticker selector.

Figure 57:
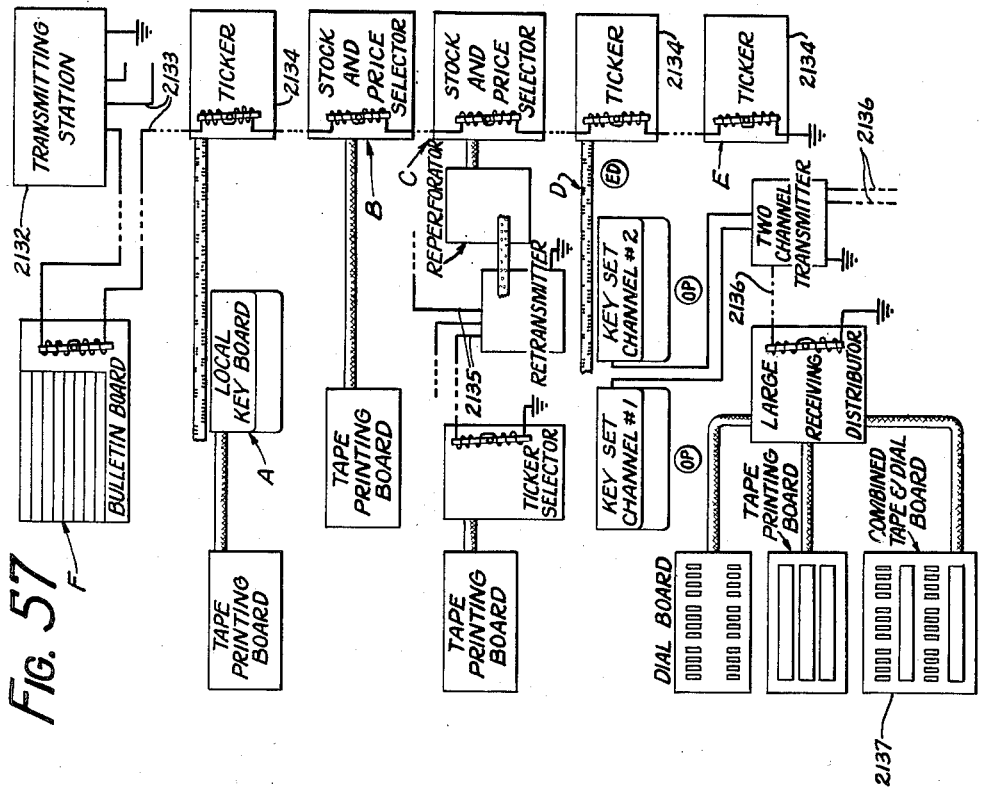

Figure 57 shows various system arrangements of the quotation boards of this invention.

Figure 59:
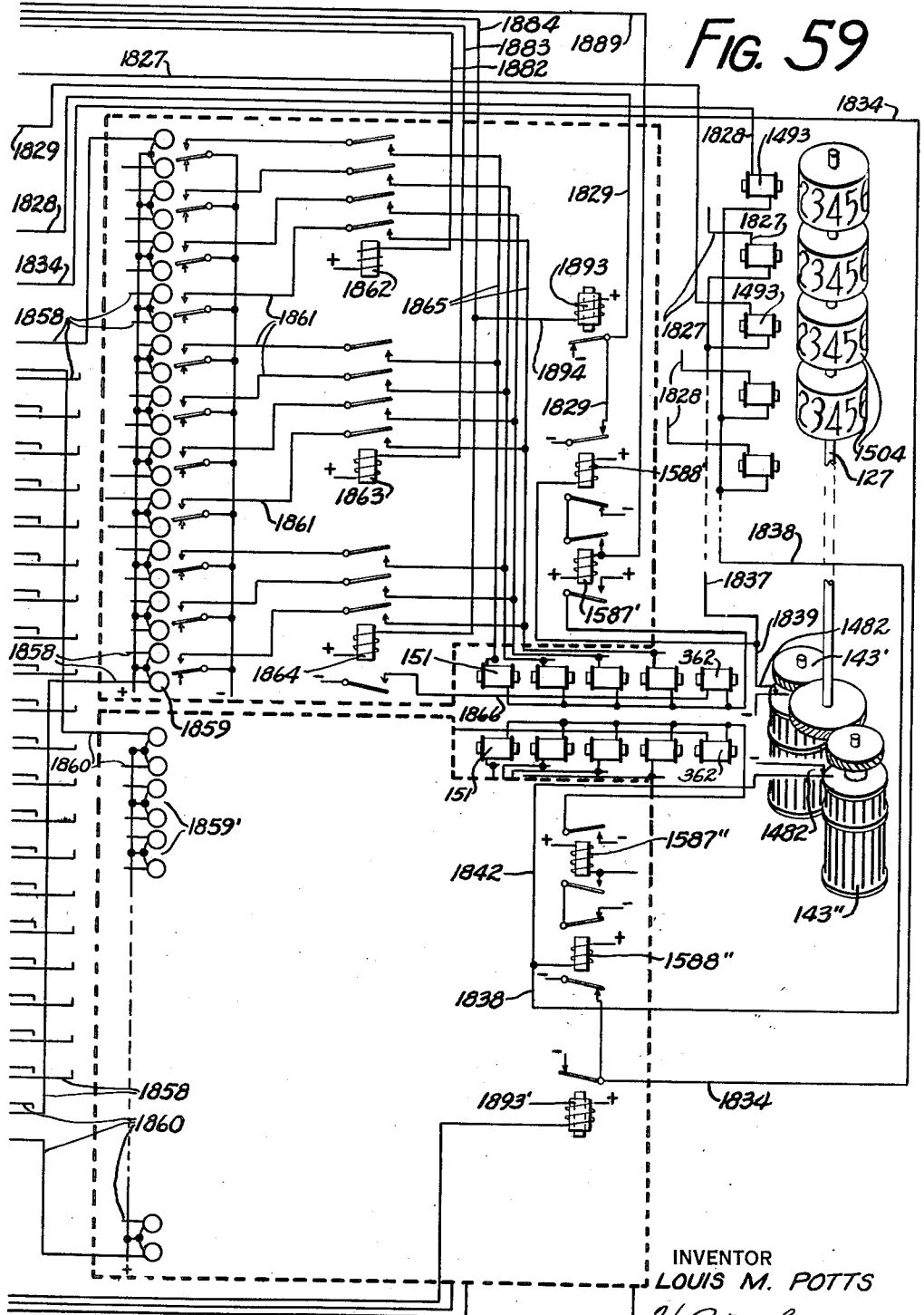

Figures 58 and 59 jointly represent a circuit and diagrammatic arrangement of apparatus for two-channel operation of the quotation board of Figure 49.

Figure 60 shows a partial section of a selector having a sixth disc to prevent accidental effects in the transient conditions of selection.

Figure 61 shows a section on the line 61—61 of Figure 60.

Figure 62 shows a detail for angularly adjusting the typewheel.

Figure 63 shows a face view of the bulletin board of this invention.

Figure 64 shows a circuit arrangement for the operation of the bulletin board.

Figure 65 is a perspective representation of the mechanism of the bulletin board.

Figure 66 is a detail of a selector rod and interference spacer of Figure 65.

There will be described first the preferred form of quotation board in connection with a mechanical printing mechanism. In this embodiment the plurality of typewheels is carried on a common rotatable shaft adapted to be stopped in various printing positions under the control of a code-disc selecting device of a well-known type. A second similar selecting device is adapted to position selectively a second shaft carrying interference fingers, the function of the shaft being to select the tape and the function of the fingers being to coact with the printing mechanism of the selected tape to print the selected character on the selected tape. A third power-operated printing shaft has been provided to perform the printing operation. The tape feeding means and inking means have many novel features, full details of which will appear as the description proceeds.

In most instances a stock will have only a single tape individual thereto, the one tape carrying all quotations. That there may be means of identifying the "high" and "low" quotations as they appear, a special character in the shape of an asterisk has been added to the typewheel, and every "high" and "low" quotation is accomplished by this special character. In addition this form of the present invention is provided with a novel inking arrangement whereby a "high" quotation is accompanied by a red asterisk and a "low" quotation by a black asterisk, this alternation of colors being governed by a special code pulse transmitted with the codes of the characters it is desired to print in red.

This different color of printing is useful in another connection, as for instance, in the present proposed form of typewheel only the numerals from 0 to 9, a blank and the asterisk are engraved thereon. Accordingly, to distinguish between digits and fractions the inking mechanism just referred to is brought into operation and the fractions are printed from the integer characters, but in red. Following the modern practice in automatic quotation boards these red numerals are read as ⅛, ²/₈, ⅜ . . . ⅞, etc., the numerator only of the fraction appearing on the tape.

Now referring to Figure 3, the points of disconnection between the base unit 9 and the remainder of the board mechanism are marked by couplings such as 101 of a well-known type, comprising a male half 102 provided with a pin 100 adapted to drivingly engage a slot 104 in the female half 105. Both halves 102 and 105 are suitably keyed to their respective shafts for rotation therewith. To facilitate removal and replacement of the lower unit 9 without disturbing the remaining mechanism, the couplings 101 are arranged on the separable shaft portions in stepped relation, Figure 2, so that said unit 9 may be moved without parts of the mechanism interfering.

Figure 1:
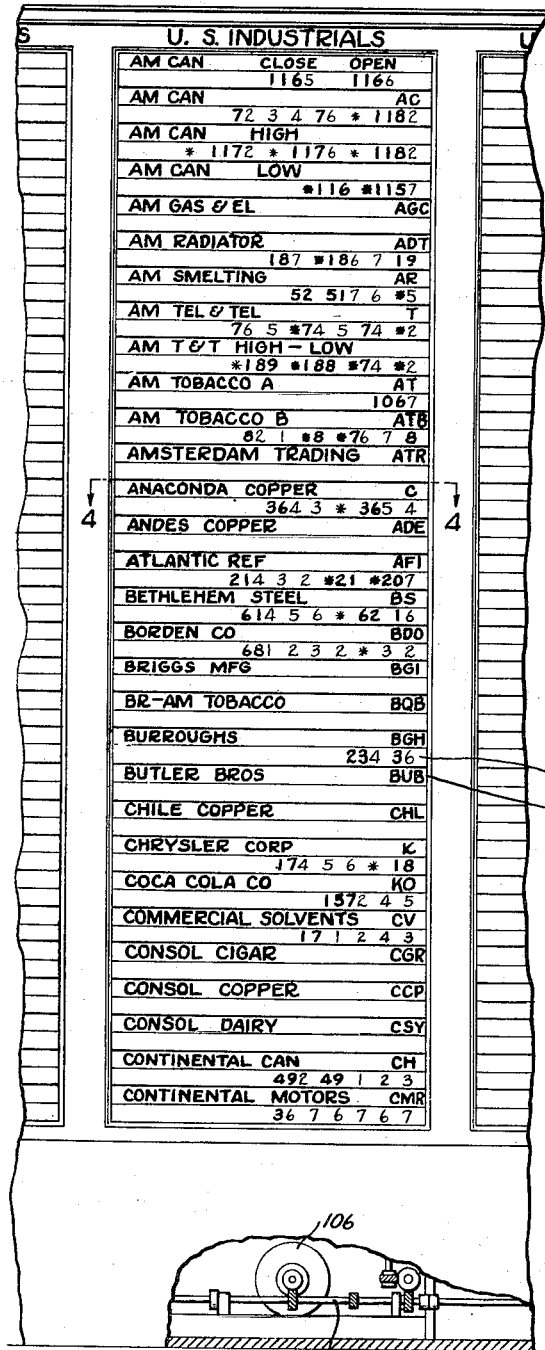
Figure 1 is a front elevation of a section of the quotation printing board of this invention.
Figure 2:
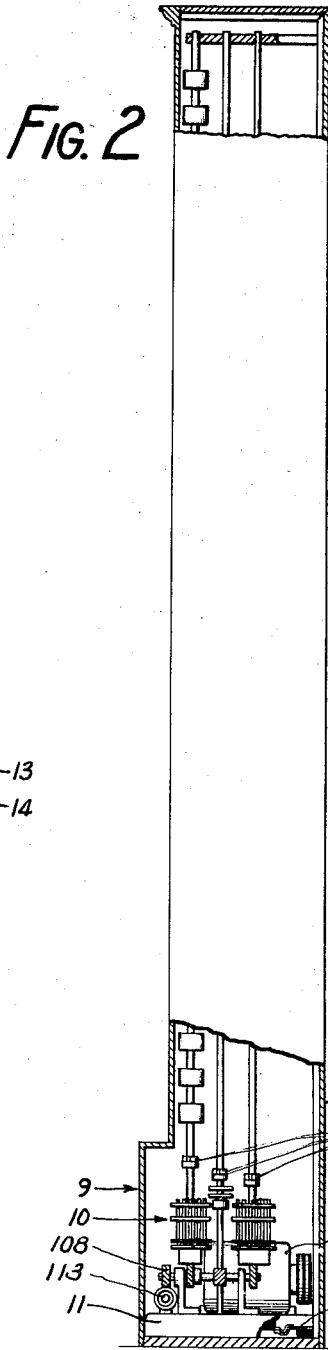
Figure 2 is a side elevation, with parts broken away, of the board of Figure 1.

Figure 1 illustrates a front elevational view of the preferred form of the improved quotation board of this invention and Figure 2 a side elevation of the same. A main frame 8 serves to support the various parts comprising a complete board section, which, as shown, consists of a vertical assemblage adapted to display information upon thirty tapes. A board of as many such sections as is desired may be obtained by joining any preferred number of these sections adjacent each other in any convenient manner. Two different methods of operation are then possible: first, by means of a single selecting and control unit 10 for each section, and second, by means of one selecting and control unit 10 for a number of sections. These two methods will be further explained later in this specification.

The selecting and control unit 10 just mentioned is carried upon a base 11 adapted to be readily removed from frame 8 for convenient servicing. A bank of slip connections 12 is arranged on frame 8 and a companion bank on base 11 connecting the wiring leading to base 11. A latch of any preferred design may be arranged to maintain the proper operative relationship of base 11 and frame 8.

The mechanism and frame may be concealed by panels of appropriate size, leaving exposed suitable portions of the tapes, 13, which move horizontally across the front of the board. Metal slides carry designation cards, 14, which serve to identify the tapes with the stock to which they relate; and may also carry legends, as shown, to identify the tapes when there is more than one tape per stock. For example, the stock "American Can" has a tape designated as "close open" to display the previous days' closing and today's opening quotations, another tape to display "running" or current quotations, and a third tape named "high" to show today's successive "high" quotations, and a further tape named "low" to show successive "low" quotations. Typical tape groupings may be noted from the figure. "American Tel. & Tel." has an auxiliary tape for both "high" and "low." The designation cards may also show other pertinent information, as dividends, etc.

Referring to Figure 3, the main driving motor 106, speed governed by governor 107, has a pinion 108 on its shaft 109. Pinion 108 meshes with gear 112 on cross shaft 113, carrying at its extremities coupling halves 102 and 105, the mating halves of the couplings being on shafts 113' and 113" of adjacent base units. These couplings are used only in the event that single-motor operation is desired, the motor 106 of the unit in question then serving a number of units.

Also keyed to the shaft 113 is a gear 114 in mesh with the gear 115 affixed to the intermediate shaft 116. Three gears 119, 122 and 123 keyed thereto are respectively in mesh with the gears 124, 125 and 126 loosely carried on the typewheel shaft 127, the printing shaft 128, and the tape selection shaft 129 respectively. The gears 124, 125 and 126 are arranged to turn independently of any stoppage of their associated shafts, but the shafts when released for rotation may be driven by the gears through the medium of individual felt disc friction clutches 132, 132' and 132" of a common type. All of the shafts thus far referred to are journalled in suitable bearings (not shown) upon the framework 9.

As previously stated, couplings such as 101 are provided to facilitate the separation of the base unit 9 from the upper mechanism. Despite this fact, the shafts 127, 128 and 129 will be referred to by these numbers throughout their length for convenience in description, the introduction of the couplings 101 being immaterial so far as the functioning of the shafts is concerned.

Affixed at definite equally spaced intervals upon the upper portion of the typewheel shaft 127 are the thirty typewheels 142 one individual to each tape. These typewheels are very light in construction, comprising a hub which by means of a light web supports the drum upon which the characters are engraved. In this preferred embodiment the characters comprise numerals from 0 to 9, the asterisk and a blank position. The characters of the same kind are in vertical alignment on all typewheels.

Upon bringing a selected character to the printing position, the same character on all typewheels also is selectively positioned. Means for accomplishing this selective operation will now be set forth.

Type selecting mechanism

Supported on the frame 8 and surrounding the shaft 127, but having no contact therewith, is the typewheel code disc selector 143 of structure substantially identical with that of the corresponding device in a copending application Serial Number 348,612, filed March 20, 1929, by S. Morton et al. As shown this device comprises a central spool member (not shown) to which are fastened the upper and lower guide discs 144 and 145 respectively and the fulcrum disc 146. Rotatable upon the central spool through a small angular distance to one or the other of its two sole selective positions are the four code discs 147. Spacers of appropriate form serve to maintain a definite axial spacing of said discs, but allow free rotary movement thereof. Discs 147 are formed with V-notches on their periphery in accordance with a predetermined code after a well-known fashion and are limited in their angular movement by slotted holes therein engaging appropriate stops which form part of the bolts serving to fasten the selector assemblage together. In operative relation with the code discs 147 are the twelve stop pins 148, one for each character position upon the typewheel and one for the blank position. These pins are spaced equally about the periphery of the selector and are guided in radial slots in the guide discs 144 and 145. A notch in the lower end of each pin engages the edge of the disc 146 and permits said pins to pivot freely thereupon, as will appear. A coil spring 149 girdles the pins 148 and is retained in position by a bowed portion in each pin wherein the spring rests. The spring 149 serves to move the selected pin centripetally as will be described and also serves to prevent the pins from accidentally becoming displaced. The pins extend above the top face of the disc 144 for a short portion of their length and between the discs 144 and 145 each pin is provided with four free rollers to reduce the spring-induced friction of the pins against the code discs 147 as the latter are shifted into selective combinations.

Selective settings of the discs 147 are brought about in response to received code combinations of impulse conditions transmitted from either a local or remote source, regarding which more will be said. For this purpose there is provided a group of four selecting electromagnets 151 adapted to be energized in selective combinations by currents through a common switch 279. (Fig. 34.) These magnets are supported upon the frame of the control unit 10 in any convenient manner by their yokes 152. For the present only the four magnets to the left will be considered, the fifth magnet performing a special function to be described later.

Each yoke is provided with a pivoted armature 153 to which is pivotally connected at 154 the pull link 155. Hence attraction of the armature 153 imparts a longitudinal movement to the link 155. Carried upon a common pivot 156 affixed to the framework are the four T-levers 157, the forwardly extending arm of each of which is pivotally articulated to its individual pull link 155. The rightward extending arm of each lever 157 terminates in a rounded head adapted to operatively engage a slot in the periphery of each code disc 147. The third or rearwardly extending arm of each lever 157 carries one end of a tension spring 158, the other end of which is affixed to the framework. Longitudinal leftward movements of the links 155 impart a clockwise rotation to the levers 157 and thereby shift the code discs 147 counter-clockwise, against the tension of the springs 158, this position of the discs being the selective marking position corresponding to energization of the magnets 151. Upon deenergization of the magnets 151 the retractile springs 158 urge the discs 147 clockwise toward their alternate or selective spacing positions. It may be seen that the action of each magnet 151 upon its individual disc 147 is independent of the others and selective operation of the former results in selective settings of the latter. So that the energization of the magnets 151 may be active for only a short interval it is desired to lock the selective setting of the discs 147 by member 236 until the resultant selective operation thereof has been performed. This locking operation will be described in logical sequence hereinafter.

The notches in the discs 147 are arranged so that selective permuted combinations of said discs will allow a notch in all discs to align, after a manner well-known in the art. Upon alignment occurring, a pin 148 will be forced by the spring 149 to a position closer to the center than normal, the pin entering the notches of the discs. And, upon a different selective combination of the discs occurring, the aforementioned pin will be cammed out by the V-notches and a new pin will drop into the new selective alignment.

Adapted to be rotated within the arc formed by the projecting ends of the pins 148 is the stop arm 162. The length of the arm is such that it will pass unselected pins and be stopped by the one selected pin, whose position closer to the center causes engagement. Accordingly, the selection of variant pins causes the arm 162 to stop in variant selected positions depending upon the code received, each code being identified with a particular typewheel angular position. The stop arm 162 is adapted to be adjustable on the sleeve 163 by means of a set screw, so that an exact angular relation between typewheel and stop arm may be made.

In order that the rapidly rotating shaft 127 may be stopped with the minimum shock and minimum wear upon the selector mechanism, despite the large momentum of the shaft incident to having so many typewheels thereupon a braking means of novel design has been provided which will now be described, and in connection therewith will be set forth the method of selectively positioning the shaft 127 in accordance with the received code.

As seen in Fig. 7, stop arm 162 is carried by sleeve member 163, which also carries a cross arm 164 provided at either extremity with hardened steel brake cams 165, having inclined faces. The member 163 is freely rotatable upon the shaft 127 and is capable of only rotative movement. A brake disc 166 is splined for rotation with the shaft as well as for axial movement with respect thereto. Disc 166 is provided with a pair of diametrically placed cams 166' identical in construction with the cams 165 and adapted to slidably engage the latter. A tension spring 167 attached at either end to the arm 164 and the disc 166 serves to withhold the cams 165 and 165' from engagement. Stop pin 168 limits the distance of displacement of the cams from coactive position. United with the disc 166 upon its upper face by means of a suitable adhesive is the friction disc 169 of leather or any other preferred material in juxtaposition with an identical disc 169' fastened to a suitably shaped part fixed upon the framework.

Normally the member 163 is as shown in Figure 3, having rotated beyond the selected pin 148, the discs 169 and 169' are out of frictional engagement and the shaft 127 is at rest, held by toothed wheel 274 and latch 276, all as will be fully described hereinafter.

Now, the selection having been received, the latch 276, to be described later, is operated to free shaft 127 for rotation and the shaft is thereupon driven in clockwise direction through the friction clutch 132 (Figure 3) and the disc 166 (Figure 7) is thereby also rotated, carrying with it the sleeve member 163, by means of spring 167. Upon engagement with the new selected pin 148 said arm 162 is brought to a stop, but the shaft continues to be driven and the disc 166 rotating therewith causes the cams 166' thereupon to slide upon the cams 165, now stationary. The inclined faces of the contacting cams slide upon each other thereby raising the slidable disc 166 to force the friction disc 169 thereon into braking engagement with the fixed friction disc 169'. In this manner the rotating disc 166 and the shaft 127 are brought to a stop, the momentum of the latter and its attached parts being absorbed in friction between the discs 169 and 169'.

Having described the selection of the proper typewheel position, the method of selecting the tape upon which printing is to be performed will now be set forth.

Tape-selecting mechanism

Disposed to the rear of the shaft 127 and at a suitable distance from it is the tape selecting shaft 129.

Surrounding shaft 129 is a second code-disc selector 222 identical in general construction and operation with the typewheel selector 143, except that in this case there are thirty pins 148' one for each of thirty tapes. Tape selecting magnets 151' are operatively coupled to the code discs 147' in exactly the same manner as the magnets 151 are connected to their related code discs 147. In this selector 222 five discs 147' are necessary to obtain thirty settings. In the typewheel selector only four discs 147 are necessary to obtain twelve settings. The stop arm 162' in selector 222 is affixed directly to the shaft 129, since in this case no brake is necessary, the inertia of shaft 129 being negligible.

Fixed upon the upper part of shaft 129 are thirty interference fingers 223 each carried on a suitable collar 224 having a set screw for adjustment. The arrangement of the fingers 223 is such that they are disposed spirally about the shaft and are spaced the same distance apart as are the typewheels 142. The angular location of the fingers 223 is determined by the pins 148' there being one finger 223 individual to each pin 148'. The fingers 223 need not necessarily be arranged spirally, the essential requisite being that no two fingers shall have the same angular position. Thus for each selective position of the stop arm 162' there is provided a finger 223 which may correspond to any predetermined one of the thirty tapes. As a result thereof only one such finger 223 is permitted to become operatively effective as the printing mechanism is actuated, as will be later set forth, the selection of the particular effective finger being determined by the selection set up on the code discs 147'.

Printing mechanism

Disposed between the shafts 127 and 129 is the printing shaft 128 normally held from rotation, but adapted to be rotated by means of the friction clutch 132' and gears 122 and 125.

In substantial horizontal alignment with and individual to each finger 223 is a printing cam 225 all of the thirty cams 225 being affixed in the same angular position upon the shaft 128.

Disposed toward the lower end of shaft 128 is stop disc 226 and locking cam 227. Pivoted upon the frame at 230 and in operative relation with a notch in the periphery of disc 226 is stop latch 228, whose right arm is hook-shaped for latching and whose forward arm is bent downward in an extension 229 adapted to span all of the forwardly extending projections 233 of the links 155. Should any link 155, be operated to the left, latch 229 will be rocked to release stop disc 226 and shaft 128 will be free to rotate. Upon return of the operated links 155, spring 234 tends to reengage the latch with the disc which reengagement will occur when the disc has completed its revolution, and the shaft 128 will be brought to rest.

Pivoted upon the frame at 235 is the locking lever 236. One arm of lever 236 carries cam roller 237 in operative relation with the cam 227 and the other arm terminates in a downwardly extending edge 238 of V-shaped cross-section. Each of the projections 233 terminates in a V-shaped end. A spring 239 urges the roller 237 into contact with the cam 227 and the extension 238 is out of engagement with the projections 233 when the printing shaft 128 is in normal or stopped position, as shown. Should a link 155 be operated, latch 228 will release shaft 128, and cam 227 will operate arm 236 to lock and hold the operated link 155, cam 282 then operating switch 279 to open the circuit of the operating magnets 151, as explained more fully hereinafter.

In operative relation with the selected character on the typewheels 142 are individual platens 242 each provided with a curved working face (Figure 17) corresponding with the typewheel contour, mounted with reasonable freedom upon two studs carried by the printing hammer 243. The platen is adapted to slide upon the studs against the yield of two compression springs which surround the studs. The amount of unguided motion of the platen 242 is only sufficient to permit the platen to seat itself upon the typewheel to obtain clear printing. The springs assist this seating and also absorb the excess printing force, thereby lessening the wear upon the typewheel. The platen is formed from somewhat elastic material, which may be Bakelite for example, or Bakelite faced on its working side with a lamination of rubber, both types of structure having been found satisfactory in use.

An alternative platen mounting is shown in Figures 12 and 13. The platen 242' has a socket 252 and the printing hammer 243' has a member 253 provided with a ball head 254 adapted to fit said socket. A flat springlike member 255 retains the head 254 and is adjustable by screws to regulate the friction. The ball and socket joint allows the platen 242' to seat itself for each impression. A screw 256 permits relative adjustment of the platen and hammer arm.

Each hammer 243 is of bell crank form and is pivotally supported at 262 upon the framework. The left arm supports the platen and the rear arm engages an operating member, 265. A tension spring 263 attached to hammer 243 at one end and to the framework at the other returns the hammer to normal position after each impression.

Supported on vertical fixed rod 264 by means of collars (not shown) but free to rock on the rod are hammer operating arms 265, one individual to each hammer. These arms extend forward and engage the rear arm of the hammer. A tension spring 266 attached to arm 265 and to the framework maintains the arm in normal position and a suitable stop prevents overtravel of said arm when it is returned to normal. Pivoted at 267 on arm 265 is a U-shaped interference lever 268, having a leg 269 adapted to engage the related finger 223 when the latter is in operative position, and having another leg with cam roller 272 adapted to be actuated by the printing cam 225. A spring 273 attached to a projection of the lever 268 and to the framework maintains the roller 272 in contact with its cam 225.

As described, the typewheel shaft 127 is brought to rest by means of a brake. Since accurate positioning of the selected character is imperative and because such stopping means does not suffice for this essential accuracy, secondary positioning means or correcting means of requisite accuracy has been provided. At the upper end of the shaft 127 is fixed a toothed correcting wheel 274 and in operative relation to the teeth thereof is the pawl end of a locking lever 275 pivoted to the frame at 276. The opposite end of lever 275 carries a cam roller in operative engagement with the cam 277 affixed to the printing shaft 128. A tension spring 278 maintains roller and cam in contact. In connection with the correcting devices, there is provided a pair of contacts 279 operable by a cam 282 at the lower end of the shaft 128.

Operation of the correcting mechanism, briefly, is as follows: The brake stops shaft 127. Cam 227 releases lock arm 236. Code discs 147 return to non-selective condition. Operated pin 148 is cammed out but no pin is dropped in. Stop arm 162 is released, releasing the brake which releases shaft 127. At this time, cam 277 has moved lock lever 275 into the path of the teeth of correcting wheel 274. A tooth of wheel 274 engages the locking lever and stops shaft 127 and typewheel 142 in corrected position.

*Printing*

Briefly, shaft 129 determines the tape to be printed upon, shaft 127 then determines the character to be printed, shaft 327 determines the color of printing, and shaft 128 rotates to do the printing, thirty cams 225 operating the left end of thirty levers 268 of which twenty-nine move the end 269 and not the pivot 267 while the thirtieth is blocked by pin 223, cannot move end 269 and moves pivot 267 instead, thus moving arm 265 to operate hammer 243 and platen 242 to print.

In detail, the code pertaining individually to the tape to be printed upon is set up in the magnets 151' (Figure 3) by control external to Figure 3. This code is set up in the form of current through a code combination of magnets of the set 151', leaving other magnets without current, and the corresponding discs 147' in the selector 222 are operated, camming out all index pins 148' except the one desired. The shaft 129 rotates until the stop arm 162' engages the uncammed pin 148', the shaft 129 then stopping with the desired pin 223 in position to interfere with the lever 268 pertaining to the tape upon which printing is desired. The currents in the magnets 151' are maintained by external control throughout the periods of printing upon the selected tape.

After setting the code on selector 222, the further type or character to be printed is set up in the left four of the five magnets 151 (Figure 3) by control external to Figure 3, the currents for the magnets being applied simultaneously, if more than one magnet is to be operated. The corresponding discs 147 in the selector 143 are operated. The hook ends 233 pull the arm 229 to unlatch arm 228 from disc 226, releasing shaft 128 to turn. Cam 227 moves arm 236 to lock the discs 147 mechanically and cam 282 opens switch 279 to open the common return wire of magnets 151. Cam 277 operates latch 278 to release shaft 127. Shaft 128 continues to turn, with its several cams. Shaft 127 rotates and carries stop arm 162.

The code setting of selector 143 has permitted one index pin 148 to approach the shaft 127. Arm 162 will engage this pin and stop sleeve 163, thus positioning all typewheels 142 in position to print the selected character, and cams 165 will operate brake discs 169 to stop shaft 127 until shaft 128 rotates cam 227 to operate locking lever 236 to unlock discs 147, which then cam out all pins 148 and thus release the arm 162. Meanwhile shaft 128 and cam 277 have operated latch 275 into the path of the teeth of wheel 274.

Release of arm 162 disengages clutch discs 195 and releases shaft 127 which moves into corrected printing position as determined by engagement of a tooth of wheel 274 with latch 275. If magnet 362 has not operated, then shaft 327 has not operated, and the character will be printed black. The event of printing in color will be discussed immediately.

At this time, shaft 128 has rotated nearly one cycle, acting in cooperation with the shaft 127 to adjust the printing wheel. Shaft 128 now operates the printing mechanism.

Near the end of the printing shaft rotation the lift of the cams 225 operates all the levers 268 counter-clockwise about their pivots 267. However, one of the levers 268 will find a finger 223 in juxtaposition with its legs 269 and hence further rotation of this particular lever 268 will be arrested. The remaining levers will meet with no such interference and will complete the rocking movement imparted thereto by the cams 225 without affecting their associated arms 265. On the other hand the blocking of the lever 268 transfers the fulcrum from 267 to the abutment of finger 223 and leg 269 and further movement of lever 268 will impart counter-clockwise rotation to arm 265 about 264, which motion is communicated to the hammer 243 to rock said hammer clockwise to carry the platen thereon against the type character.

A sharp hammer blow is imparted for printing, resulting in a well-defined impression. This result is obtained owing to the fact that the counter-clockwise motion of the arm 265 is very rapid and the hammer 243 is thrown against the typewheel as soon as the arm 265 reaches the limit of its outward movement. Upon striking the typewheel to make the impression the hammer rebounds and is instantly away from the tape, independently of the length of time arm 265 is held in its extreme position. In its extreme position, arm 265 holds the platen near the tape but not against the tape.

Ink ribbon mechanism

Affixed near the upper end of continuously rotating shaft 316 is worm 342 in mesh with gear 343 keyed to ribbon drive shaft 344 journalled in the framework. The opposite end of shaft 344 is splined, and is provided with a ribbon driving spool 345 rotatable thereby and slidable thereupon. The worm 342 and gear 343 are proportioned to impart an extremely slow linear speed to the ribbons. Hence, with the sharp blow effected, no smudging of the impression results despite the fact that the ribbons move continuously. Ribbon spool 345 is part of a carriage 346 transversely slidable with said spool upon shaft 344 and upon fixed guide rod 347.

Passing over the knurled surface of spool 345 and suitably retained thereon by flanges on the spool are the endless ink ribbons 348 and 348' saturated with black and red ink respectively. Idler rollers 349 carried by carriage 346 both in front and back of the ribbons guide the ribbons so that the upward and downward moving portions of the loop are in close proximity to permit the ribbons to move in the narrow space between the platens and the tapes. In normal operation the black ribbon 348 is in line for printing. However, mechanism, to be hereinafter described, is provided to shift the red ribbon into this position and the black ribbon out of position, and vice versa. At the lower part of the board a second shiftable carriage 352 is provided, quite similar to the upper carriage but having a smooth surfaced ribbon roller 353, acting merely as an idler. In addition this carriage is provided with a set of idlers 349' identical in function with the idlers 349. Carriage 352 is shiftable transversely upon guide rods 347' and 347'' by means to be described.

In carriage 352 are two ink wells 354 and 354' containing a supply of black and red ink respectively. Suitable wicks 355 wiping against ribbons 348 and 348' convey ink to the ribbons. It is evident that the large size of the characters printed necessitates a copious supply of ink.

To compensate for stretching or slack in the ribbon, there are provided two tension rollers 356 carried by yieldable arms pivoted on the carriage 346, and over which a loop of the ribbon passes.

In the present embodiment, the movable printing platen 242 carries the ribbon 348 and the tape 297 against the engraved character on the typewheel 142 for the impression, with the ink ribbon next to platen 242. It is evident, that no ink reaches the typewheel to gum or clog the characters. In this respect the method of printing in the present invention differs from the method commonly used in printing telegraphs, typewriters or number recorders wherein the ink may come in contact with the type so that frequent cleaning of the type is necessary.

Color printing

As stated, integers are printed in black and fractions in red. Also the special "high" and "low" asterisk may be printed either black or red. Accordingly there is provided a fifth selecting magnet 362 adapted to operate its armature 363 in response to a signaling current accompanying the characters to be printed in red. Sleeved upon shaft 316 and adapted to be driven by friction clutch 364 is the sleeve member 365, comprising a stop disc 366 and a cam 367 integrally fixed to the sleeve member. Sleeve member 365 is normally restrained from rotation by the engagement of dog 368 of armature 363 with a notch in disc 366. Spring 158 serves to retract armature 363 and maintain its engagement with disc 366.

Pivoted to the framework at 372 is the rocker lever 373 operably engaging cam 367 by means of a roller at one end thereof, the other end terminating in a bifurcated jaw 374 adapted to engage pin 375 affixed to ribbon-shift shaft 327. The shaft 327 is journalled in the framework and is provided with two arms 378 and 378' terminating adjacent to carriages 346 and 352, to which they are operably connected by means of slotted holes in the arms engaging projections on the carriages. Spring 379 serves to maintain lever 373 in operative engagement with cam 367 and maintains shaft 327 in normal position with the black ribbon in printing position.

In operation, upon the reception of a colorcode current in magnet 362 simultaneously with the code currents in magnets 151, armature 363 is attracted and releases sleeve member 365 for rotation. Thereupon cam 367 releases lever 373 and spring 379 rocks lever 373 counter-clockwise to rotate shaft 327. The rocking movement is communicated to carriages 346 and 352 by means of arms 378 and 378' and ribbons 348 and 348' are shifted to the left, the red ribbon being substituted for the black and the character subsequently printed will be a red impression. Cam 367 is so shaped and timed that the red ribbon dwells in its shifted position long enough to complete the printing operation and is then returned to normal, the black ribbon thereupon taking its original position.

Tape supporting mechanism

Carried upon the fixed rod 292, supported in the framework are the fixed collars 293 one individual to each typewheel. Disposed above and supported by each collar 293 is a sleeved block 294. Attached to the block is a light horizontal frame member 295 provided with tape spools 296 and 296', Figure 4, journalled therein. Spool 296 supports the supply roll of tape and the spool 296' is a rewinding spool for used tape. Tape 297 is a narrow paper band of width necessary to record the printed characters. Spool 296' (Figure 4) is provided with a slot into which the tape end is fastened to facilitate the rewinding of said tape. The tape after leaving the roll on spool 296 passes over a guide idler roller 299 (Figure 4) pivoted to the main framework and thence around the typewheel 142, Figure 3.

Above each typewheel is a tape-spacing disc 303 sleeved on shaft 127 and positioned by collar 304, Figures 5 and 6. Projecting from the top face of disc 303 are twelve radial lugs 305, Figure 5. Below the typewheel is a second disc 306 (Figure 3) different from disc 303 only in the absence of lugs 305. The peripheries of discs 303 and 306 are milled (as a coin). Upon these peripheries the tape 297 is fed, and held in non-slipping contact by means of two pressure rollers carried upon spring arms 308 pivoted on the framework. Discs 303 and 306 are of slightly greater diameter than the typewheel so that the tape encounters no resistance either from its own motion or the motion of the typewheel. From this point the tape passes between the platen 242 and the typewheel and thence over the open front of the board, around the feed roller 309 journalled in the frame 295, and the winding spool 296'. The roller 309 is faced with frictional material, such as rubber, and a yieldably mounted pressure roller 312 of similar construction aids the roller 309 in feeding the tape. The roller 309 is preferably crowned in a well-known manner, Figure 14, in order that the tape 297 will seek the center and thereby be pulled in a direct line across the board.

Individual to each tape is a grooved pulley 315 (Figure 3) sleeved upon shaft 316 and adapted to be driven thereby by means of a friction clutch 317 of well-known type. A pair of gears 318 and 319 affixed respectively to the cross shaft 113 and the shaft 316 serve to rotate shaft 316. Affixed to feed roller 309 and to the spool 296' are similar grooved pulleys 315' and 315''. A belt 310 connects the pulleys 315, 315', 315'' in driving relationship.

The frame 295 may be swivelled about the rod 292 in a forward direction to make readily accessible the tape spools so that a fresh roll may be inserted and the used tape removed. A catch 322, Figure 4, of any preferred form is provided to maintain the frame 295 in its proper operative position. Dotted lines in Figure 4 indicate the outward position. Shaft 316 is so located that swivelling of the frame 295 tends to shorten instead of lengthen the center distance between the pulleys so that no stretching of the belt results.

Tape spacing mechanism

With reference to Figure 5: Carried near the forward end of the printing arm 265 is a stud 323 upon which is pivoted a latch 324. Normally the latch is in the position shown with a projection 325 thereof abutting a stud 326 affixed to the ribbon shift shaft 327, one such stud individual to each tape. Spring 328 extending between arm 265 and latch 324 maintains this abutting relation. A hook 329, on latch 324, is adapted to engage a lug 332 on spacing lever 333. Spacing lever 333 is of bell crank form, pivoted on shaft 262, and has a hook 334 adapted to engage the lugs 305 upon the disc 303. Spring 335 attached to the lever 333 and to the framework urges hook 334 against lugs 305.

The operation is as follows: To print, arm 265 moves right (Figure 5) and carries latch 324, the hook of which slides over and then latches projection 332 (as shown by dotted lines) by reason of the spring 328. On its return movement, arm 265 and latch 324 rock lever 333 counter-clockwise to disengage hook 334 from lug 305. At all times the pulley 315 is tending, by means of its belted connection with pulley 315', to draw the tape to the left and across the board but is restrained therefrom by the friction of the tape against latched disc 303, and the pulley 315 is stationary. However, as the disc 303 is freed by operation of lever 333, the roller 309 pulls the tape across the board. This motion of the tape is limited to the distance of one character space, because latch 324 on its return movement brings its projection 325 into abutment with finger 326 and is rocked clockwise about its pivot 323 to release lever 333, which is thereupon returned to normal engagement with the succeeding lug 305 by means of spring 335. The speeds of operation of the various members are proportioned so that the disc 303 may rotate only the distance of one lug, to move the tape one character space, before being stopped. The tape moves one character space after each character printed.

Double spacing function

After printing a fraction it is desired to have the tape step two character spaces in order that a blank space may be left between the fraction and the next succeeding character, for the reason that a fraction generally terminates a quotation and the extra space increases the legibility by separating one quotation from the next.

To this end, the spacing mechanism is operated in a different manner under the control of the ribbon shift shaft 327, as follows: Referring to Figure 6, arm 265 is shown in its extreme right position, having been operated to print, and latch 324 has caused hook 329 to engage lug 332. However, just prior to this engagement the ribbon-shift shaft 327 has rocked from its normal position, as shown by the new position of finger 326. Now, upon the return of arm 265 to normal, the lever 333 is rocked counter-clockwise to release the disc 303 as before and the tape 297 is free to move, as before. But at this instant finger 326 is not in the path of projection 325 and the latch 324 is not tripped to release lever 333 for reengagement with the next lug 305. However, an instant after the latch takes up the position shown in dotted lines the shaft 327 rocks back to normal having completed the ribbon shifting function, and in so doing the finger 326 strikes the projection 325 and rocks the latch to disengage the hook 329 thereof from the lug 332. The lever 333 is then free to reengage the second succeeding lug 305 by action of spring 335.

The principle of this modified function is the delay of the tripping of the latch 324 to permit disc 303 to rotate two spaces instead of one, and the movement of the shaft 327 is so timed as to permit this to take place.

If a quotation does not have any fraction an extra space to give double spacing between quotations may be accomplished by a "blank" signal whereby the tape of any selected stock is stepped forward but no printing is done.

Modification—Toggle-type printing mechanism

Referring to Figure 15 a modified form of printing mechanism suitable for operation with the board just described is shown. This arrangement is substantially similar to the mechanism shown in Figure 3, and only those parts whose function is different will be described in detail. Like reference numerals indicate parts common to both forms.

The printing hammer 382 has no rearward extending arm. Printing arm 383 has operating lug 385 to engage the toggle. The lever 268, finger 223 and printing cam 225 are all as before. The spacing mechanism is unchanged.

Pivoted at 386 to the hammer 382 is link 387 pivoted also at 388 upon a reset bell crank 389 which is pivotally mounted upon the main framework at 392. The joint at 388 is near the lug 385 which acts as a back stop for the linkage just described. Attached at one end to the inward end of link 387 and at the other to the framework at 393 is the decentering spring 394 which normally urges the bell crank 389 against lug 385. A stop 391 is provided to limit the travel of bell crank 389 in a counter-clockwise direction.

Adapted to cooperate with a cam edge 395 of crank 389 is the reset roller 396 carried on the arm 397 affixed to the printing shaft 128.

The operation is as follows:

Printing cam 225 moves interference lever 268 to move printing arm 383 to the right. Lug 385 trips off the toggle formed by bell crank 389 and link 387 in the following manner. Movement of lug 385 to the right actuates the pivot 388 and members 387 and 389 to the right against the force of spring 394. On passing the line joining said pivots 386 and 392, the tension of spring 394 is suddenly relieved in the manner of a quick acting trigger and a quick movement is imparted to members 389, 387 and 382. The members 389 and 387 being free of all restraining force except that of the spring 394, the crank 389 may thereupon rock counter-clockwise to actuate the members 387 and 382 in the manner described to perform the printing operation, the hammer 382 delivering to the tape and type a free spring-driven blow.

After the tripping operation the action is independent of the speed of rotation and shape of the cam 225, since all that this cam does is to trip off the toggle mechanism, and the spring 394 completes the action.

The line diagram of Figure 14 shows in a simple manner the linkage just discussed, dotted lines representing the linkage in its final position after printing has occurred.

Following this tripping operation the arm 383 returns by its spring 266. Roller 396 engages cam edge 395 of crank 389 rotating said crank clockwise to reset members 387 and 382 to normal, where they are stopped by lug 385. The mechanism is now in position for another operation. The stop 391 is positioned to engage the link 387 so that the printing platen 242 when in tripped position is held slightly spaced from the typewheel to prevent smudging, the momentum of the parts carrying the platen beyond normal position to cause printing of the character.

Modification—toggle brake

An alternative type of brake is shown in Figure 8. Parts common to Figures 7 and 8 bear like numbers in both figures.

Affixed to the typewheel shaft 127 is a brake drum 172 which comprises a hub 173 supporting the drum portion 174 by means of the web 175, the whole arranged to rotate with the shaft 127. Girdling the greater part of the periphery of the drum 174 are the two arcuate brake shoes 176 and 176' hinged together at 177. Each shoe 176 and 176' carries an integral tangential arm 178 to which are pivoted at 179 the connecting links 182 which in turn are rotatable on the common pivot 183. The pivot 183 is carried by the operating link 184 which is pivoted at 185 to the bell crank lever 186. The latter is rotatable upon the pin 187 and is urged counter-clockwise against flange 192 by the spring 188.

Spring 188 tends to act through bell crank 186 and links 182 to increase the distance between the two pins 179, the linkage in question being commonly known as a toggle. Movement of pins 179 produces a movement of arms 178 which rock shoes 176 about hinge 177 to press the shoes into contact with drum 174 and so to brake shaft 127. Shoes 176 may be faced with frictional material to increase the braking force. Convenient supporting means (not shown) maintains the brake mechanism in operative position.

Loosely mounted on the shaft 127 is the axially slidable sleeve member 189 comprising a central shell having at one end the flange 192 and at the opposite end the groove 193. Normally the lever 186 is restrained by the engagement of the edge of the lever with the peripheral edge of the flange 192, the spring 188 maintaining this engagement.

Affixed to the shaft 127 is stop arm 194 arranged to rotate within the circle of index pins 148. This arm is formed at 195 to be clamped to the shaft 127 and carries a pin engaging test finger 196 and a sleeve operating rocker 197. Finger 196 pivoted at 198, has at its outer end an inclined face adapted to engage the top of any pin 148 which has been selectively operated toward shaft 127. Rocker 197 pivoted at 203 engages test finger 196 with its outer end and engages groove 193 of the sleeve 189 with its inner end 205 and consequently any rocking motion of rocker 197 is translated into axial movement of sleeve 189. A spring 206 causes the rocker to urge sleeve 189 upward to maintain flange 192 under bell crank 186.

Lever 186 carries on one arm pin 207 in operative engagement with a slot in one arm of reset bell crank 208 pivoted to the framework at 209. The other arm of bell crank 208 carries cam follower roller 212 near but not in engagement with reset cam 213 affixed to printing shaft 128.

Operation of the toggle brake is as follows: Normally the mechanism is as shown in Figures 3 and 10. Upon operating the links 155, a new setting of disks 147 occurs, a selected pin 148 drops in place and printing shaft 128 is released as previously described. Latch 275, Fig. 3, then releases shaft 127 for rotation and stop arm 194 also rotates, the brake being in released position at this time. As the finger 196 engages selected pin 148 the incline thereon lifts finger 196 to rotate rocker 197 and sleeve 189 is shifted downward to the position in Figure 11. This axial movement of sleeve 189 disengages flange 192 from lever 186 and the spring 188 is free to operate the brake, which engages and stops shaft 127 in selected position. Lever 208 is moved and roller 212 approaches cam 213 but does not engage.

Latch 236 now holds the disks 147 in set position and switch 279 de-energizes magnets 151. The correcting wheel 274 is next engaged by latch 275 but exact centering of the typewheels 142 cannot yet take place since the brake 172 is still engaged. With shaft 127 thus held in selected position by latch 275, locking bell crank 236 is released by its cam 227 and all disks 147 return at once to blank position, thus moving the selected pin 148 outwardly.

The brake is now released by the high part of the cam 213 which engages the roller 212 and rocks the bell crank 208 which in turn rocks the lever 186 clockwise to clear the flange 192 of sleeve 189. Sleeve 189 which meanwhile has been urged upward by the spring 206 but has been restrained by engagement with the under side of the bell crank 186, moves upward to the position shown in Figure 10, to be in the path of the edge of the bell crank, since the selected pin 148 is not out of engagement with cam 196. The operation just described resets the brake as shown, in preparation for a succeeding operation, and releases the typewheel shaft 127 to be driven by clutch 132 for its correction step until latch 275 engages the correcting wheel 274. The printing operation now follows as previously described, the combined latch and correcting device 275 holding shaft 127 stationary until the next operation.

It may be observed that the brake just described is similar in many respects to the drum brake used on vehicles, elevators, etc., and has the advantages of being positive, extremely rapid in absorbing energy, non-binding, and simple in construction. It's use on the invention herein disclosed is effective in speeding up the operation of the quotation board by allowing the typewheels to be rotated rapidly from one printing position to another, any adverse tendency of this frequent stopping of a rapidly rotating mass of great inertia being eliminated thereby.

*Local keyboard operation*

The board hereinbefore described is adaptable to either local or remote control. Various methods may be used for either type of operation, examples of which are to be disclosed hereinafter and each has its distinct and novel application.

Under some circumstances, especially where such a board is required in a broker's or an executive's office remote from a central station which transmits quotations for stock board operation, local keyboard operation is particularly applicable. However, this method of operation is recommended only in those cases where the board carries only a relatively limited number, say 30 to 150 stocks. Beyond this it might be found more economical and in the interest of more rapid operation to have the board remotely controlled from the central office which serves a number of such boards, since there will be at such office operating facilities enabling a higher rate of quotation transmission than is possible with a local keyboard, which, it has been found, is not capable of operation at a speed commensurate with present stock market transactions. But, when a board of a relatively small number of stocks is under consideration, there is a great likelihood that quotations on this group of stocks will be received at intervals far enough apart so that an operator can keep up with this small amount of traffic.

For local keyboard operation, there is required, in addition to the board, standard stock ticker service, which in nearly all cases is already installed, and a keyboard of simple construction. The board may be composed of a single unit, as already described of thirty tapes; or of several such units interconnected side by side for operation as a single display. Two methods of interconnection are herein disclosed; first (Figure 26), in which each unit is constructed as already set forth; and second (Figure 27), in which one selecting mechanism suffices to control the entire group of units and in which case changes are made in the construction of the unit, as will appear.

A keyboard applicable to the purpose above stated is illustrated in Figure 20, and details are shown in Figures 21 to 25.

A keyboard of the type adapted to the present object is described and illustrated in a copending application Serial Number 394,067, filed September 20, 1929, by Howard L. Krum.

Referring to Figure 20, a frame 502 serves to carry a group of keylevers 503, suitably guided by means of combs 504 and 505, Figure 21, and pivoted upon the common rod 506, affixed to the frame. Hairpin springs 507, one for each keylever, fixed at one end in a hole in a flange of the comb 505 and resting at other end in a notch of the keylever, normally urge the keylevers upward about the rod 506 against the upstop bar 508, which may be faced with some cushioning material such as leather.

A keytop carried at the end of each keylever denotes the character designation. These are classified into four groups as follows: In the top row, are the section keys, for selecting the section in which the desired tape is located, there being as many section keys as there are sections, in the present case five such keys being shown; in the next three rows are the tape keys, numbered from one to thirty in the present instance, and there are as many of these as there are tapes in a section; in the next row are the keys for characters adapted to print in black including a "low" key and ten numeral keys from 1 to 0; and in the bottom row are the keys for characters adapted to print in red including a "high" key and seven fraction keys from 1 to 7, designating fractions from ⅛ to ⅞. The "blank" key will act to select the typewheel to "blank" and no character will be printed but the tape will space, hence this key is equivalent to a "space" key. Operation of the "low" key will print a black asterisk before or after the associated figure, and operation of the "high" key will print a red asterisk before or after the figure.

Suitably supported upon the framework 502 below and in operative relation with the keylevers 503 is the permutation device 509 similar to that shown and described in the application above referred to. In the present instance, however, the link 37 of that application is replaced by a link 512 of slightly different construction yet similar in function. As described in said application, operation of a keylever 503 imparts longitudinal movement to selected links 512, said links being operated in code combinations determined by the cutting of the code bars underneath the particular operated keylever. The right extremity of each link 512 is provided with a contact closing member 513, Figure 24, adapted to be inserted between the pair of contact springs 514, when any link is operated to the right, and to be withdrawn therefrom upon another operation of a key of the same class. Sufficient friction is present between member 513 and contacts 514 to hold the member 513 therein until withdrawn. Member 513 and contacts 514 are suitably insulated from links 512 and the framework respectively.

A universal bar 515 (Figure 21) is adapted to be operated by all of the type-selecting keylevers 503C, and through its link 517 is adapted to close contacts 516 only for the time that the keylever is held depressed. This latter mechanism is substantially identical with the bar 40 and contacts 44 of the above mentioned application.

For convenience in reference, keylevers of the first class for section selection will be referred to by 503A; keylevers of the second class for tape selection by 503B; and keylevers of the third class for type selection by 503C; and their related contact closing members and contacts by 513A, 513B and 513C and 514A, 514B and 514C respectively, Figure 26.

Directing attention to Figure 21, the section-selecting keylever 503A there shown is provided with a cut out portion so that it may operate only the group of five pairs of code bars 510a at the rear of the keyboard. In Figure 22 the tape-selecting keylever there shown is cut out at two places so that it may operate only the center group of five pairs of code bars 510b. In Figure 23, the type-selecting keylever is cut out to permit it to operate only the front group of five pairs of code bars 510c.

Referring to Figure 26, one contact of each of the pairs 514 is connected over a common wire 522 to positive pole of battery 523, the negative pole being connected to ground. The remaining contact of each of pairs 514A is connected over conductors 524 through windings of each section relays 525, to ground. Remaining contacts 514B are connected by means of the bus wires 526 and branches 527 to points 528 of relays 525, the opposite points being connected over wires 529 to tape selecting magnets 151' (compare Figure 3) the other terminals of magnets 151' being connected to ground over common wire 532. Remaining contacts of the pairs 514C are connected over bus wires 533 and branches 534 to points 535 of relay 525, the opposite points being connected over wires 536 to the typewheel selecting magnets 151 and the ribbon shift magnet 362, the other terminals of those magnets being provided with a return path over conductor 537 contacts 279 (compare Figure 3), conductor 538, and contacts 516 to ground.

*Keyboard operation*

Briefly, a first-class key renders a sole section operable; a second-class key selects a tape; and a third-class key selects a type and a color, and then prints.

Assume that the quotation "WU 245½" is to be posted, this message having been received upon the ticker tape. The operator, from a knowledge of prior quotations knows that this is a new "high" quotation and accordingly edits the message mentally to read "WU—High—245½," and the operator also knows that WU on his board occupies a position for example, in section 1, tape 14. He therefore completes his editing "1—14—High—2—4—5—4/8" and operates the keys, Figure 20 as follows:

Operation 1: Depresses key 1 (first-class) in row 1
Operation 2: Depresses key 14 (second-class) in row 3
Operation 3: Depresses key "high" in last row
Operation 4: Depresses key 2 in row 5
Operation 5: Depresses key 4 in row 5
Operation 6: Depresses key 5 in row 5
Operation 7: Depresses key 4 (4/8=½) in last row.

The mechanical and electrical sequence of operations is as follows: (See Figure 26.) Operation 1: By the first-class key 1, the fourth member 513A (which had been operated previously by a first-class key to control section 4) is withdrawn and top member 513A is inserted in contacts 514A individual to section 1, whereupon section relay 525' releases its armature and section relay 525 is charged over an obvious circuit and operates its armature to close its points 528 and 535, and remains so operated until de-energized by some succeeding operation.

Each section is provided with its individual pair of contacts 514A. However, by providing that the operation of section keylevers will set the five available members 513A in coded combinations, thirty-two sections may be made selectable, in which case it would be necessary to use a permutation device external to the keyboard for selecting the section. Such a device is illustrated in Figure 44. Application of that device to the present method of operation will become obvious from the description of that figure.

By release of relay 525', magnets 151' of tape selector 222 of section 4 are released and shaft 129 rotates freely. By operation of relay 525, magnets 151' in section 1 are operated to the prior tape-selection key. The shaft 129 of section 1 is stopped in the position determined by operated members 513B, Figure 26. This will be changed, as follows:

Operation 2: The members 513B which require changing are changed by the second-class key and the new code combination for tape #14 is set up. Circuits are simultaneously closed from battery 523, over conductor 522, closed pairs of contacts 164B, bus wires 526, branches 527 closed points 528 of relay 525, conductors 529, magnets 151' to ground over wire 532, whereupon the selection in the selecting device 222, Figure 3 is changed to the new selection and the tape selection shaft 129 is released and rotates to position a finger 223 (Figure 3) in printing position at tape 14. This selection is not disturbed by the operation of third-class keys for printing.

Operation 3: The members 513C are operated by a third-class key in a manner similar to the members 513B it being noted that depression of "high" key closes the fifth or last pair of contacts 514C, the left or front bars in Figure 21 and the lowest plunger 513C in Figure 26. Circuits are thereupon closed from battery 523 over conductor 522, closed pairs of contacts 514C, bus wires 533, branch 534, closed points 535, of relay 525, conductors 536, to magnets 151, to ground by way of conductor 537, closed contacts 279, conductor 538 and contacts 516. Plungers 513C remain in contacts 514C but the circuits of magnets 151 are opened at points 516 when the third-class key lever is released by the operator. The new type-selection thus is set up, the printing shaft is started and color-shift shaft 327 operated, and a red asterisk is printed on tape #14 of section 1, after which the tape steps two character spaces.

Should a third-class key be held down, the printing shaft would rotate indefinitely and print the selected character at each revolution. Each third-class key must be depressed at the time or subsequent to the time when the prior figure is printed and the shaft 128 stops, that is, when switch 279 is closed.

Operations 4, 5 and 6. These three operations are similar to operation 3, except that the magnet 362 is not operated, and the numerals 245 are printed black.

Operation 7: This is similar to operation 3, the fraction ½ being printed in red, a double spacing operation occurring after this impression, to allow space between this and the succeeding quotation.

From the preceding description of a typical sequence of operations it is evident that printing of prices may proceed indefinitely once the stock tape has been selected.

Alternative operation

An alternative arrangement for operation of the board is illustrated in Figure 27, like reference numbers referring to like parts in Figures 3 and 26.

In this modified form only one section is constructed as in Figure 3, the remaining sections being controlled therefrom.

In this modification the shafts 127 and 129 are provided with gears 552 and 553, respectively, affixed thereto, in mesh with gears 554 and 555, respectively, affixed to cross shafts 556 and 557 disposed at the front and rear of the board and suitably journalled in the framework. Shafts 556 and 557 are broken between the sections to facilitate the coupling of board units, couplings 101 being provided therefor.

Keyed to each section of shafts 556 and 557 individual to the remaining board sections are the gears 554' and 555', respectively, in mesh with gears 552' and 553' affixed to the type-selecting shaft 127' and tape selecting shaft 129' of these sections. Shafts 127' and 129' have no selecting device of their own, the received selection being set up simultaneously on all sections, and only the section in which the desired stock tape is located being operated for the printing function.

In the present instance the printing shaft release lever 228 is omitted and substituted therefor in every section is the pivoted latch 558, the latch being provided with an armature extension adapted to be operated by release magnet 559, one terminal of each of which is connected over a wire such as 524, and the other to the common wire 537. The function of magnet 559 and latch 558 is to trip the printing shaft 128 in the desired section solely for each character printed.

For operation of the ribbon shift shaft 316, the armature 363 (Figures 3 and 27), is provided with a forward extension 562 to which is connected the common link 563. In the additional sections pivoted in a position corresponding to the pivot point of armature 363, are the latches 564, adapted to replace the armature 363 in said sections. The link 563 is pivotally articulated to said latches so that the tripping movement of armature 363 initiated by the operation of magnet 362 is communicated to all latches 564 to release the shafts 316 individual thereto.

In operation, the tape selection is obtained on all sections by means of geared connection to a sole selector 222. The selected section is determined by preparing a circuit over wire 524 for section magnet 559. Character selection is obtained on all sections by means of geared connection to a sole selector 143. Ribbon shift shaft 316 is tripped when necessary in all sections through the medium of link 563 and latches 564. Printing will occur only on the selected tape in that sole section which has its magnet 559 prepared over a wire 524, the circuit of said magnet being completed over conductor 537 simultaneously with the character selection to trip the selected printing shaft for the printing operation.

Stock and price selector

The quotation board may be operated from a remote station under the control of a six unit permutation code as used for tickers.

The apparatus employed is shown in Figures 28 to 32, and comprises a selector mechanism essentially of the type described and claimed in U. S. Patent No. 1,821,110, issued to S. Morton, et al., except that in the present embodiment the selector is adapted to control a series of selector bars 762 instead of a series of code discs. The selector bars 762 in turn are adapted to control a signal-translating mechanism which in turn may control stock selector and price mechanism.

Signals generated primarily for the operation of six-unit-code tickers may operate the stock-and-price transfer device. This invention also ignores signals generated for ticker operation and not required for operating the quotation board.

The selector-translator is operated on the "start-stop" principle. The code is a six unit "start-stop" code, which consists of six selecting impulses used in various combinations of marking and spacing conditions. In ticker operation, the sixth selecting pulse is known as the "shift" pulse and controls alternatively the printing of "letters" or "figures." In the present invention the sixth or "shift" impulse is utilized also to distinguish between the stock selection and the price selection by controlling a novel escapement mechanism. This facility results from the use of only "letters" for stock identification and only "figures" for prices.

The receiving selector mechanism shown in Figure 28 operates under the control of a sole polarized electromagnet 701 responsive to code combinations of marking and spacing conditions to oscillate its armature 706. The armature co-operates with the flutter lever 711 which is oscillated by a flutter cam 722 carried by the selector cam drum 723.

Cam drum 723 is arranged to be rotated on the start-stop principle and is sleeved to slide axially upon its shaft. The code impulses received over the line operate the cam drum in either a left or right direction to allow its cams to actuate the six selector levers 744 into various permutations of either of two operative positions corresponding to the marking and spacing intervals of the code.

After the selector levers are set in selective combination, a series of T-levers 751 carried by a transfer bail 757 are brought into engagement with two projections of the selector levers 744 whereby said T-levers are rocked either clockwise or counter-clockwise depending upon which leg of the T-lever engages one or the other of the projections on the selector levers.

Up to the point of the transfer operation, the operation is identical with that of the copending application cited.

In operative relation with five of the T-levers are five selector bars 762. A rounded head on each T-lever engages a slot in one end of each selector bar to operate the bars into code combinations in response to the operation of the T-levers.

In the selector of the copending application there is a sixth special T-lever to perform the shift operation. In the device of the present invention there are two bell-crank members bearing some resemblance to the T-levers but operating in the following manner.

The sixth selector lever 744 is served by a pair of bellcrank levers 752 and 753. The bellcrank 752 is adapted to have abutting relation with one arm 746 of sixth selector lever 744 when the signal impulse is of spacing nature, so that the bellcrank 752 will be rotated to effect the movement of bar 764 to the right against spring 765.

Likewise, the bell crank 753 is adapted to have abutting relation with one arm 747 of sixth selector lever 744 when the signal impulse is of marking nature, so that the bellcrank 753 will be rotated to effect the movement of bar 763 to the left against the action of spring 750. In this instance, bar 763 will be held in its left position by the engagement of holding pawl 766 and notch 770.

Thus the selector bars 762 and actuating bars 763 and 764 are adapted to be shifted to either their right or left positions in accordance with received code combinations. These bars are freely supported for shifting motion endwise in suitable comb bars 773 fixed to the framework of the apparatus.

It is the function of the bars 763 and 764 to assist in piloting the selection of a series of "letters" and "figures" code bars. The "letters" selection is set up on a series of fifteen double code bars 780, five such double bars being allotted to each of the three letters comprising a maximum length of symbol for one stock.

A "letter" and a "figure" may be represented by the same combination of the first five elements of the code. The only distinguishing feature between the "letter" and the "figure" code is the nature of the sixth element, whether spacing or marking, respectively. Means in the form of a novel escapement mechanism has been provided for utilizing this sixth element or "shift" pulse to control the transference of five elements of the code to the "letters" or "figures" code bars, which will now be described.

The sequence shaft 774 (Figure 28) is adapted to carry a series of sequence cams (Figure 29) whose function is to control the sequence of the several operations. On shaft 774 (Figure 28) is spiral gear 775 driven by motor 730 through intermediate gears 732, 731, 778 and 776.

Meshing with gear 776 and opposite to gear 775 is a spiral gear 779 which is mounted for rotation on operating shaft 781.

Rotation is imparted to the shafts 774 and 781 by the gears 775 and 779, respectively through the medium of friction clutches of any desired type.

In Figures 28 and 29, shaft 774 is adapted to stop in four positions, at quadrature. To provide for stepping quickly from one to another of the positions, the gearing is such as to give shaft 774 a speed equal to (say) four times that of shaft 781. Or all cams and ratchets on shaft 774 may be manifolded to reduce the angle of each step. See Figure 28—B and parts 802—B, 803—B, 804—B, 849—B, 852—B.

Fixed to shaft 781 is stop disc 782. In the operation of the selector mechanism of cam drum 723, cam 787 makes one revolution for each code received. Cam follower 793 is added. Its spring 795 through follower 793 and linkage at pivot 798 urges trip lever 796 to rock upon pivot 797 to engage the tooth of stop disc 782 and thus to stop the shaft 781.

When cam 787 rotates, follower 793 will be forced downward, giving rotation to the trip lever 796, and releasing disc 782 with consequent starting of operating shaft 781.

Mounted on shaft 774 is the escapement assembly 700, which comprises a four-tooth ratchet 804 having teeth at quadrature; a three-tooth ratchet 803 having teeth in angular alignment with three of the teeth of ratchet 804; and a one-tooth ratchet 802, having its single tooth in angular alignment with the fourth tooth of ratchet 804.

In operative relation with ratchets 802, 803 and 804 are the escapement pawls 805, 806 and 807, respectively, all supported on a common pivot shaft 808. Pawl 807 has arm 809 adapted to engage the pawls 805 and 806 in such fashion that the rotation of pawl 807 to engage ratchet 804 (Figure 28) will cause a movement of pawls 805 and 806 to disengage ratchets 802 and 803. Thus when pawl 807 is actuated it will trip pawls 805 and 806 thereby permitting shaft 774 to be stepped through one-part-step of any desired angle.

Pawl 807 is also provided with arm 811 to which is pivotally connected link 812 which is pivotally connected also to one arm of bellcrank 813. The other arm of bellcrank 813 enters a notch in the actuating bar 764 and is adapted to be loosely articulated therewith.

Pawl 806 has its lower end connected by link 833 to bellcrank 831 pivoted at 832 and having one arm engaged in a notch in bar 763. Spring 834 normally holds pawl 806 in engagement with ratchet 803.

Thus when the bar 764 is operated to the right by its associated bellcrank transfer lever 752, rotation is given to pawl 807, thereby withdrawing pawls 805 and 806 from ratchets 802 and 803, and introducing pawl 807 into ratchet 804, thereby permitting the ratchets, and hence the shaft 774, to rotate one-part-step due to friction clutch associated with gear 775. This release movement of pawl 806 does not move the bar 763.

The return of bar 764 to normal position will rotate the pawl 807 to normal position and will release the ratchet 804 and permit pawls 805 and 806 to engage their ratchets 802 and 803, due to springs 836 and 834. The shaft 774 thus is permitted to rotate a further part-step until checked by the engagement of pawl 806 with its ratchet tooth, making a full-step of 90° angle.

The lone tooth on ratchet 802 supplements the three teeth on ratchet 803; and operation of link 812 will cause ratchets 802, 803 and 804 and their associated pawls 805, 806 and 807 to function as a unit in customary escapement fashion.

Such is the action of the escapement mechanism while "letters" signals are being received, the actuating bar 764 being moved to its right position briefly each time a "letters" signal is received.

The function of the particular construction of the escapement mechanism as shown in Figure 28 is to permit a transition from the stock selection to the price transfer regardless of whether the stock selection or symbol has recorded one, two or three letters and without sending blank signals to make all symbols equal in length. The escapement mechanism 700 controls the angular setting of sequence shaft 774 to effect the transfer of the code-combination set up on the selector bars 762 either to the "letters" code bars 780 (Figure 29) or the "figures" code bars 828.

When sequence shaft 774 has been rotated step-by-step until ratchet 802 engages pawl 805, the shaft 774 is in its zero-angle position to transfer a price indication or figure selection. Now, should the stock selection comprise only one letter the shaft 774 must be rotated from its first "letters" position at 90 degree angle to its "figures" position at zero angle. This is accomplished as follows:

After the first "letters" signal sequence shaft 774 is in 90° angle. The "figures" signal contains a sixth pulse of marking nature which will operate bar 763. Bar 763 will operate bellcrank 831, link 833 and pawl 806. Pawl 806 being thus disengaged from ratchet 803 at 90° angle, and then held in this disengaged position due to the engagement of holding pawl 760 with notch 770, the sequence shaft 774 will be free to rotate until ratchet 802 engages the pawl 805 which pawl is normally held in operative relation with ratchet 802 by spring 836. The shaft 774, thus turns to zero angle, as shown, which is the position for serving "figures" codes. Shaft 774 remains at zero angle for all "figures" codes.

Fixed on the sequence shaft 774 is the trip-off cam 837 adapted to cooperate with a trip-off lever 838. Lever 838 is pivoted at 839 and normally tends to rotate, under tension of spring 844. Lever 838 is adapted to cooperate with arm 845 of the holding pawl 760. As shaft 774 leaves zero angle, the notch of cam 837 releases lever 838, and spring 844 operates lever 838 to lift arm 845 to remove pawl 760 from notch 770, thus releasing bar 763 to move right by power of spring 750. Motion of bar 763 right rotates bellcrank 831 which through link 833 rotates pawl 806 into ratchet 803 to engage that ratchet to stop sequence shaft 774 at 90° angle.

In Figure 29 are two series of code bars 780 and 828. The first series consists of fifteen double code bars 780 comprising three groups of five double code bars each, hereinafter called left-five, middle-five and right-five, respectively, each group representing a letter in the stock indication or symbol. The second series comprises five notched code bars 828 and represents the "figures" or price indication of the stock quotation.

All of these code bars are slidably mounted on suitable comb-bars (not shown). Parallel to the code bars 780 are ten selector bars 848. The left-five bars are adapted to generate signals to control the selection of the section of stock board in which a particular printing tape is located, and the right-five bars are adapted to control the selection of the tape. Parallel to the "figures" code bars 828 are five selector bars 830. These bars are adapted to generate signals to control printing upon a selected tape.

The function of cams on sequence shaft 774 is to cooperate with associated cams on operating shaft 781, to control the operation of cam followers in a way such that an individual follower is first prepared for operation by a sequence cam and then is caused to operate upon rotation of the operating cam.

Sequence shaft 774 is adapted to assume one angular position for each one of the three "letters" and a position for "figures" making in the present embodiment a total of four positions. There is a sequence transfer cam provided to operate in each angular position of the shaft. These transfer cams are so adjusted that in any one angular position of the shaft only one transfer cam will permit the functioning of its associated tripper bail, 850 for example, all the other transfer cams at this time blocking their associated operating levers from functioning.

With sequence shaft 774 in its first "letters" position, at 90° angle, sequence cam 849 (Figure 29) which is cam "849 of first letter" will have its notch opposite its follower to permit operation of tripper bail "850 of first letter" identified with left-five code bars 780. Next when sequence shaft 774 assumes its second "letters" position, at angle 180°, a second sequence cam (similar to 849) associated with the middle-five code bars 780, will set its notch so as to permit the operation of the tripper bail (similar to 850) identified with the middle-five code bars 780. When the sequence shaft is at angle 180°, the first cam 849 at 180° will prevent the operation of the bail 850 for the first letter group.

Likewise, sequence shaft 774 in third "letters" position at angle 270° and finally in "figures" position at zero angle will in turn bring the respective sequence cams into their predetermined positions to permit the operation of their individual bails 850. Thus no two of the sequence transfer cams simultaneously permit the operation of their associated followers.

In like manner, sequence cams are provided for estopping other operations. For example, sequence cams 852 estops restoring the fifteen "letters" code bars 780 except when sequence shaft 774 is at zero angle.

Each selector bar 762 is provided with a series of lugs 854, one such lug for one bar of each group of five code bars 780 and 828. Each lug assumes either of two positions, either under its trip lever 855 or not under, resultant upon the code setting of its bar 762 by the transfer levers 751.

Associated with each lug 854 is a trip lever 855 and its spring 861. Levers 855 are pivotally mounted on a common shaft 856 suitably mounted in the frame of the apparatus. Each lever 855 is provided with an arm 857 to span the five selector bars 762 and to extend into a slot in the associated transfer bail 850, and is provided also with a vertical arm 858 adapted to cooperate with a code bar latch member 859.

Latch members 859 are pivotally mounted on a common pivot shaft 862 and are provided with individual springs 866. Each latch has a horizontal arm adapted to cooperate with a notch 864 in the associated code bar. Each latch 859 is also provided with a lug to engage arm 858 of lever 855.

Bails 850 are mounted on a common pivot shaft 867. Each bail 850 is provided with an arm 868 under its associated sequence cam 849 and extending beneath common operating bail 871. Each bail 850 is provided with a slotted portion adapted to retain a group of five trip levers 855 against tension of springs 861 and out of engagement with lugs 854. Each arm 868 carries follower roller 872 and a spring 874, maintains follower roller 872 against sequence cam 849.

The operating bail 871 which is of substantially U-shaped form is pivotally mounted at 876. It carries follower roller 877 engaging the operating cam 879.

The normal tendency of bail 871 is to hold follower roller 877 against cam 879, the power being supplied by that one of springs 874 whose follower roller 872 is opposite a cam-notch so that arm 868 is free to engage bail 871.

*Operation.*—Briefly, the selector mechanism of Figure 28 sets the code bars 762, steps the sequence shaft 774 and starts the operating shaft 781. The operating shaft transfers the bar-setting code to that set of code bars which is indicated by the sequence shaft.

Assume that the first "letter" code has been set on the bars 762 and 764, and that the sequence shaft was at zero angle, then the sequence shaft starts, the operating shaft starts, and the sequence shaft stops at 90° angle.

The presence or absence of a projection 854 below a trip lever 855 determines whether the trip lever will be permitted to effect the unlatching of its code bar 780. A similar code condition occurs simultaneously under every group of five code bars 780 and 828, but only that group will be affected which is determined by the position of the sequence cams.

In the present instance, the first-five "letter" code bars 780 will be affected due to the setting of the sequence transfer cam 849 at 90° angle to permit the operation of the bail 850 shown. The other three sequence transfer cams (not shown) are so set at this time as to prevent the operation of their respective bails (similar to bail 850).

The rotation of the operating cam 879 will release the follower roller 877 and will permit the bail 871 to rise thereby permitting transfer bail 850 to operate. Trip levers 855 released by bail 850, if unsupported by any lug 854, will operate to trip latches 859 which release associated code bars 780. Each of the released code bars 780 will be moved backward by the action of its individual spring 881. Code bars 828 are likewise provided with springs 882.

The transfer of the succeeding "letters" code combinations, if any, comprising the stock indication or symbol will be effected in a similar manner. Thus the setting of the code bars 780 to correspond to the code combination of a particular stock indication will produce an alignment of notches on those code bars to effect the selection of a particular stock rod 883. Code bars 780 are notched on both upper and lower edges to increase the capacity of the apparatus or to lighten the bar by reducing it to half length.

The stock rods thus selected are adapted to be utilized in various ways, for example, either to block other selector bars or to close contacts to effect directly the selection of a particular stock in a quotation board. That is, that part of the apparatus to the left of the bars 780 in the figure can be constructed to suit the particular use of which the apparatus is to be adapted. Such adaptations will be described.

Provision is made to restore the code bars 780 to their normal latched position after the selection set up thereon has been transferred to further devices to be described.

Associated with and adapted to span all of the code bars 780 is the reset bail 884, pivoted on a shaft 887 and provided with an arm 888 on which are mounted follower rollers 889 and 891 adapted to cooperate with operating cam 892 and sequence cam 852. Hence, the reset bail can not operate while successive "letters" are being received, but operates only when cam 852 is in zero angle and cam 892 is passing 260° angle.

Similarly, the group of "figures" code bars 828 also are provided with a reset bail 895 adapted to be operated through a lever 896 by an operating cam 897 at every revolution of shaft 781.

The stock rod 883, comprises a rod adapted to carry thereon a plurality of flanged sleeves 901, one such sleeve for each bar 780. The bars of the pair are spaced by means of members 902 at each end. The bars are notched in complementary manner, the notches of one bar being opposite the teeth of its related bar.

Flexibility of code combinations is obtained by the use of the sleeves. Any sleeve 901 set with its flange over a tooth in the bar will require a marking signal to move that bar, or it may be reversed on the rod 883 so that its flange portion is over a notch, when it will require a spacing signal to maintain the bar unmoved to permit the stock rod to operate. The fifteen code bars 780 may be set in more than 30,000 code combinations, and any specified stock bar 883 may be adjusted to respond to any one of the 30,000 code combinations by reversals of the flanged sleeves 901.

Rod 883 is hooked at one end and the tip of the rod is pointed. Rod 883 thus is adapted to fit into a slot in a comb bar 903 with its pointed end 904 engaging a hole or dimple directly opposite the slot, and to rotate about its end 904 as a pivot point.

Between a collar 905 fixed to rod 883, Figure 30, and the comb bar 903 and surrounding the rod is a compression spring 906, adapted to give the rod motion about its end 904 as a center, thus urging the rod into operative engagement with the double bars 780.

Stock rods 883 are adapted to be utilized in various ways, one of which is shown in Figure 29 and another shown in Figures 31 and 32.

Referring to Figure 29, the stock rods 883 are provided with extended ends adapted to span a set of ten selector bars 848. By means of the adaptation shown in Figure 29, the received stock symbol of one, two or three letters is translated into a two-letter or two-code stock symbol, in which the first code indicates the section of the board in which the stock tape is located, and the second code indicates the stock tape.

The top and bottom edges of the bars 848 are provided with lugs 907 arranged in coded combinations adapted to cooperate with the extended ends of the stock rods 883.

Each selector bar 848 is provided with individual spring 909 which urges the bar to the right. All bars 848 are held left by a bail 911 adapted to engage a notch 912 in each bar 848. Bail 911 is pivotally mounted on shaft 913, and is operated by link 914 which carries cam-follower rollers 919 and 921 controlled by cams 915 and 916.

In addition to the projections 907, the bars 848 each have two lugs 922 and 923, the lugs being aligned in two rows. Each lug is adapted to engage an arm 924 or 925 on a transfer lever 926 associated with each bar 848.

Each transfer lever 926 is in the plane of the selector bar 848 above it, and is pivotally mounted on a common pivot shaft 927 carried by bellcrank 928. Bellcrank 928 is pivoted on shaft 931 and is operated by cam-follower 934 to which it is attached pivotally at 929.

Cam-follower 934 is controlled by cam 937 and cam 938.

Each of the transfer levers 926 is provided with a head 944 projecting into the bifurcated end of lever 946 one such lever being provided for each of the ten transfer levers 926. Levers 946 are pivoted on a common shaft 947 mounted in the frame of the apparatus. End 948 of each lever 946 is pointed to coact with an individual jockey lever 949, pivoted on the common rod 950 and urged toward end 948 by spring 943.

Each lever 946 has a lug 951 adapted to control switch points 952 individual to each lever 946.

Lugs 922 and 923 are spaced closer together than lugs 924 and 925 so that only one or the other of lugs 922 and 923 can engage associated lever 926.

The setting of the code bars 780 may allow one stock rod 883 to drop into the aligned notches thus causing the extended end of the selected stock rod to fall into the path of the lugs 907 on bars 848. When one letter code has been set on the first set of five bars 780, the remaining ten bars 780 being set to the equivalent of ten spacing signals, a rod 883 may operate. When a second letter code has been set on the second set of five bars 780, the remaining five bars being set to the equivalent of five spaces, the first-operated rod 883 if any will be lifted due to the camming action of the second set of five bars 780, and a different rod 883 may operate. When a third letter code has been set on the third set of five bars 780, the second-operated rod if any will be lifted and another rod 883 dropped, if any. Should it be that no rod has its sleeves 901 adjusted to correspond to the code combination set up on the fifteen bars 780, then no rod will operate and subsequent operation of cams 915 and 937 will open all points 952.

A fourth "letter" or a first "figure" will advance cam 916 to zero angle, shown, with its notch presented to roller 921, and will start the operating shaft 781 to transfer the code to bars 828.

By rotation of cam 915 with cam 916 at zero angle as shown, link 914 and bail 911 will be operated to release bars 848. Assuming that a rod 883 is in operated position, obstructing some of bars 848 by engagement with lugs 907, then obstructed bars 848 will not move and unobstructed bars 848 will move under the pull of individual springs 909. Thus the ten bars 848 will attain a code setting which constitutes a translation of the code set upon the bars 780. In the case of unshifted bars 848 the lugs 922 remain directly above their associated lugs 924 on the transfer lever 926; and in the case of the shifted bars 848 their individual lugs 923 are above lugs 925.

While bars 848 remain set in code manner by cam 915, the ten transfer levers 926 are moved to and from the selector bars 848 by cam 937. Link 934 follows cam 937 because sequence cam 938 at zero angle or "figures" position as shown presents its notch to the follower roller on link 934.

Engagement of a rod 883 with a lug 907 will obstruct the corresponding bar 848 and will produce a marking signal in the translation-code.

Upon an unshifted bar 848, lug 922 (marking) will be in abutting relation with lug 924 on lever 926, and lever 926 will rock counter-clockwise, thus rocking lever 946 clockwise to close points 952.

Upon a shifted bar 848, lug 923 (spacing) will be in abutting relation with lug 925 on lever 926, and lever 926 will rock clockwise, thus rocking lever 926 counter-clockwise to open points 952.

Jockey levers 949 under the influence of springs 943 retain the contact levers 946 in their selected position until a succeeding transfer operation, and preserve the setting of points 952.

The stock indication thus having been translated and transferred to points 952, the bars 848 are returned to their normal position by the reset bail 911 under the control of cam 915. The double code bars then are reset to normal (right) by bail 884 operated by cam 892 just before shaft 781 reaches its zero angle, the sequence cam 852 being then in zero angle. The bars 780 engage their latches 859 and remain reset.

One advantage of the translation from a three-character symbol to a two-character symbol is that it requires fewer line signals and is better adapted to line transmission, and increases the time for printing. A two-character code gives a possible 900 stocks, sufficient for most cases. It also has an advantage in simplifying the stock selector, as one character can be used to select a section of the board and another to select the stock in a section.

The "figures" code bars 828 are operated in a manner similar to the operation of bars 780.

Like the "letters" code bars 780, the "figures" code bars 828 are adapted to be operated in response to received code combinations in a similar manner, the code bars 828 being latched in their unselected position by a latch 961 (Figure 28) against the tension of springs 882 individual to each code bar.

Arranged across the code bars 828 are rods 963, Figure 29, similar to stock rods 883, but with plain sleeve members 964.

Parallel to the five code bars 828 are five bars 830 which are analogous in construction and function to the bars 848. Also, there is provided a set of transfer levers 930, similar to levers 926, adapted to cooperate with bars 830 in a manner similar to parts 926 and 848. Bars 830 are controlled by bail 910 in a manner similar to parts 848 and 911, and bail 910 is controlled by a cam (not shown) similar to cam 915 but without any sequence cam so that bars 830 operate at every revolution of shaft 781. The five transfer levers 930, one for each bar 830, cooperate with five levers (not shown) such as 946 and with an additional five pairs of points 952. Levers 930 are controlled by a cam (not shown) on shaft 781, similar to cam 937 but without any sequence cam so that levers 930 operate at every revolution of shaft 781.

Having reference to Figure 28, it is observed that the code bars 828 are extended forwardly and are provided with code notches. Across the bars are a group of rods 966 similar to rods 963, except that the rods 966 are provided with tips 967 insulated therefrom. Positioned below each tip 967 is a brush contact 968 of the knife switch type. When a rod 966 is permitted to drop into alignment of notches occurring beneath it, its tip 967 is brought into the two parallel brushes of the associated contact 968. These contacts 968 may control the selection of certain ones of a group of tapes individual to a stock, such as is the case for instance where the various range characteristics of a stock, such as "high," "low," and "last," are given.

In Figures 31 and 32 are shown further adaptations of the stock rods 883. Each stock rod 883 is provided with a tip 981 insulated therefrom adapted to cooperate with individual contact 982 or 983 of the knife switch type.

In Figure 31 each rod 883 is shown as cooperating with a single contact 982, and in Figure 32 each rod is shown as cooperating with a double contact 983.

These contacts, namely 968 of Figure 28 and 982—983 of Figure 29, are used by the systems illustrated in Figures 54 and 55 and it will be convenient to describe their functions in connection with the description of those figures.

In Figure 29, mounted upon the operating shaft 781 is shaft 977 which operates the follower-lever 978 to control the contact 979. Such a contact will be operated at every revolution of the shaft 781. This is an omnibus arrangement and it will vary according to the requirements of the variant systems in which the selector of Figures 28–29 may be embodied. The timing of the contact will be determined by the contour and by the angular setting of the cam upon the shaft 781. See cam 1010 on shaft 781 in the system of Figure 34, cam 1100 on shaft 781 in the system of Figure 37, and cam 1585 on shaft 781 in the system of Figure 45.

The function of the selection bars 848 is to translate the code for the stock indication into another form, to effect first the selection of the section in which the particular stock appears and then the particular tape representing that stock. It is sometimes possible to control the particular stock without translation into another code, in which event the adaptation shown in Figures 31 and 32 is employed. In the latter case it is possible to control quotation boards of the type in which each stock is independently controlled by a single magnet.

*Operation of stock and price selector*

It will be assumed that a stock quotation ATR 2½ is to be received. The normal stop position of the stock and price selector is as shown in Figures 28 and 29 a code for "figures" having been served last, with shafts 774 and 781 in zero angle, and with bars 780 all normal and latched. The sequence of operations for ATR 2½ is as follows:

The code signals for A are received serially by magnet 706 and cam barrel 723 and are stored upon selector levers 744, Figure 28.

First letter: Simultaneously, all of the signals of the code for A are transferred to bars 762 and 764. Operating shaft 781 is started by cam 787. Sequence shaft 774 is started by pawl 807.

Sequence shaft 774 turns quickly and stops at 90°. Bars 848 are blocked by sequence cam 916. Levers 926 are blocked by sequence cam 938. Bars 830 start forward by bail 910, then transfer levers 930 start up by a cam (not shown) similar to cam 937 and transfer is effected from bars 830 to a set of five points 952. Levers 930 return and bars 830 return.

Bail 884 is blocked by sequence cam 852. Bail 895 operates by cam 897 and restores bars 828 if any were found unlatched.

Bail "850 of first letter" then moves downward by cam 879 cooperating with cam "849 of first letter," at 90°, thus effecting transfer of code for A from bars 762 to the left-five bars 780. Bail 895 returns and bail 850 returns and shaft 781 stops.

The condition of parts after transfer of first letter is: Shaft 781 is at zero angle. Shaft 774 is at 90° angle. Had a figure code been stored on bars 828 and indicated by a rod 963 in operated position, then that code now is stored upon the figure code five points 952, having been transferred by bail 910 and levers 930. Bars 828 now are normal and latched, by action of cam 897. No rod 963 is in operated position. Code for A is stored on the left-five bars 780, the remaining ten bars 780 being now normal and latched. That stock rod 883 which is identified with the section and tape selection for "Atchison, Topeka, & Santa Fe Railway" is in operated position, complying with the mechanical requirements of this invention in the case that "A" should be the total index of the stock, in which case the next code would be "figures" for record upon the tape individual to "Atchison" whose ticker code is "A." The succeeding code has been received by magnet 706 and cam barrel 723, in overlap relation with the stock-and-price selector, and now is stored upon selector levers 744, Figure 28.

Second letter: The code for T now is transferred from selector levers 744 to bars 762 and 764. Operating shaft 781 is started by cam 787. Sequence shaft 774 is started (from 90° angle) by pawl 807 and moves quickly to 180° angle, thus moving cam "849 of first letter" to estop its follower and moving cam "849 of second letter" to free its follower.

Bars 848, levers 926 and bail 884 are estopped by sequence cams 916, 938 and 852.

Bars 830 start forward by bail 910, all bars moving since all rods 963 are up. Levers 930 move upward and operate to open all of the figure-five points 952, then levers 926 return and bars 830 return. Bail 895 restores bars 828.

Bail "850 of second letter" now starts downward by operating cam 879 and sequence cam "849 of second letter," levers 855 and latches 859 transfer the code for T to middle-five bars 780, and bail 850 returns. Shaft 781 stops.

The condition of parts after transfer of second letter is: Shaft 781 is at zero angle. Shaft 774 is at 180° angle. Points 952 all are open. Bars 828 are all normal and latched. Codes for AT are stored on the left-five and middle-five bars 780, the right-five bars 780 being normal and latched. The stock rod 901 for "Atchison" has been lifted by the code change in the middle-five bars 780 and now that stock rod 901 which is identified with the section and tape selection for "American Tobacco Company" is in operated position, complying with the mechanical requirements of this invention in the case that "AT" should be the total index of the stock in which case the next code would be "figures" for record upon the tape individual to "American Tobacco" whose ticker code is "AT."

The succeeding code now has been received by magnet 706 and cam barrel 723, in overlap relation to the stock selector, and now is stored upon selector levers 744.

Third letter: The code for R now is transferred from selector levers 744 to bars 762 and 764. Shaft 781 is started by cam 787. Sequence shaft 774 is started (from 180° angle) by pawl 807 and moves quickly to 270° angle thus moving cam "849 of second letter" to estop its follower and moving cam "849 of third letter" to free its follower.

Bars 848, levers 926 and bail 884 are estopped by sequence cams. Bars 830, levers 930 and bail 895 operate in order and leave the figure-five of points 952 open since no code was set up for bars 830.

Bail "850 of third letter" now starts downward by cam 879 and sequence cam "849 of third letter"; levers 855 and latches 859 transfer the code for R to right-five bars 780, and bail 850 returns. Shaft 781 stops.

The condition of parts after transfer of third letter is: Shaft 781 is at zero angle. Shaft 774 is at 270° angle. Points 952 all are open. Bars 828 are all normal and latched. Codes for ATR are stored on the fifteen bars 780. The stock rod 883 for "American Tobacco" has been lifted by the code change in the right-five bars 780 and now that stock rod 883 which is identified with the section and tape selection for "Amsterdam Trading Company" is in operated position, the ticker code for that stock being "ATR." A selective combination of bars 848 are obstructed or potentially latched by the operated stock rod 883.

The succeeding code now has been received and stored upon selector levers 744.

First figure: It is desired to store this code during one cycle of the shaft 781, to provide time for selecting the printing tape indicated by the code stored upon bars 780. Also it is desired to change the code stored upon levers 744 into a code more convenient to the operation of the printing devices. To this end, the bars 828 and 830, with their associated mechanisms, are provided.

The code for figure "2" now is transferred from selector levers 744 to bars 762 and 763 (not 764). Shaft 781 is started by cam 787. Shaft 774 is started from 270° angle by pawl 806 operated by bar 763 through bellcrank 831 and link 833. Shaft 774 moves quickly to zero angle, thus moving cam "849 of third letter" to estop its follower and moving cam "849 of figures" (not shown) to free its follower; also moving cams 852, 916 and 938 to free their several followers.

Bails 910 and 911 start forward. All of bars 830 and all unlatched bars 848 move forward. Levers 926 and 930 move upward. Levers 926 close points 952 which severally correspond to latched bars 848 and thus set up the desired translated code for the section and tape identified with "Amsterdam Trading Co." Levers 930 do not close any points 952 because no bar 830 is latched and all bars 830 have moved forward. Levers 926, 930 return, and bars 830, 848 return. Bails 884 and 895 operate and all bars 780 are restored to normal and latched.

Bail "850 of figures" now starts downward by cam 879 and sequence cam "849 of figures." Levers 855 and latches 961 (Figure 28) transfer the code for "2" to bars 828. Rod 963 identified with figure "2" moves to its operated position. Bail 850 returns. Shaft 781 stops.

The condition of parts after transfer of first figure is: Shafts 781 and 774 are at zero angle. Code for section containing "Amsterdam Trading Co." tape is set upon first-five points 952. Code for position of "Amsterdam Trading Co." tape in that section is set upon second-five points 952. The five figure-points 952 are open. Bars 780 are all normal and latched. Bars 828 have stored upon them the code for "2" and the rod 963 for "2" is in operated position thus potentially latching a code combination of bars 830. The succeeding code now has been received and stored upon levers 744.

At this time some further device must make use of the codes on points 952. Devices for using the codes will be described later.

Second figure: The code for figure "½" now is transferred from selector levers 744 to bars 762 and 763. Shaft 781 is started by cam 787. Shaft 774 is not started.

Bails 910 and 911 start forward. All bars 848 and all unlatched bars 830 move forward. Levers 926 and 930 operate. Levers 926 open all points 952 for section selection and tape selection. Levers 930 close points 952 corresponding to latched bars 830 thus transferring the code for "2" to figure-five points 952. Bails 884 and 855 operate and all bars 828 are restored to normal and latched.

Bail "850 of figures" now operates. Levers 855 and latches 961 transfer the code for "½" to bars 828. Rod 963 identified with the figure "½" moves to its operated position. Bail 850 returns. Shaft 781 stops.

The conditions of parts, after transfer of second figure is as after transfer of first figure save that all section selection points 952 are open, all tape selection points 952 are open, the code for second figure is stored on bars 828 and the code for the preceding figure is stored on the five figure-points 952.

All figures after second figure operate in the transfer as second figures operate.

The transfer of a first letter immediately following a figure has been disclosed above, in the paragraph entitled "The condition of parts after transfer of first letter."

Short stock-codes: When a single letter constitutes the ticker code for a stock, as "A" for Atchison, then instead of a second letter the next code would be a first figure. The transfer operations would be identical with "first figure" as described above save that shaft 774 would start from 90° angle instead of from 270° angle. The cam shaft 774 moves quickly enough with angles and speeds as mentioned above, to free each part in time for the shaft 781 to operate the part. The speeds and angles may be apportioned as desired. When two letters constitute the ticker code, as "AT" for American Tobacco Co., the operation is the same save that shaft 774 starts from 180° angle.

*Description of tape printing board under control of stock and price selector*

There has been described the method of operating a board of the type shown in Figure 3 from a local keyboard.

When remote control is desired, the stock and price selector system of Figures 26 and 27 is adaptable. With this method of control the quotation message signals are received by the selector; a first group of five contacts 952 is operated to determine the section; a second group of five contacts 952 is operated to determine tape, and a third group of contacts similar to contacts 952 and associated with the selector bars 830 (Figure 29) is closed in accordance with each "figures" code, all as already set forth in detail. In the selector for this particular use, timing cam and contacts are included which are shown diagrammatically in Figure 34.

The dotted line rectangle 1001 represent the board sections as in Figure 25, and rectangle 1000 represents the stock and price selector of Figures 28 and 29. The tape selecting and type selecting magnets 151', 151, the multiple contact relay 525 and the conductors which are analogous to conductors in that figure are indicated by like reference numerals.

The dotted line area 1000 includes only so much of the selector as is pertinent to the following description.

In Figure 34, the fifteen points 952 are shown in two groups. The upper group comprises the five "price" 952 controlled by transfer levers 930 of Figure 29.

In the "price" points 952, five points are connected to wires 533 and their companion points are all connected to wire 1002 which is connected to switch spring 1003. In the lower group of points 952, ten points are connected through the upper or operating windings of ten locking relays 1004 to earth, and their companion points are grouped upon wire 1005 which is connected through winding of detector relay 1006 to wire 1002.

The lower or locking windings of relays 1004 are connected each from earth to the contact point of its relay and then each to a service wire, five of them to wires 524 for section selection and five of them to wires 526 for tape selection. The armature contacts of all relays 1004 are grouped upon wire 1007, which is connected through back points of detector relay 1006 to positive source and also through switch point 1008 and switch spring 1009 to positive source.

Shaft 781 (Figure 29) is provided with an additional cam, 1010 (Figure 34) whose pivoted follower 1011 and spring 1012 are adapted to operate the switch elements 1003, 1008, 1009 after each start of the shaft, between zero angle and 100° angle.

In operation, the selector of Figures 28 and 29 receives three letters and then one figure. This sets up codes upon the lower group of points 952 in Figure 34, the codes being set when shaft 781 is at 140° angle, and the upper points (figure points) remaining open.

In the next rotation of shaft 781, at 20° angle cam 1010 will operate follower 1011, switch spring 1003 will engage switch spring 1009 and then 1009 will disengage from switch point 1008. Current will flow from positive source through switch spring 1009, switch spring 1003, wire 1002, detector relay 1006, closed points 952 of lower group, and through operating windings of those relays 1004 which correspond to closed points 952. Relay 1006 and a code combination of relays 1004 are operated.

When shaft 781 is at 90° angle, switch spring 1009 will engage point 1008, closing two sets of circuits, from positive source over wire 1007 and to earth through locking winding of all operated relays 1004, and from positive source over wire 1007 and through points of operated relays 1004 to wires 524 to one section relay 525 and also through wires 526 and points 528 of the operated relay 525 to tape selecting magnets 151' and to earth, thus effecting section selection and tape selection. Immediately thereafter, switch spring 1003 disengages from spring 1009, terminating current through upper windings of relays 1004 and through relay 1006 and releasing relay 1006 whose armature points then connect wire 1007 to positive source in parallel with the connection at 1008, 1009. Relays 1004 hold by their lower windings. Relay 1006 is necessary to provide a positive potential to locking windings of relays 1004 during subsequent openings of points 1008 and 1009.

At 140° angle of shaft 781, the lower group of points 952 are opened and the code for first figure is set upon the upper group of points 952.

In the next rotation of shaft 781 for the second figure of the quotation cam 1010 operates its follower 1011 at 20°. Points 1009 and 1003 engage and current flows through wire 1002, closed points 952 of upper group, wires 533, branch wires 534, points 535 of operated relay 525 and figure selecting magnets 151, 362 in code combination and points 279 to earth, thus effecting printing, as previously explained in connection with Fig. 3. Each rotation of the printing shaft 128 opens contacts 279 to break the grounding circuit for magnets 151, 362, but the section relay 525 and tape selecting magnets 151' are not affected by contacts 279. Point 1008 opens but relays 1004 hold by current through points of detector relay 1006, to thus maintain the section selection and tape selection.

At angle 140° of shaft 781, the code for second figure is set upon points 952 of the upper group.

This cycle repeats as long as figure codes are received. When successive letters are being received by the selector of Figures 28 and 29, all points 952 are open and in Figure 34 the cam 1010 operates its switch repeatedly without effect. The last section selection and tape selection remains set upon relays 1004 until the next codes are set upon the lower group of points 952 and then are transferred to relays 1004 by operation of the cam switch and the detector relay 1006. Thus any number of successive quotations may be received and printed on a selected tape without repeating the selection of the tape and board section.

*Method of excluding extraneous ticker messages*

The printing quotation boards of the present invention are adapted to be operated from the regular ticker network of circuits.

The matter transmitted over ticker circuits comprises, in addition to the quotations themselves, other information, which so far as the quotation board is concerned, is of an extraneous nature. This information may take various forms, for example, a message calling attention to the number of shares sold up to a certain time.

Referring to Figure 33, a piece of ticker tape with such a message "at 2:12 p. m. 20,000 shares" printed thereon, is indicated. It is evident that the portion of the message "AT 212" could operate the quotation boards of this invention, and thereby give a false quotation for the stock "American Tobacco A" having the symbol AT, or for any other stock having a symbol which may accidentally become effective to operate the board mechanism in a similar manner.

In order to insure that none of this extraneous matter will affect the board controlling mechanism, it is arranged to have two special signals transmitted from the central office, namely, a "deleting" signal and an "enabling" signal. The former is sent preceding the extraneous message, and the latter succeeding the message, and these signals become effective in a manner to be described to prevent any of the matter included between said special signals from operating the board controlling mechanism.

If desired, the ticker typewheel could be provided with characters indicative of these two signals, as shown in Figure 33, in the form of parentheses before and after the excluded matter. This enables the operator or editor to readily check for errors.

Now, directing attention to Figure 29, the forword extremities of the selector bars 762 are provided with V-shaped notches of familiar form, adapted to be aligned in two selective combinations in response to the reception of the "deleting" and "enabling" signals respectively. Upon the reception by the selector mechanism of one of these two signals, one or the other of two selector rods 1026 or 1027 is selectively operated into the aligned series of notches. Each rod is provided at its extremity with a contact closing member 1028 adapted to complete a circuit through one of the pairs of contacts 1029 and 1030 after a fashion already outlined.

One spring of each pair of contacts is connected to earth (Figure 38). The other spring of the pair 1029 is connected through wire 1031 and relay 1032 to positive source. A branch of wire 1031 extends through front contact of relay 1032 and back contact of relay 1033 to earth. Relay 1032 is provided with two tongues 1034 and 1035, each of which is provided with a back contact.

The other spring of pair 1030 extends through wire 1036 and relay 1033 to positive source.

Conductors 1144 and 1145 connected through tongues 1034 and 1035 represent the conductors 1144 and 1145 of the circuit of Figure 37, which will be described hereinafter.

The operation is as follows: Upon the closing of the contact pair 1029 in response to the reception of a "deleting" signal, a circuit is completed over an obvious circuit to charge relay 1032 which holds over a circuit through contact of relay 1033 to negative. Simultaneously tongues 1034 and 1035 are operated to break the continuity of wires 1144 and 1145, thereby disabling the apparatus which is controlled thereover. Hence, any signals subsequently received by the stock and price selector will operate the selector, but will be effective no further than the mechanical operation of contacts 952.

Following the reception of the "deleted" message signals, the "enabling" signal is received to close a circuit through contacts 1030 and relay 1033. Relay 1033 is operated to unlock relay 1032 which enables the circuits over wires 1120 and 1126 to be effective for handling of the succeeding quotation messages. The "enabling" signal is a "figure" signal code and operates bar 763 (Figure 28) thus clearing and restoring bars 780.

*Stock and price selector adapted to the remote control of the ticker type of selector*

Under a subsequent heading will be described a simple type of control unit for use with quotation boards of a smaller number, say 100 to 150, of stocks.

As will be set forth, such a unit is designed to operate on a group of five impulses for selecting the board section in which the particular stock is located, and a second group of five impulses for selecting the tape in the selected section. After the desired tape has been selected successive groups of five impulses each representing the price figures are used to select and print the respective characters.

In order that the proper kind of signals for this purpose may be transmitted in the correct sequence the regular ticker signals as received by the stock and price selector must be translated all as previously described, and then retransmitted by a device about to be disclosed.

*Reperforating unit.*—Preliminary to the retransmission, however, a tape is perforated in accordance with the message as translated by the stock and price selector. The arrangement for accomplishing this perforating operation is shown diagrammatically in Figure 37, in which the contacts 952 are those indicated by the same reference number in Figure 29. The contacts of the upper group of ten are those controlled by transfer levers 926 and the contacts of the lower group of five are those which are controlled by the "figures" selector bars 830 and transfer levers 930, Figure 29.

The ten contacts 952 are adapted to be operated in code combinations to effect the selection of the section and tape. The five contacts 852 are likewise operated in code combinations to effect the printing or recording of the "figures" characters upon the selected tape.

Referring to Figure 37 each contact 952 is connected to an individual punch selector magnet 1102, the energization of which will prepare its associated punch 1103 for operation. The punches are in a horizontal row in operative relation with the tape 1104 and adapted to punch transverse rows of perforations therein.

The tape 1104, in the present instance, is of such width as to permit the perforating of sixteen holes in each transverse row plus the two feed holes which are disposed along the two edges of the tape, Figure 37—B. The feed hole punches operate every time the punch operates. The sixteenth punch 1101 is called the control punch and perforates a local-control hole 1105 in the tape every time the punch is operated for a letter combination.

Mounted on shaft 781 (Figure 29) is the additional operating cam 1108 (Figure 37), which is analogous to the cam 877 in Figure 29.

Associated with cam 1108 and in operative relation therewith is the follower lever 1109 which is adapted to control the contact 1110. Lever 1109 operates once for every revolution of cam 1108.

Mounted on sequence shaft 774 (Figure 29) is the additional operating cam 1106 (Figure 37) which is cut to low radius at its 180° stop and its 270° stop and therebetween.

Associated with cam 1106 is the follower 1107 which is adapted to control the contact 1117, closing the contact when sequence shaft 774 is in its positions at 180° and 270°, or closing the contact transiently as the shaft passes from 90° to 0° when serving a code of a single letter.

At each closing of contact 1117, the relay 1118 is energized over an obvious circuit, and locks over a circuit through its second winding, its own points and points of uncharged relay 1113, the "letters" relay. Relay 1118 opens the energizing circuit of relay 1115, the "figures" relay.

One side of each of the upper group of contacts 952 is connected over common wire 1112 through relay 1113 and points 1110 to earth. Also, one terminal of each of the magnets 1102 is connected to positive battery. Likewise, one side of each of the lower group of contacts 952 is connected over common wire 1114 through relay 1115 and points 1110 to earth.

The stock indication will be translated by the stock and price selector into the ten unit code representing the section and tape indication, which indication will be set up in code form on the ten contacts 952, when the shaft 781 is at 140° angle. Immediately, cam 1108 closes points 1110 and maintains them closed until shaft 781 is near normal.

Bail 1120 functions to push upper eleven punches 1101 through tape 1104 when the punches are conditioned for operation by charged magnets 1102. Bail 1120 is propelled by arm 1121 pivoted to the frame at 1122 and operated by solenoid 1123. Likewise bail 1124 on arm 1125 pivoted at 1126 and operated by solenoid 1127 functions for the lower five punches when conditioned by their five magnets 1102 which are controlled by the five figure points 952.

A tape-stepping shaft 1130 carries star-wheel 1131 with its jockey 1132; also two sprocket wheels 1133 to engage the edge-holes of tape 1104; also ratchet wheel 1134 by which the shaft 1130 is driven. Driving pawl 1135 is mounted upon driving arm 1136 pivoted at 1137 and operated by power of spring 1138. Spring 1139 holds pawl 1135 against wheel 1134. Hook 1140 on pivoted lever 1125 causes the tape 1104 to step on the return movement of lever 1125 every time that solenoid 1127 is operated. The tape is not stepped by solenoid 1123.

The operation is as follows: When the selector shaft 781 is at 140° angle the selector mechanism (Figure 29) will do one of three things, (a) set a letter code upon points 952, upper group of ten of Figure 37, or (b) set a figure code upon points 952, lower group of five of Figure 37, or (c) open all points 952.

If (a) then the perforator acts as follows: Immediately after shaft 781 passes 140° angle, cam 1108 closes points 1110 and current flows through relay 1113, wire 1112, closed points of 952 and magnets 1102 to positive source. Relay 1113 closes a first circuit through wire 1143 and top magnet 1102 to positive source and closes a second circuit through wire 1144 and solenoid 1123 to positive source. The first circuit adds the top punch to the code set by points 952. The second circuit operates solenoid 1123, perforates the letter code and the local-control hole 1105 and does not step the tape 1104.

If (b) then the perforator acts as follows: Cam 1108 closes points 1110 and current flows through 1115, wire 1114, closed points of 952 and magnets 1102 to positive source. Relay 1115 closes a circuit through wire 1145 and solenoid 1127 to positive source. Solenoid 1127 perforates the figure code in tape 1104 and operates to step the tape by movement of arm 1136 clockwise about pivot 1137, to thus engage a next tooth of ratchet 1134, reverse movement of arm 1136 by spring 1138 stepping the tape forward.

If (c) then points 1110 close without effect.

There is no storage nor delay in the operation of the device of Figure 37. The code which is set upon points 952 when shaft 781 is at 140° angle is punched in the tape 1104 before shaft 781 reaches zero angle.

If a deleting signal has been received, the deleting relay 1032 will be energized, thus opening contacts 1034 and 1035 and the magnets 1123 and 1127 will not operate. Therefore, tape 1104 will not be perforated until an enabling signal releases relay 1032, and then subsequent signals will be effective for perforation.

A further deletion is required when the device of Figure 29 receives a letter-code which is not eligible for transmission to the device of Figure 37. In the device of Figure 29, such a letter code will not operate any stock-rod 883, will not estop any code bar 848 and will not close any contact 952 of the "letters" group at the top of Figure 37. The device of Figure 29 thus estops the transmission of the "letters" code but the "figures" codes which follow it will be set up upon the contacts 952 of the "figures" group at the bottom of Figure 37. The punching of the "figures" code is estopped by the relay 1118 of Figure 37. The operation is as follows:

When "first letter" is being received by the device of Figure 29, shaft 774 moves from 0° to 90° and shaft 781 rotates 360°. The condition is (b) above, lower points 952 in Figure 37 are closed in a code combination, relay 1115 is operated and the "last figure" preceding the "first letter" is recorded in the tape 1104.

When "second letter" is being received by the device of Figure 29, shaft 774 moves from 90° to 180° and shaft 781 rotates 360°. The condition is (c) above, without effect upon the tape 1104, but the cam 1106 operates the follower 1107 to close the contact 1117 which operates the relay 1118 which locks and disables the relay 1115 so that "figures" codes cannot be recorded in the tape 1104.

When "third letter" is being received, the condition is (C) above. Shaft 774 moves from 180° to 270°.

When "first figure" is being received, shaft 774 moves from 270° to 0° thus opening the contact 1117. Shaft 781 rotates 360°.

Should the device of Figure 29 operate a stock-bar 883, then a code will be set up upon the upper contacts 952 of Figure 37, the contact 1110 will operate the relay 1113, a record will be made in the tape 1104 and the relay 1118 will be released thus permitting contact 1110 to operate relay 1115 for figure codes when received.

Should the device of Figure 29 not operate a stock-bar 883, then the condition is (C) above, the relay 1118 remains locked and figure codes may be set up upon the lower contacts 952 of Figure 37 but may not be recorded upon the tape 1104 because of the open points (left) of relay 1118. The next operation of a stock-bar 883, when and if operated, will result in recording "letters" and unlocking the relay 1119 to permit the record of "figures."

*Retransmitting unit.*—Having set forth the method of perforating the tape to be employed in the remote control of the ticket selector, there will now be disclosed a retransmitting unit for impressing on the line wire signals in accordance with the perforations in said tape.

The perforated tape 1104, as has been noted, is a sixteen unit tape, comprising groups of transverse rows of perforations, each group beginning with a row containing the stock indication and the first price character; the succeeding rows of the group representing successive price characters. The first row in every instance includes a control hole, previously mentioned, which perforation does not effect the transmission of a code signal as do the other perforations but does control the operation of a phasing device, hereinafter described, and thereby establishes and maintains the correct phase relation within the transmitting unit, and also between the transmitting unit and the receiving station.

The tape 1104 is fed to the automatic transmitter, Figure 39, by means of a pair of feed wheels 1174, the pins of which engage the aforementioned marginal row of feed perforations in the tape. The feed wheels 1174 are rotated in a step-by-step manner to be presently described in detail.

In operative relation with the perforations and positioned across the tape 1104 are sixteen individual feeler levers 1175 all pivotally mounted on a rod 1176, about which they are urged in a counter-clockwise direction by the action of individual springs 1177. Although the levers 1175 are shown diagrammatically as positioned beneath each other, it will be understood that this is merely for the purpose of clarity and that in practice the levers are in a horizontal row on a common pivot 1176 and in operative relation with the tape.

Each of the feeler levers 1175 is provided with an integral feeler pin 1178 which, when the associated lever 1175 is moved in a counter-clockwise direction about the pivot 1176, enters a perforation in the tape 1104. Each of the levers 1175 is also provided with a contact extension member 1176 which is adapted to make and break individual contacts 1181 in accordance with the movement of the feeler levers.

Extending across the top of the feeler levers 1175 is a bail 1182 which is operably connected at one end to the tape feed lever 1183 associated with electromagnet 1184, the other end of said bail being attached to one end of lever 1185. Both levers 1183 and 1185 are affixed to the common rock shaft 1186 suitably journalled in the framework. The tape feed lever 1183 and hence the lever 1185 normally tend to rotate in a clockwise sense about their common rock shaft 1186 due to the tension of spring 1187.

Pivoted to the tape feed lever 1183 is the feed pawl 1188 which is held in operative engagement with the teeth of ratchet wheel 1189 by spring 1191. The pair of feed wheels 1174, the ratchet wheel 1189 and the detent wheel 1192 are fixedly mounted on a common shaft 1193. Detent wheel 1192 is adapted to coact with a jockey roller mounted on a spring arm 1194.

The tape feed lever 1183 is provided at its free end with an armature portion 1195, adapted to cooperate with the magnet 1184. Thus whenever the magnet 1184 becomes energized, as will presently appear, the armature portion 1195 will be attracted, causing the lever 1183 to assume its counter-clockwise position. On the other hand, upon deenergization of magnet 1184, lever 1183 will be caused to assume its clockwise position due to the tension of spring 1187.

Thus the tape feed lever 1183 is adapted to be oscillated up and down periodically by the action of magnet 1184 and thereby impart like oscillatory motion to the feeler levers 1175 through the medium of bail 1182. As the tape feed lever 1183 is rocked upwardly it raises the feed pawl 1188 to engage the next tooth on the ratchet wheel 1189. During the downward movement of the feed pawl 1188 the ratchet wheel 1189 and accordingly the feed wheels 1174 are rotated one step to present a succeeding row of perforations to the feelers 1178.

It will be noted from the following disclosure that this advancing or stepping movement of the tape 1104 occurs after the feelers 1178 are out of engagement with the tape, the rotation of the feed wheels 1174 occurring during the downward movement of bail 1182 after the feelers 1178 are out of engagement with the perforations presented thereto. This delayed feeding action prevents the tearing of the perforations by the feeler pins 1178.

When the bail 1182 is again moved upward the feelers 1178 are permitted to move upwardly under the action of their individual springs 1177. Those feeler pins 1178 which are beneath a perforation in the tape will then continue to move into the perforation until the associated contactor 1179 engages its related contact 1181. If no perforation is disposed above the feeler pin 1178, the movement of said feeler pin will thus be limited and its associated contactor 1179 will not engage its related contact 1181.

The contactor 1179 of the first feeler lever 1175', extends a circuit to the winding of magnet 1199 of the escapement mechanism, as will hereinafter appear. The contactors 1179 of the other feeler levers 1175 extend circuits to the windings of individual locking relays 1196, which relays are energized in accordance with the cooperation of the feelers 1178 with the perforations in the tape 1104 and operate their respective armatures 1197 and 1198.

The right and left contacts of armatures 1198 (as viewed in Figure 39) are multipled and connected respectively to the negative and positive sides of current sources 1201 and 1202, and circuits therefrom over individual armatures 1198 extend through individual cam contacts and over conductors 1204 to 1208, respectively to the first to fifth code combination contacts on the distributor ring 1209. It will be noted that analogous contacts in the multiple point switches 1211, 1212 and 1213 are connected to the same conductors 1204 to 1208. The sixth code combination contact on the distributor ring 1209 is connected through the lower and upper contacts of contact spring 1214 to positive and negative current sources, respectively, the purpose of which will hereinafter appear.

Ring 1209 comprises first a stop segment 1230 which is permanently connected to negative polarity and second a start segment 1250 which is permanently connected to positive polarity. The ring 1209 includes also the first to sixth code combination contacts or segments, as has already been noted. Ring 1209 is bridged with a solid ring 1215 by brushes 1216 and 1217 carried on the distributor arm 1218. The arm 1218 in addition carries brushes 1221 to 1224 which are connected together and bridge the segmented rings 1225, 1226 and 1227 and the solid ring 1228. The solid ring 1228 is connected to ground. The solid ring 1215 is connected directly to the line wire 1237.

The distributor arm 1228 is connected through a friction clutch 1229 to the shaft 1231 of a speed governed motor 1232. A spring 1233 engaging a fixed collar 1234 on the shaft 1231 forces the friction clutch into engagement with the distributor arm 1218.

The distributor 1218 is normally held from rotation by an armature 1235 associated with a start magnet 1236. There is now present a stop current for the distant receiver, from negative source 1201 over the first segment 1230 of the ring 1209, brushes 1216 and 1217, solid ring 1215 and line wire 1237 to the receiving magnet of the distant receiving apparatus.

There is also held closed at this time a circuit to energize the magnet 1184, from positive side of battery 1238, through contact 1239, over contact spring 1241, wire 1242, through the winding of magnet 1184, over wire 1243, through segment 1244 of ring 1226, over brushes 1222 and 1224, through ring 1228 to ground.

The start magnet 1236 is controlled by the tape control arm 1245, which in turn is operated by the slack in the tape. Tape arm 1245 is shown in Figure 39 in its latched position being so held by detent member 1246, which position is effected manually. To initially start transmission, tape arm 1245 is unlatched manually. When the tape arm 1245 assumes its unlatched position it tends to close contact 1247 when the slackness of the tape is sufficient to permit, and when the tape becomes taut it tends to break the contact 1247 thus automatically arresting the operation of the transmitter until the tape again becomes slack. However the tautness of the tape should not be able to throw the tape arm 1245 into its latched position, which position, as previously stated, can only be effected manually, to discontinue transmission.

When the tape arm 1245 is in its unlatched position and the tape is slack, contact 1247 is closed and an energizing circuit for start magnet 1236 is completed from positive side of battery 1248, through the winding of start magnet 1236, over wire 1249, through contact 1247 to ground. Thus the energization of magnet 1236 tends to move the armature 1235 from the path of the distributor arm 1218 and the rotation of said distributor arm is thus initiated.

When the brush 1216 moves into engagement with the second segment 1250, a positive or start impulse is impressed upon the line wire 1237 over a circuit from positive source of current 1202, through segment 1250, over brushes 1216 and 1217, through ring 1215 and over signaling line 1237 to the distant receiver.

When brush 1222 leaves segment 1244, magnet 1184 is released and feed lever 1183 rises about pivot 1186, thus lifting pawl 1188 and bail 1182, which permits feeler levers 1175 to rotate as permitted by perforations in the tape; those feeler levers whose testing pins or feelers 1178 have found a perforation will rotate and thereby close their associated contacts 1181.

Those contacts 1181 which have thus become closed prepare energizing circuits for their related relays 1196. Since the first row of perforations in a message group always includes a control hole, feeler lever 1175' will rotate, contact 1181' will be closed and a circuit for magnet 1199 of the phasing device 1100 will be prepared.

The phasing device 1100 comprises a one-tooth ratchet wheel 1251, a two-tooth ratchet wheel 1252 and a three-tooth ratchet wheel 1253 which are affixed to a shaft 1254, which is adapted to be driven through a friction clutch 1255, and a pair of gears 1256 and 1257 by the motor shaft 1231.

The phasing device 1100 is similar to the escapement mechanism 700 shown in Figure 28 and hereinbefore fully described. The three teeth on the ratchet 1253 are spaced equiangularly about the periphery. The two teeth on the ratchet 1252 have the same angular position as, and are aligned with two of the teeth on ratchet 1253 and the lone tooth on ratchet 1241 is aligned with the remaining tooth on ratchet 1253. The pawls 1261, 1262 and 1263 associated with ratchets 1251, 1252 and 1253, respectively, are similar in design and operation to pawls 805, 806 and 807 of escapement mechanism 700.

However, pawls 1262 and 1263 are provided with armatures 1264 and 1265, respectively, and are adapted to be actuated by electromagnets 1199 and 1266 instead of mechanically by means of selector bars as in the case of pawls 806 and 807.

The phasing device 1100 is shown in Figure 39 in its normal position, which is that position wherein the retransmitting unit is in readiness to transmit price or figure signals. The reason for this is apparent when it is recalled that the quotation messages may be of unequal lengths, that is, a message always comprises a stock indication and an indefinite succession of price signals. Therefore, in order to provide an automatic means whereby the beginning of a new message may be distinguished, the phasing device 1100 has been introduced, which device is actuated under the influence of the aforementioned control hole or perforation. A clear understanding of the detail construction of the phasing device may be had from Figure 40.

Affixed to the aforementioned shaft 1254 are a series of timing cams 1267, 1268, 1269 and 1271 of similar design. These cams are shown in Figure 39, in which the apex of each cam assumes one of three equiangular positions. The apex of cam 1267 normally assumes the vertical position, as shown in Figure 39, and is adapted to actuate the contact switch 1272 so as to hold contacts 1239 and 1273 closed and the contact 1274 open.

Cam 1268 is adapted to operate the multiple point switch 1211. Cam 1269 is adapted to operate the multiple point switch 1212. Cam 1271 is adapted to operate the multiple point switch 1213.

As previously mentioned the closing of contact 1181' has prepared a circuit for energizing the magnet 1199 of the phasing device 1100. Now, when the brush 1221 wipes over segment 1275 of ring 1225, this energizing circuit for magnet 1199 is completed from ground, through ring 1228, brushes 1224 and 1221, segment 1275 (with which brush 1221 is now in contact), over wire 1276, through contact 1181', over wire 1277, through winding of magnet 1199, over wire 1278 to positive.

The energization of magnet 1199 will, through the attraction of its armature 1265, cause pawl 1263 to rotate in a clockwise sense. This rotation of pawl 1263 will impart like rotation to pawls 1261 and 1262, similarly, as described in connection with pawl 807 of the escapement mechanism 700. Pawls 1261 and 1262 thus will be tripped from engagement with their respective ratchets to permit the shaft 1254 to rotate one-half step. Upon the deenergization of said magnet 1199, which occurs when the brush 1221 passes off of segment 1275, the pawls 1261, 1262 and 1263 will be restored to their normal counter-clockwise position thus permitting the shaft 1254 to rotate another one-half step, thus bringing the apex of cam 1268 into operative engagement with the arm 1279 of switch 1211. Thus it is noted that the shaft 1254 has now been rotated through an angle of 120° or one-third of its revolution, thereby rotating all of the aforementioned cams and ratchet wheels affixed thereto a like amount.

It is therefore apparent that the apex of cam 1267 has been moved out of operative engagement with switch 1272, which results in the opening of contacts 1239 and 1273, and the closing of contact 1274. Likewise the apex of cam 1271 being moved out of operative engagement with arm 1281 of switch 1213 has resulted in the opening of contacts 1282.

Now, as the distributor arm 1218 continues its rotation its brush 1221 passes off of segment 1275 and next engages segment 1283 to complete energizing circuits for the selected locking magnets 1196 from ground over ring 1228, brushes 1224 and 1221, through segment 1283, over wire 1284, over the selected contactors 1179 and through their associated contacts 1181, thence through magnets 1196 and over common conductor 1285 to positive. The energization of the selected locking magnets 1196 cause their individual armatures 1197 and 1198 to operate.

The operation of the individual armatures 1197 complete locking circuits for their related magnets 1196 from ground over ring 1228, brushes 1224 and 1223, over wire 1286, thence over selected armatures 1197 and through their related contacts 1287, through windings of associated magnets 1196, thence over common conductor 1285, to positive. The locking of magnets 1196 thus maintains the armatures 1198 in either their right or left position until the complete message has been impressed upon the signaling line 1237, as will presently appear.

Now, as the distributor arm 1218 continues its rotation its brush 1216 wipes over the code combination segments (numbered 1 to 6 in Figure 39)

of ring 1209 thus impressing impulses of positive or negative polarity upon the signaling line 1237, depending on whether the armatures 1198 associated with the operated switch 1211 have engage their right or left contacts.

The contacts of the switches 1211, 1212 and 1213 control the transmission of only the first five impulses of the six unit code herein employed. The sixth impulse is supplied in the following manner and is made of positive or negative polarity depending on whether the code being transmitted is a "letters" or "figures" code. Thus, if a "letters" code is transmitted, the sixth impulse is of positive or spacing nature, and if a "figures" code is transmitted the sixth impulse is of negative or marking nature.

The first code is controlled by the switch 1211 with sequence shaft 1254 at 120° angle. The code represents the section selection and is analogous to a "letters" signal. The sixth impulse will be of spacing nature. When brush 1216 engages #6 segment of ring 1209, positive source is connected to line 1237 over a circuit from positive source 1202, over wires 1288 and 1293, through contacts 1274 and 1214, wire 1294, #6 segment, brushes 1216 and 1217, ring 1215, and line 1237.

When brush arm 1218 completes a revolution, its brush 1216 engages stop segment 1230, thus impressing a stop signal of marking nature on the signal line 1237. Brush 1222 engages segment 1244, but magnet 1184 will not operate because contact 1239 is open. Contact 1181' remains closed.

Brush arm 1218 continues to rotate, its brush 1221 again engages segment 1275 to form circuit for magnet 1199 which will cause the phasing device and shaft 1254 to step one step to 240° angle.

Cam 1269 will engage arm 1295 of switch 1212 to close contacts 1296. Cam 1268 will release arm 1279 of switch 1211 to break the switch contacts. Switch 1213 remains unoperated and contacts 1282 remain open. Cam 1267 at 240° angle does not operate switch 1272. Then as brush 1216 again traverses ring 1209, the start signal and successive code signals will be sent to line, the signaling circuits being completed through contacts 1296 of switch 1212. The signal transmitted will be the tape selection signal, analogous to a "letters" signal, the sixth impulse being of spacing nature.

At completion of the revolution, brush 1216 again engages segment 1230 to impress the stop signal upon the line. Brush 1222 again engages segment 1244 but magnet 1184 does not operate. The continued rotation of brush arm 1218 will again bring brush 1221 into contact with segment 1275 to effect again the energization of magnet 1199. Operation of magnet 1199 causes the phasing device and sequence shaft 1254 to step one step into normal position as shown.

Cam 1271 will engage arm 1281 of switch 1213 to close contacts 1282 as shown. Cam 1269 will release switch 1212 to break the contacts 1296. Switch 1211 remains unoperated. Cam 1267 operates switch 1272.

Brush 1216 again traverses ring 1209 and the start signal and successive code signals are impressed on the line through contacts of switch 1213. The signal transmitted is the price or "figures" selection, and the sixth impulse will be of marking nature. When brush 1216 engages #6 segment of ring 1209, negative current is impressed on the signal line 1237 over a circuit from negative source 1201, wire 1297, contacts 1273 and 1214, wire 1294, #6 segment, brushes 1216 and 1217, ring 1215, and line 1237.

Upon completion of this revolution, the brush 1216 engages stop segment 1230 to impress the stop signal upon the line. Simultaneously, brush 1222 engages segment 1244 to form circuit for magnet 1184 over the previously described circuit, since the contact 1239 is closed. The magnet 1184 thus energized causes bail 1182 to operate to effect the withdrawal of feeler pins 1178 from the tape 1104 and simultaneously the advancing of the tape as hereinbefore described.

The retransmitting unit now is in a position to retransmit a succession of price or "figure" signals, since in the ensuing "figure" signals the control feeler lever 1175' is not affected and hence the phasing device 1100 likewise is not operated. Thus the phasing device will not be operated until a new message is to be retransmitted; which new message is distinguished as previously mentioned, by the inclusion of a control hole in the code perforations.

Should the tape for some reason become torn or should it be necessary to insert a new tape, provision has been made for restoring the phasing device to its normal position as follows: The tape retainer 1298 is provided at its hinged end with a cam portion 1299 adapted to cooperate with a contact 1300 such that when the retainer 1298 is swung about its hinge to permit the insertion of the tape the contact 1300 is cammed closed to complete an energizing circuit for magnet 1266 of the phasing device from ground through contact 1300, over wire 1301, through winding of magnet 1266 over wire 1302 to positive battery.

The magnet 1266 thus energized attracts its armature 1264 to operate pawl 1262. It is apparent therefore, that if the phasing device has assumed any other than the aforementioned normal position, the releasing of pawl 1262 from any tooth on ratchet 1252 will permit the shaft 1254 to rotate until the lone tooth on ratchet 1251 engages pawl 1261, thus restoring the phasing device to its normal position and maintaining it in this position while the new tape is being inserted and the tape retainer 1298 let down. The tape will always be inserted so that the perforations pertaining to the beginning of a new message will be positioned above the feeler pins 1178.

Since the retransmission circuit 1237, Figure 39, carries substantially fewer codes than the main transmission circuit 2133, Figure 57, and since it may be speeded to an equal total time in which to carry the fewer codes, it follows that the transmission speed of the circuit 1237 may be substantially lower when gauged in any convenient manner, as by cycles per second.

*Ticker type of selector*

The stock and price selector is adapted to installations where a relatively large number, say, 150 to 500 stocks are to be quoted, and where a local keyboard will be undesirable because of its slow speed.

In Figure 41 is shown a device for automatic control of small boards adapted for 150 stocks or fewer. The mechanism of a standard stock ticker is used with parts added.

Besides facilitating the maintenance of such a unit because of its similarity with the standard ticker, there is the added advantage that this unit may be readily manufactured by factories already equipped to manufacture such tickers thereby decreasing the cost of such a control unit to a large extent, and making it available to a large field of users of small automatic quotation boards.

Figure 37 shows a reperforator and Figure 39 shows a transmitter adapted to send groups of signals for the operation of the ticker-type selector. The signals are a group for section-selection, a group for tape-selection, and a succession of groups for figures of the prices.

*Selecting mechanism.*—The ticker-type selector is adapted to be operated by the groups of signals over the line wire, which control the polarized receiving electromagnet 1311, which controls the cam-drum selecting device described in connection with the stock and price selector, and the transfer operation is initiated to rock the five T-levers 1312 (Figure 43). Up to the point of transfer, the operation is exactly as outlined hereinbefore, and as described in detail in a copending application Number 348,612, filed March 20, 1929, by S. Morton et al.

The ticker-type selector is provided with a sequence mechanism to control the order of operations. An escapement mechanism is operated through the medium of two special bellcrank levers 752 and 753, as in Figure 28.

*Contact operating mechanism.*—Below the T-levers 1312 are the five discs 1316 (Figure 43) which serve to communicate the movement of the T-levers 1312 to their five individual links 1328. The five discs 1316 has slots 1318 which the rounded heads 1319 of the five T-levers are adapted to engage.

Each disc 1316 is provided with a pair of V-notches 1323 adapted to cooperate with detent members 1324 pivoted at 1325, and urged into the notches 1323 by springs 1326.

The discs 1316 are also provided with projections 1327 having rounded heads to engage slots in links 1328, which are adapted to slide endwise in suitable guides. In response to a line signal of spacing nature, the associated link 1328 is moved forward.

To economize space, the backward and forward movement of the links 1328 is changed into a left and right movement.

Bellcrank levers 1329 are pivoted at 1332, one arm of the cranks engaging slots in their associated links 1328, and the other arm engaging slots in their associated operating bars 1333. Bars 1333 are guided suitably in the framework, and are each provided with three lugs 1334 adapted to cooperate with the three banks of contact levers 1335, 1336 and 1337. The upward legs of the levers carry contacts 1338a, 1338b and 1338c respectively adapted to be operated into engagement with the contact screws 1339 suitably carried in insulation upon the framework. The first or left-hand group of five contacts 1338a are the section-group, the second bank 1338b are the tape-group, and the third bank 1338c are the figures group. Contact levers 1335 and 1336 are each provided at their lower end with two flat springs 1342 adapted to cooperate with the lugs 1334 of bars 1333. When the contact levers are free, they may be operated by lugs 1334, but when the levers are locked the springs 1342 will yield as bars 1333 are moved in response to the transferred signals.

Levers 1335 and 1336 are provided with arms 1344 terminating in lugs 1345, with which the edges of the locking bails 1347 are adapted to cooperate. Levers 1337 have no lugs 1345, no locking of this bank of levers being required. Another point of difference is the omission of the springs 1342 from levers 1337 and the substitution therefor of the bifurcated jaws 1348 with which the lugs 1334 are adapted to cooperate.

The bails 1347 are of substantially U-form pivoted to the framework at 1349 and adapted to be oscillated by a downward arm 1352 pivotally connected to the links 1353a and 1353b.

Rocker 1354 pivoted to the framework at 1355 also is provided with a downward arm pivotally connected to the link 1353c, and is provided with an upward arm 1356 to the end of which is pivoted the switch-arm 1357. Arm 1357 has a companion power-arm 1358 which receives power from rocker 1363 to operate arm 1357. Switch 1359 may be operated by arm 1357 when the arm is in the position shown. Spring 1361 retains arm 1358 in contact with rocker 1363.

Rocker 1363 at its front end engages arm 1358. At its remote end it has a pin adapted to cooperate with the forked end of the rocker 1360 pivoted to the framework at 1365 and provided with a cam follower (not shown) adapted to follow the channel groove of the transfer cam so that at a desired instant rocker 1360, rocker 1363, arm 1358 and 1357 are rocked to operate switch 1359 briefly.

Arm 1358 is of length to engage rocker 1363 at all times but arm 1357 is of such length that when rocker 1354 is rocked clockwise the arm 1357 is moved clear of switch 1359 and arm 1357 may be rocked without affecting the switch.

*Sequence mechanism.*—In Figures 42 and 44 are shown bellcrank levers 752 and 753 in operative relation with discs 1372 and 1373. Disc 1372 has three notches, Figure 42. Disc 1373 (Fig. 42–B) has two normal notches 1395, 1396, to operate pins 1375, 1376; also long notch 1397 to clear pin 1374; and shallow notch 1398 to latch with pin 1376.

Three stop pins 1374, 1375 and 1376 are identical with stop pins 148 (Figure 3).

Operation of disc 1372 by bellcrank 752 will lift all three pins; release of bellcrank 752 will allow restoration of disc 1372 due to spring 1388 and the three pins will drop into the notches. Operation of disc 1373 by bellcrank 753 will lift pins 1375 and 1376 but not 1374; release of bellcrank 753 will not restore disc 1373 because pin 1376 in shallow notch 1398 will latch disc 1373 against return and the pull of its restoring spring 1390 is not sufficient to overcome latching of pin 1376. Cam-edge end of stop arm 1384 in passing pin 1376 may lift pin 1376 out of shallow notch 1398 to unlatch disc 1373, or disc 1372 when operated may lift pin 1376 to unlatch disc 1373. Notch 1398 is made shallow so that stop arm 1384 will not be stopped by pin 1376 when in this notch, for a small board not having a section selection, as hereinafter described.

A central sequence shaft 1383 is driven by motor 1382, gears 1379, 1378, and friction clutch 1377. Stop arm 1384 and sequence cams 1385, 1386 and 1387, are fixed upon shaft 1383. Stop arm 1384 is adapted to be stopped in any of three positions, by one of the pins 1374, 1375 and 1376.

Normally, the stop arm 1384 is in the position shown, known as "figures" position, being stopped by pin 1374, in response to a code signal for "figures."

Upon the reception of the section-selecting code of six impulses, the sixth pulse of spacing nature acts to rock bellcrank 752 to move disc 1372 briefly clockwise. Notches in disc 1372 cam out pins 1374, 1375, 1376 and the arm 1384 is released for rotation. Tension spring 1388 attached to disc 1372 returns the disc to normal after the brief transfer movement. Pin 1375 immediately moves back to its former position. The stop arm rotates from figures pin 1374 to section pin 1375 and is stopped by pin 1375 in the section selecting position.

Directly following the reception of the section-selecting code, the tape-selecting code is received. Bellcrank 752 and disc 1372 are operated in identical manner, and stop arm 1384 rotates into engagement with the pin 1376, known as the tape position.

The first figure of the price now is received, and the code has a sixth pulse of marking nature whereby bellcrank 753 and disc 1373 are operated and pins 1375 and 1376 are cammed out. Stop-arm 1384 is released from pin 1376 and rotates into engagement with pin 1374 in figures position. Spring 1390 urges disc 1373 toward its initial position, and cam-edge end of stop arm 1384 may lift pin 1376 to permit disc 1373 to return. Should arm 1384 fail to unlatch disc 1373, the next operation of disc 1372, to start arm 1384 from figures position, will lift pin 1376 and will unlatch disc 1373 which returns to the position of Figure 42.

In operative relation with sequence cams 1385, 1386 and 1387 which are secured to driven shaft 1383 are three cam-follower levers 1389, pivoted at 1392 and articulated with three bellcranks 1393 suitably pivoted at 1394. Links 1353a, 1353b and 1353c connect the bellcranks 1393 to the section bail and tape bail 1347 and figures bail 1354, respectively.

Cams 1385 and 1386 are so shaped that when sequence shaft 1383 is in figures position, at zero angle, both the section and tape groups of contacts 1335, 1336 are locked in their selected combinations, since forward edges of bails 1347 engage and lock contacts 1335 and 1336. When the sequence shaft passes 100° angle the section group of contacts 1335 is unlocked by rocking movement of section bail 1347 and at the section-stop position 120° angle both groups again are locked. When the sequence shaft passes 220° angle the tape group is similarly unlocked and at the tape-stop position 240° angle both groups again are locked. The result of this locking action is to permit the proper codes representing the section selection and tape selection to be stored on their individual groups of contacts in proper sequence.

After being set and locked, the section and tape groups of contacts 1338a and 1338b become effective in a manner to be described.

The figures group of contacts 1337 is never locked mechanically. Instead, master contacts 1359 are provided for the figures group of contacts, which will be permitted to be operated briefly in every cycle in which a figures code is received, and not for section or tape codes, as follows:

For all section selection and tape selection signals, the lever 1389 connected to bail 1354 is on a high portion of its cam 1387, thereby pulling lever 1357 clear of contact arm 1359. Therefore oscillations of arm 1358 by the cam (not shown) on the selection shaft will not affect contact 1359. In the position for figures selection however lever 1357 is positioned beneath arm 1359 to open the circuit each time bail 1360 oscillates.

The sequence device above described is equally adaptable to a special use. Some smaller installations of printing quotation boards may consist of only a single section, in which case it is necessary to transmit only a group of five pulses for selecting the tape and then the successive groups of figure codes. By so doing the transmission of the section-selecting code is dispensed with.

Accordingly the ticker selector may be used for such installations and the only change in the system of operation is in the use of only the section selecting group of contacts 1338a for tape selection and the figures group 1338c.

Under this method the sequence device operates as follows: A tape-selection code contains a sixth pulse of spacing nature and stop arm 1384 is permitted to rotate to pin 1375 which in this instance is the tape position.

This code is followed by a code for figure-selection which contains a sixth pulse of marking nature and disc 1373 is operated and latched. Pin 1376, in latching disc 1373, is held out to permit the passing of arm 1384. As arm 1384 passes pin 1376, the cam-end of arm 1384 lifts pin 1376 enough to unlatch disc 1373. The next operation of disc 1372 also will lift pin 1376 to unlatch disc 1373.

The smaller boards above referred to having only one section of tapes may be operated by the same signals which operate larger boards.

For smaller boards operated in this manner the section selection signals would step the sequence device Figure 42 to the section selection position but no circuits would be closed by contacts 1335. The next signals for tape selection would then operate as previously described.

For boards larger than 900 printing tapes, four sets of contacts 1338 will be required, the transmitting tape 1104 will be 21-holes wide instead of 16-holes and the section will be selected by two sets of points 1338.

*Control of quotation board by ticker type selector*

The ticker type of selector, last described, provides means for controlling a printing quotation board.

In Figure 48, dotted area 1401 contains the selector of Figure 41, including polar magnet 1311, sequence shaft 1383 and contacts 1338a, 1338b, 1338c, switch-arm 1357 and switch 1359. Cam-switches are added. Cam 1403, is upon sequence shaft 1383; it controls points 1405 to estop sparking on points 1338b. Cam 1409 is upon sequence shaft 1383; it controls points 1410 to estop sparking on points 1338a.

Contacts 1338a are connected to points 1410 and also over wires 1408 to magnets 1423 which operate the code-disc section-selector 1424. Contacts 1338b are connected to points 1405 and also over wires 1426 and branch wires 1427 to lower five points 1428 of cam-switch 1429 in each section 1430. Contacts 1338c are connected to points 1359 and also over wires 1432 and branch wires 1433 to upper five points 1428 in every section.

Lower five points 1428 in every section are connected further over wires 1434 to five tape-selection magnets 151'. Upper five points 1428 are connected over wires 1435 to five figure-selection magnets 151 and 362.

The sections are selected as follows: At one side of the board is placed the code-disc selector 1424, with its stop arm 1438 on shaft 1439.

Distributed along shaft 1439 at specific intervals are contact closing cams 1445 one individual to each section 1430. Each said cam is provided with a switch-operating apex, the apexes of all cams being displaced with respect to each other about shaft 1439. The angular positioning of the apexes is such that for each selective position of shaft 1439 as determined by selector 1424 only one cam may maintain its associated contacts 1428 in closed position. With five magnets 1423, thirty-two section-selections are possible.

The section selector may be constructed with each switch 1429 and cams 1445 located in its section; or it may be an integral mechanical unit with conductors 1434 and 1435 extending therefrom to each section.

The operation is as follows: Normally the apparatus is as shown in the figure. Upon setting the section-selection code upon bars 1333 (Fig. 41) the sequence shaft 1383 starts. At 10° angle, cam 1403 (Fig. 48) opens the circuit of magnets 151'. At 30° angle, cam 1409 opens the circuit of magnets 1423. Arm 1357 moves right as seen in dotted lines Fig. 48 to clear contact 1359. At 100° angle, the new section-selection code is substituted for the prior code on points 1338a. At 110° cam 1409 closes circuit for magnets 1423 through points 1338a and 1410. Selector 1424 starts to position the shaft 1439 selectively. At 120° angle the sequence shaft 1383 stops.

Immediately, the tape-selection code is set upon bars 1333 and shaft 1383 starts again. At 220° angle the new tape-selection code is substituted for the prior code on points 1338b. At 230° angle, cam 1403 closes circuit for magnets 151' through wires 1434, points 1428, wires 1427, 1426, points 1338b and 1405. The tape selector begins to operate to select the tape. At 240° the sequence shaft 1383 stops.

Immediately, the figure-selection code is set upon bars 1333, shaft 1383 moves from 240° angle to zero angle and cam 1387 (Fig. 41) operates arm 1356 to left to move arm 1357 into position to engage switch 1359. The transfer mechanism of Fig. 41 sets the new figure-selection code upon bars 1333 and therefore on points 1338c. Rocker 1363 then operates arm 1357 to operate switch 1359 to close a circuit for figure-selection magnets 151, 362, through wires 1435, points 1428, wires 1433, 1432, and points 1338c and switch 1359 to positive source. The magnets start the printing operation (Fig. 3) and switch 1359 opens the magnet circuit.

Subsequent figures are printed on the same selected tape as follows: Each successive figure code sets the contacts 1338c in the proper combinations, the change in the contacts 1338c being made while the switch 1359 is open. Switch 1359 closes once for each figure code and passes the new code to magnets 151, 362 soon after the new combination is set up. The sequence shaft does not step for successive figures, and bails 1347 lock section contacts 1338a and tape contacts 1338b, and as many figures as desired may be sent and printed upon the selected tape.

*Alternate method of tape selection under control of ticker type of selector*

An alternative plan for operation of a quotation board with substitution of mechanical devices for the electrical contacts 1428, is shown in Figures 46 and 47.

The mechanism of Figure 46 provides for selecting any tape in a board of several sections, by selectively positioning two shafts in response to two received codes.

Two tape-selection shafts 129' similar to shaft 129 in Figure 3, are shown for two quotation-board sections. Connecting all shafts 129' for rotation together is the cross shaft 1453 with gears 1454 for each shaft 129'. Surrounding shaft 1453 is the code-disc selector 222 of Figure 3. This positions shaft 1453 selectively and hence the shafts 129'. Gears 1456, 1457 and motor 1458 give rotation to shafts 1453 and 1455 for selective setting.

Shafts 129", 1455 and selector 222" are similar to 129', 1453 and 222, respectively.

Each of the shafts 129' is provided with a spirally arranged series of fingers 223 as in Figure 3. Each of the shafts 129" is provided with an equal number of fingers 223" preferably in one radial plane, the chosen radial planes being different on different shafts.

In Figure 46 only one of the printing cams 225 and one shaft 129 are shown. The arm 265 is as shown in Figure 3 and carries pivoted thereon the lever 268. Roller 272 is in operative relation with the individual cam 225 as before but the leg 269 of Fig. 3 is replaced by U-shaped interference member 1462, the legs 1463 and 1464 of which are adapted to engage fingers 223' and 223".

Two rods 1465 fixed to the framework are opposite the member 1462 and act as backstops.

In Figure 47, the circuit for the mechanism of Fig. 46 is similar to that of Fig. 48 with all switches 1429 omitted.

The five section-selection contacts 1338a are connected to the five magnets 1423 which in Fig. 47 operate the selector 222"; the five tape-selection contacts 1338b are connected directly to the five magnets 151' of the selector 222; and the figure contacts 1338c are connected directly to the five typewheel selecting magnets 151, 362.

*Operation.*—When sequence shaft 1383 (Fig. 48) reaches 120° angle, points 1410 have made the section-selection code on points 1338a effective upon magnets 1423 (Fig. 47) which operates selector 222" (Fig. 46) to adjust one section-shaft 129" to present all its pins 223" to be engaged by legs 1462.

When shaft 1383 reaches 240° angle, points 1405 (Fig. 48) have made the tape-selection code on points 1338b effective on magnets 151' (Figure 47) which operates selector 222 (Fig. 46) to adjust all tape-shafts 129', each to present its selectively indicated pin 223' to be engaged by leg 1463.

When shaft 1383 has reached zero angle, points 1359 will make each successive figure code effective upon all magnets 151, 362 which will operate all selectors 143 to position all shafts 127 and to start all printing shafts 128 in every section, thus operating all cams 125 and all arms 268. Some U-members 1464 have no engagement with pins 223' or 223". Some engage pins 223'. Some engage pins 223". One, not more, will engage both 223' and 223", will arrest rotation of arm 268 and will effect printing as in Figure 3.

Fingers 223' and 223" may be made adjustable by providing set screws in their mounting collars. By this means any pair of fingers may be set for any code selection and any stock may be transferred at will to any location on the board.

*Modified form of tape printing board*

The continuously rotating typewheel has advantages. Accordingly there is included in this invention a tape printing quotation board utilizing typewheel continuously rotated on a common shaft. It is possible to include on such typewheels integers from 0 to 9; fractions from 1/8 to 7/8, an asterisk for high or low designations, and a blank space, thereby eliminating any shift mechanism to indicate fractions. A single ribbon with novel inking arrangement is used.

When using a continuously rotating typewheel, the printing platen must be in contact with the selected type character for only a brief time to avoid blurring of the impression. The initiation of the printing operation and the position of the typewheel must be so related that the platen strikes the proper character at a particular instant, and this relationship must be preserved with reasonable accuracy. Because of this fact the simplest possible printing mechanism must be used, so that many moving parts are avoided and it is possible to obtain a device which may be relied upon to respond and perform its operation in the same interval of time for each operation. In this invention, an electromagnetically operated printing hammer is provided. This has been found to require few moving parts and to be responsive to operate the platen in the brief instant necessary, and within the marginal limits of printing operation.

Tape selection may be effected by selecting among magnetic hammers when a hammer is individual to each tape.

In Figure 49 there is shown a perspective representation of the board, the mechanism for only one tape being shown.

*Type character selection.*—The typewheels 1472 are fixed to the shaft 127, and the shaft is rotated continuously as by gears 119 and 124 in Figure 3 with the friction clutch omitted.

Typewheels 1472 carry fractions as well as integers. Figure 51 shows the periphery of a typewheel. Fractions are formed as figures of height less than the integers, the fraction characters being identifiable by a bar below each. The denominator "8" is omitted. This results in a fraction character of much greater legibility than fractions of standard form, such as ⅛.

Surrounding shaft 127 is code-disc selector 143, indicated in dotted outline, operated selectively by the five typewheel selecting magnets 151 and 362 (not shown), in Figure 3.

Above the selector 143 is the radial arm 1475 (Fig. 50) keyed to the shaft 127, the extremity of the arm being provided with the driving pin 1476. Adapted to slide upon the shaft 127 is the sleeve member 1477 rotated with said shaft by engagement of pin 1476 with a hole in the radial arm 1478 of the sleeve 1477. The pin 1476 does not interfere with the axial shifting of sleeve 1477. Flange 1479 integral with member 1477 is adapted to close a pair of fixed contacts 1482, when member 1477 is shifted axially upward. The arm 1478 is provided at its extremity with a trailing wing portion 1483 adapted to pass the projecting ends of idle selecting pins 148 but to be engaged by a selected one thereof. An enlarged detail is shown in Figure 50, where the forward inclined surface of wing 1483 has engaged a selected pin and upward motion has been imparted to the wing, to close points 1482. The straight portion of wing 1483 then rides upon the top of pin 148 to prolong the electrical signal.

Points 1482 may be closed at any angular positions of shaft 127 depending upon which pin 148 is selected, each such selected pin being individual to a character on the typewheels.

*Printing mechanism.*—In operative relation with the type characters are the platens 1484, one for each typewheel. Printing hammer 1485, pivoted at 1486, carries platen 1484. Hammer 1485 has arm 1487 with spring 1481; also stop screw 1488 which engages the frame as a stop to adjust the back or normal position of platen 1484.

Electromagnet 1493 and yoke 1489 are fixed to the frame. Armature 1494 is pivoted to the yoke at 1495 and has an extension which engages arm 1487 to operate hammer 1485 and platen 1484. Spring 1496 returns armature 1494 after operation. Buffers 1497, of resilient material to prevent noise, are front and back stops for armature 1494. Screw 1498 in armature 1494 engages arm 1487 and is adjustable to regulate the extent of forward movement of platen 1484. The hammer 1485 is thrown against the tape and type with a sharp blow, and the hammer rebounds to avoid blurring the impression. The act of printing is independent of the length of time current is maintained through the magnet.

*Tape mechanism.*—The tape supply and takeup spools are carried on a frame as in Figures 3 and 4.

Two smooth rings 1501, loose on shaft 127 and loosely against the sides of typewheel 1472, guide the tape 1499 around the moving typewheel, and hold the tape separated from the typewheel to avoid friction, yet close to the typewheel for printing.

The tape passes from supply roll 1500 over tension roller 1502, over discs 1501, across the front of the quotation board, around feed roller 1505, to take-up roll 1528. A presser roller 1513 clamps the tape against feed roller 1505.

Armature 1494 has an arm 1506 for feeding the tape on the return stroke after printing. The tape is fed by roller 1505 which is driven by ratchet 1516 fixed to it. Arm 1514 is pivoted at the axis of roller 1505. Driving pawl 1515 is pivoted upon arm 1514 and is spring-urged to engage ratchet 1516. Detent pawl 1517 also is spring-urged to engage ratchet 1516.

Motion of link 1508 to right will rotate arm 1514 to move pawl 1515 over teeth of ratchet 1516; return motion of link 1508 then will feed the tape. Link 1508 has lug 1509 adapted to engage stop 1510 on rocking shaft 327. Should lug 1509 engage stop 1510, then link 1508 may move only far enough to pass pawl 1515 over one tooth of ratchet 1516 and the return of link 1508 will drive roller 1505 one step to feed the tape enough to clear for printing the next figure. Should stop 1510 move out of the path of lug 1509, then link 1508 may move farther to pass pawl 1515 over two teeth of ratchet 1516 and the return of link 1508 will drive roller 1505 two steps to feed the tape a double distance, thus providing for a blank length of tape between the figure last printed and the figure next to be printed.

When link 1508 is moved right, the pulling power originates in magnet 1493 and is transmitted through armature 1494, arm 1506, loose link 1503 and spring 1504 to link 1508. Should lug 1509 engage stop 1510 and arrest the motion of link 1508, then the further movement of armature 1494 will result in stretching spring 1504. When link 1508 is moved left, the pushing power originates in spring 1496 and is transmitted through armature 1494 and arm 1506 to link 1508 by engagement of the edge of arm 1506 with the end of link 1508.

The rocking shaft 327 is operated directly by armature 363 of magnet 362 through link 1519 which directly connects arm 1518 on shaft 327 and arm 1520 on armature 363. Magnet 362 is used in all codes for fractions so that in printing any fraction the shaft 327 will be rocked and the tape will be fed a double distance.

*Tape rewinding mechanism.*—After passing around the roller 1505, the tape is rewound.

The tape, after leaving roller 1505 passes roller 1526 and thence to take-up drum 1528. Roller 1526 is carried upon lever 1527 and is held in contact with the tape by means of a light spring 1529. Lever 1527 is pivoted to arm 1532 which in turn is pivoted to the framework and has spring 1531 connected thereto. Lever 1527 terminates in a tooth 1534 adapted to cooperate with lug 1535 of the link 1508.

Drum 1528 is free upon spindle 1536 journalled in the framework, and is adapted to be rotated upon spindle 1536 by a spring 1537 fixed at one end to the drum and at the other end to ratchet wheel 1538 integral with the spindle. Feed pawl 1539 is pivoted upon arm 1532 and spring-pressed into feeding relation with the ratchet. Detent pawl 1540 prevents return of the ratchet.

The operation is as follows: With the apparatus as shown, addition of used tape will release spring 1537 until roller 1526 yields and permits spring 1529 to draw tooth 1534 into the path of lug 1535, and spring 1531 moves arm 1532 to the right, Fig. 49, until the next tooth on ratchet 1538 is engaged by pawl 1539. Then link 1508 will operate 1534 upon its next movement to the left, thereby moving pawl 1539 and ratchet 1538 to wind spring 1537 until the tension of the tape operates roller 1526 to rotate lever 1527 to move tooth 1534 from the path of lug 1535.

On occasion it might be desired to refer to quotations which have been printed and then concealed in the rolled-up tape on the drum 1528. The spring 1537 between the ratchet and the drum makes it possible to manually unroll as much tape from the roll as is desired. This unrolling merely winds up the spring 1537, and release of the tape allows spring 1537 to rewind. The spring 1537 is made light, that the tape may be pulled without tearing and is made of a sufficient number of turns to allow a day's business on the tape to be observed without overwinding.

*Ink ribbon arrangement.*—A single endless ribbon is provided and a novel arrangement is provided to re-ink the ribbon as it travels.

Ribbon 1544 passes upward between the tapes 1499 and the platens 1484, around a pair of idler rollers 1545, over a driving roller 1546 rotating in an ink reservoir 1547, and then under wringing roller 1548 arranged with tension springs 1549. Adjusting screws 1552 serve to regulate the pressure of the roller 1548. After being wrung the ribbon passes over the tension idler roller 1553 pivoted in the tension bracket 1554 pivoted to the framework and urged by spring 1556; it then passes downward around an adjustable idler roller 1557, and thence upward to printing position.

The driving roller 1546 is fixed upon a shaft such as shaft 344, Figure 3.

In passing over the roller 1546 the ribbon is immersed in the ink supply and becomes thoroughly saturated, then, on passing under the wringing roll 1548 the pressure of the springs 1549 squeezes out the excess ink which drips or pours back into the reservoir. Tension to preserve the tautness of the ribbon is provided by the roller 1553 and the spring pressed bracket 1554.

To accommodate any stretching of the ribbon 1544 which the idler 1553 is not designed to care for, the lower idler 1557 is made adjustable in reasonable increments by being movable from one to another of the inclined slots 1559 of the bracket 1558.

Alternative inking is shown in Figure 49—B where the driving roller 1546—B is a felt pad which supplies ink to the ribbon.

*Alternative form of tape-spacing mechanism.*— In Figure 52 is shown another method of feeding the tape. The feed roller 1505 is adapted to be frictionally rotated in a clockwise direction by a belt similarly to the roller 309 (Figure 4) but is withheld from rotation by means of the engagement of a pawl 1564 with the teeth of a ratchet wheel 1565 fixed to the roller. Pawl 1564 carries a pin 1566 in operative relation with a slot 1567 in the left end of the link 1568, extending across the board, and pivoted at its right end to the extension 1506 of the armature 1494. A tension spring 1569 normally maintains pawl 1564 in engagement with ratchet 1565.

Armature 1494 operates link 1568 to the right and the slot 1567 slides upon pin 1566 until armature 1494 has nearly completed its stroke when the end of the slot engages the pin and rocks the pawl 1564 to disengage it briefly from ratchet 1565, whereupon roller 1505 is released for rotation by the driving belt and the tape is spaced the amount of one letter space.

Double spacing is done by holding armature 1494 attracted long enough to permit the ratchet 1565 to pass two teeth. The method of doing this will be described in connection with Figure 45.

Method of adjusting typewheels

It is important that the typewheels be located accurately with respect to the platen in order to obtain a full, clear impression. For this purpose, the typewheels may be provided with an accurate adjusting and clamping means, such as is shown in Figure 62.

The typewheel shaft 127 is formed with two flat portions 1572, at points along its length as determined by the vertical position of the various typewheels. Each typewheel is provided with two set screws 1573 adapted to register with said flat portions. Access holes 1574 in the periphery of the typewheel, so located as to occur at the "blank" position of said typewheel, permit the insertion of a screwdriver or socket wrench.

By turning in one screw and loosening the other, the typewheel may be angularly adjusted.

*Prevention of false selection in code disc selector*

When operating with the constantly rotating typewheel method, the wing 1483 which cooperates with the pins 148 to actuate the printing mechanism is constantly rotating.

Now, while camming out a selected pin and permitting another to move to selected position, there is a tendency to impart motion to all the pins, as the discs shift from one of their operative positions to the other. This motion is very slight and is ordinarily of no consequence, but may result in a pin being moved far enough to permit wing 1483 to engage and cause a false selection.

To safeguard this, an additional disc 1575 may be provided, Figures 60 and 61. This disc is slightly greater in diameter than the discs 147, Figure 60, and is notched in such fashion that in unselected position, it holds all the pins 148 out of contact with the selecting discs 147, Figure 61, and the latter are thereby free to move into selective combinations without imparting movement to any of the pins 148.

The additional disc is operated to selected position directly after the discs 147 are set in their new combination by magnet 1636 and permits the selected pin to enter the aligned notches to engage the wing 1483. After this engagement has occurred, the disc 1575 is moved to unselected position to again cam out the pins 148 in readiness for a new selection.

The method of operating this sixth disc 1575 by magnet 1635 immediately following each selective positioning of discs 147 is fully explained hereinafter in connection with Fig. 45.

*Operation of magnet printing board*

In Figure 53 the dotted line rectangles 1582 indicate sections of a quotation board according to details shown in Fig. 49. Within these rectangles are printing magnets 1493, typewheel selecting magnets 151, 362, sleeve 1477 and points 1482.

The stock and price selector, of Figures 28 and 29, with the modification of Figure 31 is shown in the dotted rectangle 1583. This rectangle includes also a cam-operated switch 1584, with cam 1585 on shaft 781, and cam-operated switch 1591 with cam 1592 on shaft 774, Figure 29. Condenser 1586 is connected to negative source and to switch 1584. Associated with switch 1584 and condenser 1586 are relay 1587 and make-before-break relay 1588.

Normally, condenser 1586 is connected through switch 1584 to positive source, maintaining condenser 1586 normally charged. Cam 1585 changes switch 1584 to connect condenser 1586 to 1587 to operate the relay by the discharge-current of the condenser. Relay 1587 has an obvious locking circuit through points of relay 1588 when relay 1588 is unoperated. Relay 1588 may be operated by switch 1482 over an obvious circuit.

The left points of relay 1587 are connected to positive source and to wire 1589 which is common to the "figure" points 952 operated by transfer levers 930 of Figure 29. The other side of points 952 are connected by conductors 1602 to the bus wires 1603, which are connected to type-selecting magnets 151 and 362 of all sections 1582 in parallel circuits.

One spring of each of the stock selection pairs of contacts 982 (see Figure 31) is connected through switch 1590, normally open, to positive source, and the companion springs are connected over wires 1606 to their respective printing magnets 1493. Every wire 1606 has an individual relay 1605 which is charged by switch 1590 through a contact 982 and locks through switch 1591 of sequence cam 1592. Each stock is provided with one pair of contacts 982 in the stock and price selector 1583.

The apparatus at the end of a second or subsequent "figure" cycle is as shown in Figure 53, with shaft 781 stopped at zero angle, with shaft 774 stopped at zero angle, but with the used "figure" code remaining on points 952 and with the one used relay 1605 remaining locked for the further use of its associated printing magnet. Also there will be a figure code stored on the bars 828 Figure 29 with a rod 963 in dropped position, this code being as yet unprinted. Assume now that the next cycle is that of the "first letter" of the code ATR. During this first cycle, the stored figure will be transferred and printed upon the tape identified by the sole locked relay 1605.

Shafts 781 and 774 start together. When shaft 781 is at 22½° the shaft 774 stops at 90° without having operated the switches 1591—1590. When shaft 781 passes 70° the bars 830 start forward. When shaft 781 passes 90° the levers 930 start upward. When shaft 781 passes 140° the stored figure code has been transferred to points 952, Figure 53. Cam 1585 now operates switch 1584 and charges relay 1587 which locks and closes circuit from positive source through wire 1589, closed points 952, wires 1602 in parallel, magnets 151—362 and closed switch 279 to negative source. The printing mechanism starts in all rectangles 1582, and all switches 279 open. Printing then is effected by points 1482 acting through that printing magnet 1493 which has its circuit prepared through the points of the sole charged relay 1605. Points 1482 also operate relay 1588 to unlock the relay 1587. When shaft 781 stops at zero angle, the code for "first letter" "A" will be stored on the first-five bars 780 (Figure 29), the used figure code will remain stored on points 952 (Figure 53), the bars 828 will have "no code" position with all the rods 963 in upper position. The used relay 1605 will remain locked. The letter "A" stored on the first-five bars 780 will permit the stock-rod 981 for "Atchison R. R." to close its points 982 but there will be no effect because the circuit of those points is open at the switch 1590.

The next cycle is that of the "second letter," namely T or ATR.

Shafts 781 and 774 start together. Shaft 774 stops at 180° without having operated the switches 1591—1590. Shaft 781 transfers the stored "no code" from bars 828 to points 952 thereby opening all points 952 Figure 53. The used relay 1605 will remain locked. The letters "AT" now stored on the first-five and second-five bars 780 will lift the stock-rod for "Atchison" and will permit the stock-rod for "American Tobacco" to close its points 982 but without effect, because of the open switch 1590. There will be no printing, the relay 1588 will not operate, the relay 1587 will remain locked, the points 952 will remain open.

The next cycle is that of the "third letter" namely R of ATR. The total effect is that shaft 774 moves to 270° without effect; that the letter "R" is stored upon the third-five bars, lifting the stock-rod for "American Tobacco" and permitting the stock-rod for "ATR" to close its points 982 without effect because of the open switch 1590.

The next cycle is that of the "first figure." Shaft 774 leaves angle 270°, then operates switch 1591 which releases the used relay 1605, then operates switch 1590 which charges a new relay 1605, namely that relay which is identified with the stock "ATR" of the stored letter codes, the operating circuit being from negative source through individual relay 1605 and points 982 of stock ATR, then through switch 1590 to positive source, the relay 1605 immediately locking through switch 1591 and thereby connecting the positive source to the wire 1606 leading to the printing magnet 1493, of which there is but one pertaining to the stock ATR in some one of the several sections 1582. The shaft 774 stops at zero angle.

The shaft 781 passes 22½° angle as the shaft 774 stops. The shaft 781 subsequently operates the bail 884 to reset all bars 780 thereby lifting the stock-rod ATR from the points 952, and stores the code for first-figure upon bars 828. Points 952 have been open, and there has been no printing. Switch 1584 has been operated but without effect since relay 1587 was already in operated condition. Relay 1588 was not operated. Relay 1587 remains locked. New relay 1605 is locked to record the stock selection, and its associated magnet 1493 is prepared for printing.

The next cycle is the cycle of the second figure, during which the first figure is printed.

Shaft 774 does not operate. Shaft 781 transfers the code for "first figure" from bars 828 to points 952 and the magnets 151—362 respond at once, the relay 1587 being pre-operated by the prior cycle, and switches 279 open the circuit of the magnets. Shaft 781 operates switch 1584 without effect, then stops. Printing ensues by points 1482, using the newly prepared magnet 1493. Points 1482 operate relay 1588 to release relay 1587 to prevent a repetition of the printing. The apparatus now is in the state which was assumed above.

Had the new stock been "Atchison" the first-figure code would have followed the first-letter code and shaft 774 would have moved from 90° angle to zero angle, operating the switches 1591 and 1590 as described.

Had the new stock been "American Tobacco," the first-figure code would have followed the second-letter code and shaft 774 would have moved from 180° angle to zero angle, operating the switches 1591 and 1590 as described.

The typewheel shaft rotates at a speed in excess of the speed of the shaft 781, that the wing 1483 may reach the selected pin within the time of one code combination. The typewheel-shaft speed may be (say) fifty percent greater than that of shaft 781. The reason for this excess rate of speed is to enable the wing 1483 to test all pins in that part of the code cycle between the dropping of a pin 148 and the resetting of that pin in preparation for the dropping of the next pin to be operated. In this portion of a code cycle, the printing shaft 127 and the detector wing 1483 must make a complete rotation.

It is apparent that with the circuit just described successive characters may be printed indefinitely upon the selected tape, since shaft 774 does not rotate for "figures" selections, and the locking circuit of selected relay 1605 remains closed. With a continuous rotation, a typewheel of larger diameter than the typewheel 142, Figure 3, is not objectionable since inertia effects are not manifested.

*Modified typewheel arrangement*

There is illustrated in Figures 17 and 18 a modified typewheel designed to print from a single ribbon, the fractions to be distinguished by a decimal point.

In Figure 18 is illustrated a developed view of the face of typewheel 1504—B with two dotted rectangles A and B representing the relative position of typewheel and platen for printing an integer, at A, and for printing a fraction and decimal point, at B. It will be noted that platen-face A at the angle shown will cover only numeral 6; that platen face B at the angle shown will cover .1. The platen used with this typewheel may be of slightly wider face than when decimal points are not printed.

To have the platen register with the typewheel for either kind of printing (with or without decimal point) the printing operation is delayed for printing without the point, and is operated normally for fractions. Because of this feature, this method may be termed "delayed printing." In order that the platen will not register with the decimal point of the next succeeding numeral when printing an integer a space must be allowed between each character and the succeeding decimal point, as shown at C in Figure 18.

Referring to Figure 17 the typewheel and hammer are shown at the angle for printing. When the platen operates against the typewheel at this angle it will cover a character preceded by a decimal point.

The circuit arrangement is shown in Figure 19.

This circuit is the same as Figure 53 and described in connection therewith, so far as like labels are applied.

The four character-selecting magnets 151 operate to select a pin 148. The fifth magnet (362) of the set of five magnets is replaced by relay 362—B. Fast-closing relay 1608 and slow-closing relay 1607 are added.

Switch 1482 is connected to the tongue of relay 362—B and thence to the winding of 1607 or of relay 1608 as determined by the uncharged or charged condition of relay 362—B for the printing of an integer or a decimal, respectively. Every selective code to print a decimal will close the right points 952 and will operate relay 362—B to prepare the circuit of fast-closing relay 1608 and the closing of switch 1482 will be transferred quickly to printing magnet 1493 by the quick action of fast-closing relay 1608.

For the printing of an integer, the right contacts 952 are not closed, relay 362—B is unoperated and relay 1608 is prepared to operate. Due to the delay in the closing of the points of relay 1608, the platen engages the typewheel slightly later than for a decimal and the angular register is as shown at A in Fig. 18.

*Alternative circuit for the operation of the magnetic printing board*

Figure 45 shows a circuit for operating the sixth disc 1575 of Figures 60 and 61, and for stepping the tape a double step after printing a fraction, with the tape-stepping mechanism of Figure 52 and the control circuit of Figure 53. The selector mechanism of Figures 28, 29, 31 and the display board of Figures 49, 42 are in the same office.

In Figure 45, the five pairs of figure-selection points 952 are shown. One point of each pair is connected through wire 1626 and detector relay 1627 to positive source. The remaining points are connected over individual wires to magnets 151, 362 and to negative source.

Spacing relay 1628 is connected from negative source to the right pair of points 952, in parallel with magnet 362. The right points of relay 1628 connect the winding of slow relay 1629 to contact 1625. Points of relay 1629 connect positive source to wire 1630.

Cam 1585, switch 1584 and condenser 1586 are as shown in Figure 53. Wire 1631 connects switch 1584 through points of detector relay 1627 to the winding of locking cam-relay 1632. A locking circuit is formed by wire 1633, including winding of locking relay 1632, points of relay 1632, wire 1633 and points of unlocking relay 1634. Right point of relay 1632 closes an obvious circuit for operating magnet 1635 which is the magnet similar to 151 for operating the sixth disc 1575 of Figures 60 and 61.

Release relay 1636 has its winding connected to negative source and also over wire 1637 through the two points 1482 (see Figure 50) to positive source. A locking circuit for relay 1636 is formed by wire 1638 extending to points of relay 1634. The operating circuit for unlocking relay 1634 extends over wire 1639, through right points of release relay 1636, wire 1640 and lower point 1641 added to the two-point switch 1482 of Figure 50. The upper point of 1482 extends to printing magnets 1493 as in Fig. 53, except however, that the individual wires 1606 (Fig. 53) are connected to negative by way of switch 1591 instead of positive as in Fig. 53. The negative leads from locking relays 1605 must also of course be changed to positive.

The operation is:

Upon the reception by the stock and price selector of a "figures" code, and the translation and setting up thereof upon points 952, a circuit is closed from negative, through magnets 151 and 362, points 952, wire 1626 and relay 1627 to positive. Detector relay 1627 operates and prepares a circuit for cam-relay 1632.

It will be understood that cam 1585 will have closed points 1584 for each selection of a stockbar since shaft 781 makes a complete revolution for each selection. However, for all stock selections the "figures" contacts 952 are open and therefore relay 1627 will be deenergized and condenser 1586 cannot discharge to operate relay 1652.

Cam 1585 now operates switch 1584 to discharge condenser 1586 over wire 1631 to operate cam-relay 1632, which locks through points of relay 1634 and which also closes the operating circuit of the sixth-disc magnet 1635. Thus magnets 151, 362 are allowed to operate before the pin-releasing disc 1575 is operated by magnet 1635 to release the several pins 148. One pin 148 now operates.

Wing 1483 engages the operated pin 148, sleeve 1477 is operated upward and a circuit is closed from positive source through points 1482 and wire 1596 to the selected printing magnet 1493 (Figure 53). Also, release relay 1636 is operated over wire 1637, and locks over wire 1638.

After the printing operation, wing 1483 leaves the operated pin 148, sleeve 1477 descends and connects positive source over point 1641, wire 1640, points of energized relay 1636, and wire 1639 to the winding of unlocking relay 1634. Relay 1634 operates and opens the locking circuits of relay 1632 and relay 1636. Release of relay 1636 will release the relay 1634. Release of relay 1632 will release magnet 1635 and will release the sixth disc 1575 to lock the pins 148 ready for the next code. Thus there can be no incorrect printing by upward movement of sleeve 1477 during movement of pins 148 to a new selection.

Should the selected character be a fraction, the right or fifth of the points 952 will be closed. Magnet 362 and relay 1628 will operate in parallel. Relay 1628 will lock over wire 1642 and points of relay 1634, and also will prepare the circuit of slow relay 1629 to be closed later by contacts 1482 and 1625. When sleeve 1477 rises, relay 1629 is charged and connects positive source to wires 1630 and 1596. Now, when sleeve 1477 descends and operates points 1482 to disconnect positive source from wire 1596 to release the printing hammer, the slow relay 1629 will continue the connection of the positive source upon wires 1630 and 1596 for a brief time, thereby permitting the tape-stepping mechanism of Figure 52 to pass two teeth of wheel 1565 to effect a blank space on the tape following the fraction.

Tape selection by relays

An alternative method of operation of the board of Figure 49, under the control of the ticker selector, Figure 41 is shown in Figure 56. Points 1338—a, —b, —c, switch 1359 and switch arm 1357 are shown in detail in Figure 56.

Tape-selection is effected by permutation relays 1672, connected from negative source over conductors 1673 to contacts 1338—a and 1338—b. Tongues 1676 of the relays 1672 compose a relay selector. The selected wires 1677 extend to one terminal of printing magnets 1493. The other terminals of the printing magnets 1493 are connected over common wire 1678 to the upper point of switch 1482 with a branch extending to the relay 1682.

The long spring of the points 1482 is connected to positive source and the lower spring 1641 extends over the wire 1684 to relay 1685, thence over wire 1686 and points of relay 1682 and to negative source.

Printing-selection is effected by points 1338—c, connected to five locking relays 1688 whose locking circuits are through wire 1689 and points of relay 1685. Relays 1688 have points adapted to connect negative source over wires 1690 to type-selecting magnets 151, 362.

The operation is as follows: The tape-selection codes are set upon points 1338—a and 1338—b. During these operations, switch 1359 is not operated. Relays 1672 move their tongues 1676 and connect negative source to the desired wire 1677 and printing magnet 1493. By the circuit arrangement among the contacts and tongues of relays 1672, a separate wire 1677 and magnet 1493 will be selected for every separate permutation in the combination of charged relays 1672. Charging relay 1672—a solely will select the magnet 1493—a. Charging relay 1672—b solely will select the magnet 1493—b. Charging both 1672—a and 1672—b at the same time will select the magnet 1493—c. Charging 1672—a, 1672—b and 1672—c will select the magnet 1493—d. Any number of relays 1672 may be charged at one time for a single selection. A group of ten relays 1672 will effect 1024 selections, including the "idle" selection of magnet 1493—e with no relay charged. In the figure, many tongues and contacts are omitted, the quantity shown being sufficient to render the system clear. Then the first printing-selection code is set upon points 1338—c and switch 1359 is closed briefly. A code combination of relays 1688 is operated and locked, thus operating a code combination of magnets 151, 362 and thus operating a pin 148 (Figure 50).

Wing 1483 engages the operated pin and closes switch 1482, completing the circuit of magnet 1493 and effecting printing, also operating locking relay 1682. Upon release of switch 1482, relay 1685 is operated over wires 1684, 1686 and points of relay 1682, thus unlocking and releasing relay 1682, relays 1688, and magnets 151, 362.

Selection among tapes of multiple-tape stocks

It is possible to arrange the tapes of the printing quotation boards so that a stock may have, in addition to the "running" tape, other tapes for "highs", "lows," "close" and "open" in various combinations. These various indexes are known by the term "range."

The tapes individual to any particular stock may be arranged in desired combinations, as, for example: a "running" tape, a "high" tape, a "low" tape, and a "close-open" tape; or, a "running" tape, a "high-low" tape, and a "close-open" tape; or, a "running" tape, and a "high-low" tape; or, a single tape including "running," "highs" and "lows," with the "close" and "open" quotations indicated upon cards posted manually. Other combinations may be made possible by the conditions of installation.

To accomplish this, it is necessary to send codes resembling "figure" codes in the "figures" sequence, and these codes will control the devices to select among the various tapes of any multiple-tape stock.

Two methods will be described; the first method with reference to the mechanical printing board of Figure 3, and the second method with reference to the magnetic printing board of Figure 49.

*First method.*—Figure 54 shows the tape selection shaft 129 of Figure 3 arranged for selecting between the various tapes individual to a single stock. For purposes of description a stock having four tapes is considered, for example, the upper tape will carry "close" and "open" quotations, the next tape "running," and third "highs" and the fourth "lows." The levers 268 for the four printing mechanisms of the stock in question are indicated in partial section. In cooperative relation with the legs 269 of each lever 268 are fingers 223 and the vane 1712. Fingers 223 individual to the tapes other than the "running" are identical in construction with the similar fingers described in connection with Figure 3. However the leg 269 of the lever 268 individual to the "running" tape is adapted to cooperate with vane 1712 carried by a collar 224.

On the shaft 129 below the fingers named are shown other arrangements of fingers. The vane and finger comprising the upper two of the remaining finger arrangements are adapted to cooperate with printing units of a stock having a "running" and a "high-low" tape. The last two shown on the shaft are fingers for two stocks having "running" tapes only. The spiral arrangement distinguishes the several stocks.

In the coupling 101 connecting the two portions of the shaft 129, an elongated pin 1713 permits the shaft to be lifted axially in its journals without disturbing the coupling connection.

Near the upper end of shaft 129 is the flanged collar 1714. To cooperate with flanges 1715 are the armatures 1716, 1717 and 1718 of the three range magnets 1719, 1722 and 1723. Mounted on the framework are the three armature front stops 1724, 1725 and 1726, which are located at variant distances from their several armatures.

The operation of printing is as follows: When no magnet 1719, 1722 or 1723 is energized the incoming quotation will be printed only on the "running" tape, since leg 269 thereof will engage vane 1712, but legs 269 of the other printing mechanisms are not able at this time to engage their related fingers 223 due to the vertical normal position of shaft 129. Should magnet 1723 be energized, the armature 1718 will act upon flange 1715 to lift the shaft 129 upward an amount limited by the stop 1726, at which position pin 223 of the "close-open" tape will register opposite its leg 269 and the vane 1712 will remain in operative relation with its leg, so that the printing mechanisms of both the "close-open" tape and the "running" tape will operate to print the incoming quotation upon both these tapes simultaneously. The fingers 223 of the "high" and "low" tapes will be ineffective upon their related printing mechanisms. Energization of either 1722 or 1719 will act similarly to allow the quotation to be printed upon corresponding tape and also upon the "running" tape but not upon the "close-open" tape. It is desirable to print all quotations on the "running" tape, hence the arrangement herein disclosed.

The electrical signal-control system is as follows:

Four pairs of points 968 (Figure 28) are adapted to be closed by "figure" codes set upon bars 828. These respond to codes for the "range" such as, "close," "open," "high," and "low." These points 968 control the shifting of the shaft 129 (Figure 54) vertically.

The "high" points 968 connect battery through relay 1733 to earth. The "low" points 968 connect battery through relay 1734 to earth. The "open" or the "close" points 968 will either connect battery through relay 1736 to earth. A locking circuit for the three relays extends over the common wire 1738 through cam-switch 1739 to battery. Switch 1739 is opened briefly by cam 1740 on sequence shaft 774 just before shaft 774 stops at zero angle or normal "figures" position. Each magnet 1719, 1722, and 1723 is controlled by an associated relay over an obvious circuit.

In operation, assuming that the "high" tape is to be printed upon, the code for "high" is received and is set upon the "figure" bars 828 (Figure 28) thus operating points 968 which operate relay 1733 (Figure 54) which in turn operates magnet 1722 to lift shaft 129 to the height required. Relay 1733 locks and holds shaft 129 in selected position until cam-switch 1739 unlocks the relay, which will occur when sequence shaft 774 rotates in the operation of recording and translating the next stock-name index of "letter" codes.

*Second method.*—Figure 55 shows the equipment for the operation of range-tapes in the quotation board shown in Figure 49.

The points 968 and relays 1733, 1734, 1736 are as shown in Figure 54 and operate in the same manner. Magnet 1493—*f* (Figure 53) prints the "running" tape of a stock whose code may be "F" and magnet 1493—*g* prints the "running" tape of a stock whose code may be "G." Stock "F" is provided with a "high" tape whose printing magnet is 1493—*fh* and also with a "low" tape whose printing magnet is 1493—*fl*. Stock "G" is provided with a single range-tape for "high" and "low" whose printing magnet is 1493—*ghl*.

In operation, when points 968 charge the "high" relay 1733, the relay locks through wire 1741 and switch 1591, and by its points connects magnet 1493—*fh* in parallel with magnet 1493—*f*, also magnet 1493—*ghl* in parallel with magnet 1493—*g*. The circuits are from wire 1596 connected to switch point 1482, through magnet 1493—*f*, its wire 1906, individual locked relay 1605, wire 1741, switch 1591 to positive; for magnet 1493—*fh* from wire 1596, winding of magnet 1493—*fh*, wire 1742, closed points of relay 1733, wire 1606—*f*, individual locked relay 1605 for stock "F," wire 1741, switch 1591 to positive. Thus when switch 1482 closes by the selection of a "figures" pin 148, a ground will be made for both printing magnets 1493—*f* and 1493—*fh* to thus print on both tapes of stock "F." The circuits of relays 1733, 1734 and 1736 are broken by switch 1591 when the selected printing magnet 1493—*f* or 1493—*g* is released. Thus a pair of magnets is operated by the printing pulse from contacts 1482.

When points 968 charge the "low" relay 1734, it locks and by its points connects magnet 1493—fl in parallel with magnet 1493—f, also magnet 1493—ghl in parallel with magnet 1493—g. The circuits are from common wire 1596 through magnet 1493—fl, wire 1744, points of relay 1734 and wires 1606—f and 1606 to the locked relay 1605 and to positive by switch 1591; also from common wire 1596 through magnet 1493—ghl, wire 1743, points of relay 1734 and wires 1606—g and 1606 to the relay 1605 of stock "G."

When relay 1733 is operated, all "high" magnets as 1493—fh and all "high-low" magnets as 1493—ghl are connected, each in parallel with its "running" magnet. When points 1482 operate to effect printing, only one "running" magnet is operated and only the associated range-magnet is operated. The same is true of relay 1733 for "high" and "high-low" magnets and the same is true of relay 1736 for "open-close" magnets. Relays 1733, 1734 and 1736 have contacts sufficient to that end.

Selection of 1st, 2nd, or 3rd preferred and common stocks

"Range" codes or codes of "range" nature, are used to control this selection. Frequently stocks of one corporation are quoted in various classes, as first, second or third preferred, and common stocks. These classes may be grouped on the quotation board for easy reference. By using a pin 223 instead of vane 1712 duplicate printing is avoided.

By using a combination of these two methods, the various classes of stock may have their own range tapes in any desired combination.

Multiple channel operation

When a constantly rotating typewheel is used, it is possible to operate the board with a plurality of sending channels. Any number of printing hammers can be operated simultaneously when magnetic printing is used. It is only necessary to control the hammers independently. The system of the constantly rotating typewheel is capable of channeling with a small increase of apparatus.

In the operation of dial boards, it has been found desirable to use two channels. A special transmitting station is adapted to transmit on two channels, the messages being alternated between the two, one group of stocks, say, those having symbols beginning with letters from A to K being sent on channel #1; and the remaining stocks having symbols beginning with letters from L to Z being sent on channel #2. Separate circuits may be provided for the different channels or they may be operated on the same circuit by any of a number of methods of multiplexing.

It is desirable to operate the printing board of this invention from the signals transmitted over circuits, which are already operating for dial boards. Figures 58 and 59 show a two channel printing board system for operation from the signals used to operate dial boards. For details of a typical dial board and of a system, of this type, attention is directed to a co-pending application 510,536, filed January 22, 1931, by H. L. Krum.

The quotation messages received from the central office, for the operation of the system of Figures 58, 59, may each consist of a group of thirty-two impulses transmitted as a start-stop code, each message comprising a start pulse, fifteen impulses for the stock selection, two impulses adapted to control the stock selecting apparatus for choosing the first, second or third preferred and common stocks, a group of four impulses for range selection, two groups of four impulses each for the selection of the "tens" and "units" integers of the price, and a group of three impulses for the "fractions" selection, concluding with a stop-pulse line condition of indefinite duration. If it is necessary to send the "hundreds" integer of a price this integer is transmitted in the "tens" position in the code and controls in a special manner the "hundreds" dial.

These codes of thirty-two effective impulses each may operate the printing quotation board of this invention.

Referring to Figure 58, the polar receiving relay 1782 impresses positive or negative signals on the solid ring 1783 of the large distributor 1784. Ring 1783 is bridged by means of the brushes 1786 with the segmented ring 1787, which comprises a start segment and thirty-two code segments. The start segment is connected through starting magnet 1792, to negative source.

Arm 1794 is adapted to be rotated from the motor shaft 1795 and gears 1796 by means of felt-disc friction clutch 1798.

In addition to the two rings just referred to, a second solid ring 1799 and a segmented ring 1802 are provided, bridged by the brushes 1803.

The first fifteen segments of the distributor 1784 are connected by means of wires 1805 to fifteen individual polar storing relays 1806. The tongues 1808 of said relays are connected over wires 1804 and 1809 to the points of the slow-to-pick-up relay 1814.

The points of armatures 1808 are connected to the operating windings of the relays 1816 of the stock-selector 1820. Relays 1816 have each a locking circuit extending over common wire 1818 to points of relay 1814. Relays 1816, fifteen in number, have points 1822 arranged as points 1676 in Figure 56. The selected wires 1823 connect severally to the windings of the relays 1824. Each relay 1824 has a locking circuit extending over a common wire 1829 or 1834.

Output wires 1823 of the stock selector 1820 and therefore the relays 1824 are divided into two groups corresponding to the two channels. The locking circuits of relays 1824 of the first channel (A-to-K) extend over common wire 1829 to points of slow-to-pick-up relay 1893, and the locking circuits of relays 1824 of the second channel (L-to-Z) extend over common wire 1834 to points of relay 1893'.

Relays 1824 of the first channel (A-to-K) have each a pair of operating points connected through individual wires 1827 and associated printing magnets 1493 to common wire 1837 and wire 1839 to points 1482 on first-channel selector 143' like 143 of Figure 49. Relays 1824 of the second channel (L-to-Z) have each a pair of operating points connected through individual wires 1828 and associated printing magnets 1493 to common wire 1838 and wire 1842 to points 1482 on second-channel selector 143". Each channel is provided with relays 1587', 1587" and 1588', 1588" whose functions are similar to the functions of relays 1587 and 1588 of Fig. 53.

The two segments 16 and 17 on the distributor are reserved for connection to additional relays in the stock selector 1820 to cause additional selections for the first, second, and third preferred and common stocks. The four segments 18 to 21 are reserved for "range" selection according to the system chosen, as in Fig. 55 or otherwise.

Segments 22 to 32 are connected over wires 1852 to eleven polar storing relays 1853. Tongues of relays 1853 are connected to common wire 1804 and thence to 1809. Points of relays 1853 are connected individually to twenty-two tongues of big relay 1854 whose remaining tongue 1855 is connected through wire 1856 to segment 1857.

Twenty-two upper or "normal" points of relay 1854 are connected over wires 1858 to the windings of eleven polar storage-relays 1859 of the first channel, A-to-K. Twenty-two lower or "operated" points of relay 1854 are connected over wires 1860 to similar storage relays 1859' of the second channel, L-to-Z. Middle points of windings of all relays 1859 are connected to positive source. The points of storage relays 1859 are connected over wires 1861 through points of sequence relays 1862, 1863, 1864 and over wires 1865 to price selector magnets 151, which thus may be set in selective codes by control of storing relays 1859. Magnet 362 is controlled over wire 1866 directly by points of sequence relay 1864, which operates for fractions or equivalent codes only. Remaining terminals of selecting magnets 151, 362 are connected to points of relay 1587' as in Figure 53.

The typewheel shaft 127 of but one section is shown. The shaft has a number of typewheels 1504 as in Fig. 49 and is power-driven continuously as in Figure 49 but unlike Figure 49 it has two selectors 143', 143" positioned beside the shaft 127 and geared to the shaft to rotate in synchronism and in phase, producing the equivalent of two selectors directly upon shaft 127, one above the other.

In addition to the large distributor 1784 there are two secondary distributors 1872 for channel #1 and the other 1873 for channel #2. Each of these is provided with a start magnet 1874 and 1875 and a distributor arm driven through their individual friction clutches and gears. The distributors 1872 and 1873 are adapted to be rotated at one-half the speed of the distributor 1784, so that if line-distributor 1784 is operating at the speed corresponding to the rate of line transmission, the channel-distributors 1872 and 1873 may each take the time of two revolutions of the line-distributor for the performance of their operation, and hence, control their associated printing mechanism at a slower speed than if only one channel were used with the same rate of line transmission.

The start magnet 1874 of the first channel is connected over the wire 1876 to the upper contact of the tongue 1855 of relay 1854. The lower contact of tongue 1855 is connected over wire 1877 to the magnet 1875 of the second channel.

Brushes 1878 are adapted to bridge solid ring 1879 to segmented ring 1880 composed of the three equal segments which are connected through three conductors 1882, 1883, 1884 to sequence relays 1862, 1863, 1864.

Brushes 1885 are adapted to bridge solid ring 1886 to segmented ring 1887. Condenser 1888 is connected from positive source to ring 1886. Three segments in ring 1887 are connected to negative source to charge condenser 1888 and three short segments in ring 1887 are connected to wire 1889 for discharging condenser 1888 through winding of relay 1587.

Middle segment 1890 of segmented ring 1880 has the further function of operating relay 1854, the circuit being over wires 1883 and 1891. This circuit is not duplicated in the second-channel distributor 1873.

The third segment 1892 has the further function of operating relay 1893, the circuit being over wires 1884 and 1894. The points of relay 1893 shunt the points of relay 1588' to prevent premature unlocking of the operated stock relay 1824.

*Operation.*—Normally, the apparatus is as shown in the figures, with all distributors stopped. Messages (quotation) are sent upon the two channels alternately, always beginning with first channel after a stop.

Normally, polar receiving relay 1782 connects negative source to ring 1783, thence through brushes 1786, start segment and start magnet 1792, to negative source. Magnet 1792 is not energized and its armature restrains the distributor 1784 from rotation. Upon receiving a start pulse, relay 1782 operates and the circuit is formed from positive source through start segment to negative source. Magnet 1792 draws its armature from brush arm 1794 and rotation begins.

Following the start impulse, fifteen pulses for stock selection are received, relays 1806 are operated in a code combination, circuits are prepared for relays 1816 through points 1808 and wire 1809 to be completed by relay 1814. Subsequently, two pulses for preferred and common indications and the four impulses for "range" selection are received, and are distributed to segments 16 to 21, ineffectively in the figures. Then eleven pulses for the price are distributed to segments 22 to 32 and operate eleven relays 1853 in combinations.

Simultaneously with the reception of the last signal pulse, brushes 1803 engage segment 1857, and a circuit is completed from negative source over ring 1799, brushes 1803, segment 1857, and relay 1814. Relay 1814 operates to charge those stock, selecting relays 1816 which were selectively prepared by points 1808 of relays 1806. On release, relay 1814 closes wire 1818 before opening wire 1809, thus locking the operated relays 1816. By this operation a new stock selection is set up in the fan circuit of the stock selector, and a selected stock relay 1824 in channel #1 is operated. The operated relay 1824 then locks through wire 1829, and points of relays 1893 and 1588' in parallel. Points of relay 1824 connect positive source through the printing magnet 1493 individual to that relay and thence over common wire 1837 to open points 1482 of selector 143'. Of the items mentioned, distributor 1784, relays 1806, 1853, 1814, 1816 and selector 1820, also relay 1854, pertain to both channels. Operated relay 1824, relays 1893, 1588', selected magnet 1493, wire 1837 and selector 143' pertain to the first channel solely.

Operation of relay 1814 also has passed a brief current over wire 1809, points of eleven price relays 1853, eleven tongues and upper or normal points of relay 1854 and eleven relays 1859 of first channel, thus transferring the recorded code combination from the primary storing relays 1853 to the first-channel storing relays 1859.

Simultaneously with relay 1814, starting-magnet 1874 of first channel is operated over brushes 1803, segment 1857, wire 1856, tongue 1855, and wire 1876. Magnet 1874 operates its armature and distributor 1872 (first channel) starts.

Normally, distributor 1872 (first channel) closes a circuit through ring 1879, brushes 1878, normal segment of ring 1880, wire 1882 and sequence relay 1862. Relay 1862 is normally charged and the code set upon the top four price relays 1859 is at once transferred through points of charged relay 1862 to one terminal of selecting magnets 151, the remaining terminals extending over a common wire to open points of relay 1587'.

Normally, condenser 1888 is held charged by connection through brushes 1885 and normal segment of ring 1887. Immediately after brush 1885 starts, a discharge circuit for condenser 1888 is formed over brushes 1885 and wire 1889 to charge relay 1587' which locks through points of relay 1588'.

Lower points of relay 1587' close the operating circuit for those of magnets 151 which have been prepared through sequence relay 1862 and code-storage relays 1859. Magnets 151 operate and their code disks in selector 143' drop a pin 148 (Figure 50) which operates to close points 1482.

Points 1482 operate that printing magnet 1493 of first channel which has been prepared by its relay 1824 but cannot operate any similar magnet of second channel, because second-channel printing magnets 1493 are connected to wire 1838, not to wire 1837. Points 1482 also operate relay 1588' briefly, thus unlocking relay 1587' but not unlocking relay 1824 which is held locked by points of relay 1893.

Distributor 1784 has started immediately upon its second revolution, for a second-channel message. When general distributor 1784 has made ⅔ revolution and channel distributor 1872 has made ⅓ revolution, brushes 1878 pass to segment 1890 and close circuits to operate sequence relay 1863, and big relay 1854. Relay 1862 releases and disconnects magnets 151 from the top four relays 1859. Relay 1863 connects magnets 151 to fifth to eighth relays 1859. Relay 1854 connects twenty-two points of general storage relays 1853 to twenty-two windings of eleven second-channel storage relays 1859'.

At ⅓ revolution of distributor 1872, condenser 1888 is held charged by connection through brushes 1885 and ring 1887 to negative source. Immediately after brushes 1878 engage segment 1890 and operate relay 1863, brushes 1885 close again the discharge circuit for condenser 1886 to operate relay 1587' which again locks through points of relay 1588' and again closes circuits for magnets 151 which again operate a pin 148 to effect printing again by the same magnet 1493 whose selection or preparation has been held by relay 1824 held locked by relay 1893.

At the end of the second revolution of general distributor 1784, with first-channel distributor at one-half revolution and with relay 1854 charged, brushes 1803 close circuits for relay 1814 and for starting magnet 1875 of distributor 1873 of second channel, the latter circuit being over wire 1856, tongue 1855 and its front point, and wire 1877. Relay 1814 opens wire 1818 and unlocks all general relays 1816 but does not unlock the operated first-channel relay 1824 which is held locked by relay 1893 of first channel. Relay 1814 closes wire 1809 to transfer the setting of relays 1806 to relays 1816 and of relays 1853 through operated points of relay 1854 to relays 1859 of second channel. Relay 1814 locks relays 1816 by closing wire 1818 before opening wire 1809.

Since the code now set upon relays 1816 was received as a second-channel code it must be the code of a second-channel or L-to-Z stock and the selected relay 1824 therefore will be a second channel relay 1824 which by the structural requirements of this invention will lock to wire 1834 of second channel and which will close a control wire 1828 through a second-channel printing magnet 1493 to common wire 1838 of second channel extending to points 1482 of second-channel selector 143''.

Distributor 1873 starts and serves second-channel apparatus in a manner identical with distributor 1872 and first-channel apparatus.

At two-thirds revolution of distributor 1872, brushes 1878 pass to segment 1892, releasing relays 1863, 1854 and closing a circuit to operate relays 1864, 1893 in parallel. Relay 1863 disconnects magnets 151 from the fifth to eighth relays 1859. Relay 1864 connects three magnets 151 to the last three relays 1859, also prepares magnet 362 for operation. Selected relay 1824 for first channel does not release because its locking circuit is still closed by tongue of relay 1588'.

At two-thirds revolution of distributor 1872, condenser 1888 is held charged by brushes 1885 and ring 1887 to negative source. Immediately, brushes 1885 close again the discharge circuit for condenser 1888 to operate relay 1587' which locks and closes circuits for magnets 151, 362 which again operate a pin 148 to effect printing. This exhausts the codes for a first channel message stored upon relays 1859 and completes the printing of the first channel message. When points 1482 close to operate relay 1588' the release of the first channel relay 1824 is effected because relay 1893 is in operated condition. First-channel distributor 1872 now stops. Condenser 1888 is charged and relay 1862 is operated in readiness for the next first-channel message. Meanwhile distributor 1873 has been operating to transfer the second channel message.

Had the general distributor 1784 started upon the succeeding first-channel message immediately after transferring the second-channel message, it now would be ready to transfer that message and the first-channel equipment now is ready to receive it.

The difference in speed of two-to-one between the distributor 1784 and distributors 1872, 1873 permits simultaneous operation of the two code-disc selectors and their associated printing mechanisms, so that two tapes are printed upon concurrently. Any one figure may be printed simultaneously on two tapes, one of each channel.

*Page bulletin board*

Page-printing devices of large size have been proposed for display service, as in windows. Their chief disadvantage has been that existing forms are slow in operation. The application of the principles of this invention, with modifications to produce the equivalent of page control, and with the addition of letter characters, results in a high speed board capable of being built with a flat front and adapted to this use. By a desirable arrangement of parts, no operating member obscures any part of the record.

The bulletin board of the present invention is self-contained, that is to say, the signaling line may be brought directly to the board unit and the transmitted signals act directly upon a selecting device which is an integral part of the board mechanism to operate said board unit. No external selecting or control devices are required.

A front view of the bulletin board is shown in Figure 63. The board comprises a cabinet 1942 enclosing the complete operating mechanism. The cabinet is provided with an open frame 1943 in the sight of which move horizontally the tapes 1944 upon which is printed the message. Ten such tapes are shown. As many tapes as are desired may be used without much change in the principles of the operating mechanism.

The selecting device is essentially the same as that illustrated and described in a copending application #348,612 filed March 20, 1929, by S. Morton et al. and further shown herein under the heading "Stock and price selector," Figure 28.

In Figure 65, like parts are indicated by the like numerals as in Figure 28 and other figures.

*Selecting mechanism.*—The received signals actuate a cam drum selecting device to set in permuted combinations the selector levers 744, and a transfer mechanism is then operated to transfer the settings of levers 744 to a series of selector bars. In Figure 65 there are six T-levers 751 to control a code-disc selecting device.

The gear 731 on the shaft 724 is in mesh with the pinion 1945 on the shaft of the driving motor, not shown. A second shaft 1946 parallel to the shaft 724 is provided at one end with a gear 1947 adapted to rotate the shaft through the medium of the friction clutch 1948. Gear 1947 is in mesh with the pinion 1945 and is rotated thereby.

Overload clutch 1948 is provided to safeguard against damage to the various mechanisms operated by shaft 1946 in case some part of the mechanism jams. Otherwise the shaft 1946 is normally constantly rotating and serves to drive various parts of the mechanism continuously.

Surrounding shaft 1946 is the code disc selector 1949 operated by the T-levers 751. Selector 1949 is similar to selectors 143 and 222 (Figure 3), but has a greater number of pins 148, one for each of the characters on the typewheel, which comprises a complete alphabet, a full set of numerals and any other desired characters.

Selector 1949 is provided with six code discs 147, operated by T-levers 751. Discs 147 are provided with further slots 1954 in engagement with rounded heads 1955 of the selector bars 1953. Hence T-levers 751 operate discs 147 and bars 1953 at the same time. Bars 1953 are shown in the figure in the spacing position.

A six-unit signaling system effects a total of sixty-four code conditions. Assuming twenty-six alphabet characters, ten numeral characters and perhaps ten miscellaneous characters on each typewheel, a total of forty-six characters for selection by pins 148, there remain eighteen unused codes, which may be made use of in function performance by the bar-selector of bars 1953.

Forty-six pins 148 are provided. Should a combination be received which is not one of the forty-six corresponding to the pins 148 the code discs 147 will be operated in accordance therewith but no pin will be selected. The selector bars 1953 will also be operated in that selective combination and may effect a function.

Bars 1953 are suitably guided in the framework, and are provided with individual retractile springs 1957. Each bar is provided with a lug 1958 adapted to move into latching engagement with common latch 1959 pivoted at 1962, a spring 1963 serving to maintain said engagement. Bars 1953 are latched in their selected position to allow time for the various functions after which the latch 1959 is operated to release.

On the forward end of the shaft 1946 is the gear 1964 in mesh with a gear 1965 keyed to the vertical typewheel shaft 1966 journalled in the framework. Shaft 1966 rotates constantly and the principles of printing from a constantly rotating typewheel are used in this embodiment of the invention. A plurality of typewheels 1967, corresponding to the tapes of Figure 63, are spaced upon the shaft 1966 and have corresponding characters in vertical alignment.

Platens 1968 are operated for printing by the toggle joint type of mechanism illustrated in Figures 15 and 16. Fingers 1969 are provided, in spiral arrangement so that only one platen may be operated at a time the selection of the platen being controlled by the angular position of the tape selecting shaft 1972. The finger 1969 shown in the figure is the one individual to the bottom tape of the board.

Printing cams 1973 are constructed with four apexes instead of one to reduce the speed of printing shaft 1977. Stop disc 1976 is provided with four teeth to give shaft 1977 four stop positions. Shaft 1977 is adapted to be rotated by friction clutch 1978 and the gears 1979 driven from shaft 1984 which in turn is driven from shaft 1966 by gears 1982.

Carried upon the shaft 1946 is the assembly of Figure 9, including the rocker 197. A sleeve member 1992 is provided upon the shaft 1946. Flange 1993 of the sleeve will operate the trip lever 1994 when operated to the left by rocker 197 when an operated pin 148 is engaged. Lever 1994 is pivoted at 1995 on the framework, and is provided with two arms, one engaging flange 1993, and the other 1991 engaging one of the teeth of the stop disc 1976.

Engagement of an operated pin 148 operates the sleeve 1992 to the left briefly. Lever 1994 is thereby rocked briefly to disengage the arm 1991 from stop-disc 1976 permitting the shaft 1977 to rotate one-quarter turn by which time the arm 1991 engages the next tooth and stops the shaft.

Summarizing the printing action, the shaft 1946 and typewheels 1967 are constantly rotated in phase and synchronism by reason of the gears 1964 and 1965 so that for every engagement of the rocker 197 with a selected pin 148 a typewheel character is nearly in the printing position. Almost simultaneously the printing shaft 1977 is tripped for rotation and the printing mechanism operates to print the selected character. All of the actions just described operate substantially concurrently, the various parts being so designed for this purpose. There is, however, a small time delay between the engagement of the rocker 197 with the selected pin and the contact of the platen with the ribbon for the impression. To compensate therefor the typewheels are displaced a small angle of lag, so that at the time of engagement of finger and pin 148 the corresponding character has not reached the printing position.

The ribbon 1996 is arranged for movement past the platens exactly as shown in Figure 49 and described in connection therewith, and will not be discussed again.

The six bars 1953 serve to initiate various functions.

At convenient points along the bars 1953 are provided selecting rods such as 1997 pivoted to the framework as at 1998. Rollers 1999 upon the rods serve to reduce friction. Tension springs 2002 serve to maintain rods 1997 in contact with bars 1953. To the other end of rods 1997 are pivoted the interference spacers 2003, consisting essentially of an inverted L-shaped member permitted to have clockwise rotation about its pivot but prevented from opposite rotation by means of a lug 2004 of the rods 1997.

Arranged to coact with any of the spacers 2003 is the bail blade 2005 normally free to operate under the lug 2006 of the spacer 2003 but to engage therewith when the spacer is lowered by an operated rod 1997. Both conditions are illustrated in Figure 66 which shows the spacer 2003 in dotted outline for the selected position.

Bail 2005 has two arms 2007 pivoted to the framework at 2008, only one being shown. Pivoted to the arm 2007 is the operating link 2009, which is articulated through bellcrank 2012 and link 2014 to a cam follower lever 2015. Lever 2015 is pivoted upon the framework at 2016 and carries rollers 2017 in operative relationship with the cam periphery of transfer cam 2018. A spring 2019 maintains the roller 2017 against its cam.

When a setting of bars 1953 has been made for the selection of a function, a rod 1997 moves into the aligned notches. Then cam 2018 operates lever 2015 to operate bail 2005. Bail 2005 engages lug 2006 of the selected spacer 2003 to operate it for the performance of the function.

*Tape selecting function.*—A tape selecting shaft 1972 is provided similar to shaft 129 of Figure 3. The fingers 1969 may be positioned by code control, or automatically, to print on the tapes in succession.

Shaft 1972 is rotated, by power from shaft 1984 through gears 2024, shaft 2026 and friction clutch 2023.

On shaft 1972 are escapement wheel 2027 having one tooth for each tape; also escapement wheel 2038 of one tooth. Pawl 2032 and pawl 2033 on common pivot 2029 act normally as an integral pallet for wheel 2027. Spring 2035 and stop-lug 2036 on member 2032 preserve the normal relationship of the two pawls.

In operative relation with extension 2034 of pawl 2032 is one end of lever 2037 pivoted to the framework, the other end being in operative relation with its individual spacer 2030 similar to spacer 2003 as in Figure 66.

To select any tape. the shaft 1972 may be stepped tooth-by-tooth, the code to select spacer 2030 being sent once or repeatedly. The code will shift spacer 2030 then rock bail 2005 to operate spacer 2030, lever 2037 and pallet 2032, 2033 to step wheel 2027 and shaft 1972 to make effective the next pin 1969.

*Selection of first tape.*—At the beginning of service, it is desirable to start printing on the first tape.

Pivoted to the frame is pawl 2042 which when operated will energize the single tooth of escapement wheel 2038. Pawl 2042 has lug 2044 engaging pawl 2033 so that pawls 2042 and 2033 may be operated together as a pallet. Pawl 2042 is operated by pivoted lever 2046, the upper end of which engages arm 2045 on pawl 2042 and the lower end of which engages an individual spacer 2003. Spring 2047 holds pawl 2042 normally in retracted position.

In operation a code is received to operate lever 2046 in a manner similar to the operation of lever 2037. This operates pawls 2042 and 2033 as a pallet. Pawl 2033 releases shaft 1972 which rotates until the single tooth of wheel 2038 engages pawl 2042. The shaft 1972 then is in position for printing upon the first or top tape.

*Tape spacing function.*—The tapes are taken from supply rolls over suitable idler discs 2052 on the typewheel shaft, then between the typewheel and the ink ribbon, over the front of the board and between a feed roller 2053 and pressure roller 2054. The several rollers 2053 are provided with integral toothed wheels 2056 and are driven by individual friction clutch 2057. Shaft 2055 is driven continuously by shaft 724 and gears 2058.

In engagement with wheels 2056 are stop-pawls 2062 pivoted to the framework and held by springs 2064. Each pawl is provided with an arm 2065 and a pin 2066. Link 2068, pivotally connected to the printing arm 2069, has a slot 2067 surrounding pin 2066. There is such a spacing mechanism individual to each tape.

In operation, link 2068 is operated to the right by lever 2069 and just before the stroke of arm 2069 is completed the end of slot 2067 engages pin 2066 to rock pawl 2062 out of engagement with wheel 2056, the motion of pawl 2062 being so brief that the next tooth of wheel is engaged, the tape being moved meanwhile through one letter-space distance. The slot 2067 delays spacing until the printing stroke is well under way.

*Line measuring device.*—A horizontal counting shaft 2072, is journalled in the framework, driven by constantly rotating shaft 2026 through gear 2074 and friction clutch 2075.

On escapement wheel 2076 having as many teeth as there are letters spaces displayed in a tape, is fixed upon shaft 2072 and in operative relation therewith are pawls 2077 and 2092 operable together as a pallet. Also on shaft 2072 is single tooth escapement 2078 similar to 2038, and in operative relation is the pawl 2079. A lug on pawl 2079 engages a lug on pawl 2092 so that they may be operated as a pallet.

Cam 2088 on printing shaft 1977 operates its follower-lever 2085 once for each printing operation.

Arm 2082 of powl 2077 is articulated to follower 2085 through link 2083 and arm 2084.

At each printing operation cam 2088 operates the follower 2085 to actuate the escapement pawl 2077 to permit the shaft 2072 to rotate one tooth of wheel 2076. The angular position of shaft 2072 always is a measure of the number of character spaces printed on the tape. Setting of shaft 2072 in initial position is accomplished in a way similar to the setting of shaft 1972 to initial position. A code is received which will cause the pawl 2079 to be operated by the bail 2005. This removes pawl 2092 from wheel 2076 and introduces arm 2079 into the path of escapement 2078 and shaft 2072 is permitted to rotate to zero-stop position.

*Automatic line feed.*—It is desirable to begin automatically the printing on the next successive tape upon nearing the limit of any tape. One tape should be nearly full, and a word-space signal should be then received. In this way, the tape of printing may be changed only between words.

The mechanism is as follows: On shaft 2072 is cam 2093 whose follower-roller 2094 operates lever 2095, pivoted to the framework at 2096. The rightward arm of lever 2095 terminates in a hook which engages spacer 2098. The upward arm of lever 2095 is adapted to operate lever 2037 by engagement with lug 2090 on lever 2037. A spring 2099 normally urges roller 2094 into operative engagement with cam 2093, operates arm 2095 and spring 2091 serves to hold spacer 2098 against the hook of lever 2095. Rod 2097 is similar to rod 1997 but has spacer 2098 instead of a spacer such as 2003. Rod 2097 is selected in response to the code for space-between-words.

In operation, every code for space-between-words will lower rod 2097 and spacer 2098, but lever 2095 will not operate because it is held by roller 2094 against cam 2093. When printing near the limit for any tape, the counting shaft 2072 will approach its angle of "tapeful" and then will bring the low part of cam 2093 under roller 2094, releasing the arm 2095 to move against spacer 2098. The next code for space-between words will lower rod 2097 and spacer 2098, permitting spring 2099 to move lever 2095 to press lug 2090 and thus to operate lever 2037.

Lever 2037 by its upper end operates the joint pallet 2032, 2033 and steps shaft 1972 one step to transfer the printing action to the next tape. Lever 2037 by its lower end presses finger 2080 on pawl 2079 and operates the joint pallet 2079, 2092 and permits counting shaft 2072 to advance to zero angle for beginning again. Normaling of shaft 2072 occurs at every adjustment of shaft 1972, from any cause.

*Board clearing function.*—It is sometimes desirable to clear the board entirely of printed matter. A signal code may be sent for this purpose.

In operative relation with all arms 2065 of feed pawls 2062 is the bail 2102 pivoted to the framework as at 2103. Lever 2105, pivoted to the framework at 2106, cooperates with spacer 2110 and is connected to bail 2102 by link 2104. Spring 2115 holds the parts in normal position.

Pawl 2107 pivoted at 2108 is adapted to latch link 2104 by engaging tooth 2109 when link 2104 is operated. Cam 2113 on counting shaft 2072 is adapted to operate pawl 2107 to release link 2104. Spring 2114 holds pawl 2107 against cam 2113.

In operation, a code is received which operates lever 2105 and bail 2102. Pawl 2107 latches link 2104 and bail 2102 and lever 2105. Bail 2102 lifts all pawls 2062 individual to all tapes out of engagement with their respective wheels 2056. Shaft 2055 through all clutches 2057 drives all tapes across the face of the board. The extent of tape movement is limited by the counting shaft 2072.

Lever 2105 also now holds finger 2080 and pallet 2079, 2092 in operated position, which permits the counting device to turn. By the turning of shaft 2072, cam 2113 operates pawl 2107 to release the parts 2104, 2102 and 2105, permitting all the pawls 2062 to engage their wheels 2056 and so stop the tapes. The cam 2113 is such that it actuates pawl 2107 as the counting shaft 2072 reaches zero angle. Thus a definite amount of tape is measured for clearing the board.

*Code bar unlatching.*—Bars 1953 on being operated are latched in their operated position by influence of a latching member 1959 and remain so for an interval sufficient to permit the appropriate function to occur. Upon the beginning of any function, bail 2116 which is pivoted at 2111 and which extends across all of the members such as 2079, 2105, 2037 and 2046, will be rocked by any one of those members. A slot in bail 2116 operates bellcrank 2117 pivoted at 2118, the other arm of said bellcrank being pivotally connected to an operating link 2119 which is in engagement at its upper end with latching member 1959. By rocking bail 2116 bellcrank 2117 is rocked to lift the link 2119 and hence to lift the latching member 1959 out of engagement with the projections 1958 upon the selecting bars 1953, and the springs 1957 will thereupon return bars 1953 to their initial position.

A similar unlatching movement is required after every printing operation since the combinations set up on the code discs 147 are also held by means of the connected bars 1953 when the latter are latched by means of the member 1959. Cam follower 2085 is provided with an arm 2122 to which is connected an L-shaped link 2123 one leg of which is adapted to lift the latching member 1959. Upon the completion of any printing operation the rocking of the member 2085, imparts a lifting movement to the link 2123 which may then disengage the latching member 1959 from engagement with the projections 1958 and so permit the bars 1953 to return to their initial position.

*Alternative form of driving arrangement for the bulletin board.*—The apparatus described in connection with Figure 65 is adapted to be entirely operated by a single motor. However, it may be advisable, due to the heavy rotating mass of the typewheels, to drive the typewheel shaft from a separate motor. By so doing the operation would be somewhat improved since the load imposed by this rotating mass would not need to be taken care of by the same motor which operates the selector mechanism.

*System for operating bulletin board.*—A proposed arrangement for the remote control of the bulletin board just described is shown in Figure 64. At the dispatching station is provided a standard perforating keyboard 2126 of a well-known type. The tape 2127 perforated thereby in accordance with the message is fed through a transmitter 2128 also of a well-known type and thence over the line 2129 to operate the polar electromagnet 2130 of the bulletin board. Said polarmagnet may be in series in the line as shown and the line continued at 2131 to some other board or a return path to ground may be provided.

System arrangements

All of the quotation boards of the present invention are adapted to be operated from existing ticker circuits, the signals over said circuits originating at the stock exchange or some convenient central office.

Various methods of operating the quotation boards have been described in detail and are collected in Figure 57 to show their operation from a common ticker circuit.

The central office transmitter is indicated at 2132 and line wires 2133 extend therefrom to various parts of the country or to the districts served by this office. Regular ticker service is maintained over these wires for the operation of existing tickers, three of which are shown at 2134.

If desired, the message, before being transmitted from the central office, may be edited, and signals for indicating "high," "low," "close," and "open" may be included for indicating the "high" and "low" on single tape stocks, or for choosing between the tapes of multiple-tape stocks as discussed in connection with Figures 54 and 55.

The arrangement indicated at A shows the local keyboard control described in connection with Figures 20 to 27 inclusive. This system is particularly suitable when the user does not wish to have an automatic remote control unit, but instead an operator and a keyboard. The cost of the latter combination is less than that of the automatic control, especially when service is desired on only a comparatively small number, say 150 stocks or fewer. With this arrangement the ticker tape passes before the operator who selects the quotations to be posted on his board and operates the keyboard in accordance therewith to post these quotations, all as previously described.

At B is indicated an arrangement using the stock and price selector for the control of the board, as described with reference to Figure 34. This is particularly applicable when service on a comparatively large number, say 150 to 500 stocks, is desired.

The arrangement at C is used when a number of smaller users are to be given service with automatic control at their offices. Accordingly a stock and price selector in combination with the reperforator and retransmitter of Figures 37 and 39 is used, and the modified retransmitted signals are sent over line wires such as 2135 to ticker selectors at the users' offices, it being understood that the stock and price selector is adapted to select any stock desired by any small user.

At D is shown an arrangement adapted for districts where systems have been installed for dial-type boards. These boards operate on special groups of signals, not in every particular like ticker signals, and operate on multiple channels. It is necessary to adapt the apparatus of the present invention for operation from these existing circuits as has been described in connection with Figures 58 and 59. Referring to Figure 57 the editing system is indicated at D for simplicity by a single editor, and the transmitting system by two keyboards, channel #1 and channel #2 respectively, with their operators. The transmitting distributor is shown connected for transmission of special signals over the line wires, such as 2135. From these signals, either a dial-type board may be operated, or a tape-printing board may be operated, or a combination tape-and-dial board, in which, for example, high and low prices may be recorded upon dials and running prices may be recorded upon tapes. The two-channel transmission with editing is shown more fully in co-pending application #510,536, filed January 22, 1931.

At E is shown an isolated ticker giving service independently of any quotation board.

At F is shown a bulletin board which may be alone, or may be associated with a station having other equipment.

If a bulletin is to be transmitted over the lines by station 2132 such bulletin will be preceded by a deleting signal and followed by an enabling signal, as previously described, to thus prevent printing on the quotation boards controlled by the re-perforator shown in Figure 37, and to prevent operation of quotation boards controlled by the stock and price selector of Figures 28 and 29. However the bulletin boards such as shown in Figures 63 and 65 will print all quotations on successive tapes and the apparatus of Figure 65 will operate as described. As previously explained, the deleting and enabling signals may be such as to select and print parenthesis marks on the tickers, or any other special signals may be used for this purpose.

Projecting board

Under certain circumstances it might be desirable either when using the quotation board or the bulletin board of this invention to enlarge the printed characters so that they may be readable at a distance greater than the maximum possible with characters of the hereinbefore assumed size, say greater than 1⅛" in height. In such a case enlargement of the typewheel characters to the greater desired size would involve an extremely large typewheel with the attendant increase in the proportionate size of the other parts of the board, an obviously undesirable recourse, since the practical demand for a special board of this type for displaying such large characters would be slight for any one size and the cost of manufacturing would then be excessive and prohibitive.

Accordingly there is included in this invention a method of projecting the standard size of printed character upon a screen to suitable magnified dimensions. Such an arrangement is shown in Figures 35 and 36, both of which are diagrammatic in form.

With reference to Figure 36, the parts of the tape printing board of Figure 3 are identified by the same reference numerals as before. Only minor structural variations from the previously described board are required, such as: providing a typewheel with reversed characters and adapted to print characters in inverted position; providing transparent tape instead of the former opaque tape; moving the tape supply and takeup to different locations and upon different mountings to prevent the projected image from being obscured thereby, as shown. In order that the image may be accommodated on the screen it is found necessary to arrange the tapes in groups, the number of tapes in each group being governed by the size of the lens economically usable, Figure 35, this also requiring some slight change in structure of the board; finally the entire board mechanism must be reversed back to front in order that the projected image may move across the screen from right to left as formerly despite the reversal thereof by the projector.

The optical arrangement is clear from the figures. A source of light, 2140, one individual to each lens, of any suitable type, is arranged in front of a spherical reflecting mirror 2141 and is adapted to project light rays through the condenser 2142 then through the printed image, and the projecting lens 2143. From this point the image is magnified and projected upon the rear of the translucent screen 2144, whence it is visible to the observer.

The groups of tapes 2145 may be arranged in any suitable manner to produce any size of board, the most practicable arrangement for any given set of conditions being an individual problem.

It is evident that the present invention is capable of application in many ways to the general art of telegraphy. The specific disclosures herein are intended to be exemplary. Various changes and modifications may be made within the spirit and scope of the invention as defined by the listed objects and claims, and by the several divisions of the specification.

What is claimed and desired to be secured by United States Letters Patent is:

1. In a telegraph selecting device, a series of groups of elements to be selected, a single magnet, and means to bring different ones of said groups under the mechanical control of said magnet.

2. In a telegraph system, a telegraph circuit; means to transmit over said circuit a series of code signals; a single magnet adapted to receive all of said code-signals; a plurality of permutation devices, each of said devices corresponding to a code-signal; and means to bring different ones of said permutation devices under the active control of said magnet to be set in a permutation corresponding to a code-signal, the connection between the magnet and the permutation device being entirely mechanical.

3. In a telegraph system, a plurality of printing recorders; a receiving device comprising a part adapted to select one of said recorders, and a part adapted to control the selected recorder; and a single magnet adapted to control both of said parts by an entirely mechanical connection between the armature of said magnet and both parts of said device.

4. In a telegraph selecting system, a series of devices each adapted to be operated, an electrical circuit, and means to transmit over said circuit device-selecting signals and device-operating signals and having a plurality of component signal-elements and having one element which differentiates between selecting signals and controlling signals.

5. In a remote control system, an electrical circuit; means to transmit over said circuit a series of signals; and a series of devices to be selected and operated, certain of said signals acting to select the desired device and other signals acting to control the operation of the selected device, each signal having a characteristic which determines whether it is a selecting signal or a controlling signal.

6. In a recorder, means for supporting a plurality of record receiving strips; a series of characters to be recorded; a single permutation device to select the character to be recorded; and a magnet individual to each strip to determine the strip upon which the record is to be made.

7. In a printing device, a series of type-printing recorders; a series of types, one series in each of said recorders; a first permutation device to select a recorder to be operated; and a second permutation device to select in all said recorders a type to be recorded.

8. In a recorder, a recording device; apparatus affording a plurality of locations in which a record may be made; a permutation device to select a location in said apparatus, a further permutation device to determine the record to be made; and means to control said recording device to make the determined record in the selected location.

9. In a remote control system, a series of devices adapted to be operated; two rotatable shafts extending through all of said devices; means to select a device according to the stopping position of one of said shafts; and means to variably control the operation of the selected device according to the stopping position of the other shaft.

10. In a printing telegraph system, a telegraph circuit; means to transmit over said circuit a succession of start-stop permutation code-signals; a printing mechanism adapted to print in a succession of parallel lines; means controlled by certain of said signals to select a line in which the printing is to be made; and means controlled by other of said signals to determine the printing to be made on the selected line.

11. In a telegraph system, two telegraph circuits; means to transmit over the first of said circuits at a given rate a series of messages each comprising groups of signals; means controlled by said signals to select certain of said messages; and means to retransmit the selected messages over the second of said circuits at a slower rate of transmission than the rate of transmission over the first circuit.

12. In a telegraph system, a telegraph circuit; means to transmit over said circuit a series of permutation code signals, each signal composed of a start impulse, a plurality of code impulses, and a stop impulse; a permutation selecting device having a number of permutation members greater than the number of code impulses in a complete signal; and means to bring different ones of said members under the control of said signals to control all the permutation members according to a plurality of said signals.

13. In a telegraph system, a cyclically operable transmitting distributor adapted to distribute a fixed number of unit-code impulse signals during each cycle of operation; a series of contacts of number greater than the number of impulses of said fixed number of signals for which said distributor is adapted; a perforated tape adapted to control the setting of all of said contacts; and means effective during successive cycles to associate the distributor with successive groups of said contacts.

14. In a telegraph system, two telegraph circuits; means to transmit over the first of said circuits a series of signals at one rate of speed; means to select certain groups of consecutive signals; and means to transmit over the second of said circuits corresponding signals at a rate slower than the rate of transmission over the first of said circuits.

15. In a telegraph receiver, a first recorder adapted to record letter signals only; a second recorder adapted to record figure signals only; and a distributor adapted to distribute letter signals to said first recorder and figure signals to said second recorder, said distributor controlled by a characteristic of the signals themselves, each of said recorders operating independently of the number of successive letter signals or figure signals.

16. In a telegraph receiver, a permutation device adapted to receive and store a plurality of unit-signals; means for distributing to said device a variable number of unit-signals, said device being operable independently of the number of unit-signals received and stored.

17. In a telegraph system, means to transmit a series of groups of impulses; a plurality of groups of receiving elements; means to cause succeeding groups of impulses to control different groups of elements; and means to cause any number of consecutive groups of impulses to control the same group of elements.

18. In a telegraph system, a plurality of recorders; a telegraph receiving device comprising a first part adapted to select a recorder by a single cycle of operation, and a second part adapted to control the selected recorder by a single cycle of operation; and means to maintain a selected recorder under control of said second part for any desired number of cycles of said second part.

19. In a quotation system for the transmission of messages imparting information relating to a plurality of items, a series of recorders; an electrical circuit; means to transmit over said circuit item-signals and information-signals; means to select under the control of the item-signals a recorder corresponding to the item; means to operate the selected recorder under control of the information-signals; and means to maintain said recorder in selected condition while any number of information-signals are being transmitted and recorded.

20. In a telegraph system, a main circuit; a branch circuit; means to transmit message-signals over said main circuit; automatic means to receive signals and transmit over said branch circuit other signals repeating the same messages; said last means being effective or not under control of the signals over said main circuit.

21. In a telegraph system, a telegraph circuit; means to transmit over said circuit a series of signals; two kinds of recording devices adapted to be operated by said signals; and means to render one of said devices unresponsive to indicated signals.

22. In a telegraph system, a telegraph circuit; means to transmit over said circuit a series of signals; two kinds of recording devices adapted to be operated by said signals; and means to transmit over said circuit deleting and enabling signals adapted to render one of said devices unresponsive to signals transmitted in the interval between the transmission of said deleting signals and said enabling signals.

23. In a type printer, a typewheel, a shaft for carrying said typewheel, means to rotate said shaft, a brake to bring said shaft to a preliminary stop including a frictionally operative arresting means, and means operative thereafter including positive engagement members for effecting a precise stop.

24. In a telegraph printer, a constantly rotating typewheel; a member rotating in constant phase relationship with said typewheel; means to mechanically operate said member at different angular positions in its travel; and means under control of said member to record a character from said typewheel corresponding to the angular position at which said member is operated.

25. In a recording system for a series of numeral types including digits and fractions; automatic means to space a record receiving material a single space after a digit has been recorded and a double space after a fraction has been recorded.

26. In a telegraph system, means to transmit a series of signals to be converted into corresponding markings upon a record material, means to record on said material characters according to said signals; and means also controlled by the same signals to variably control the feeding of the material.

27. In a telegraph printer, a plurality of typewheels for marking upon a plurality of record receiving strips, each strip being in record receiving relation to a corresponding typewheel; means to position all said typewheels in selected position to print the same character on all strips; means to select one group of strips; and selective means to print on one strip or on a plurality of strips of the selected group.

28. In a printing telegraph system, a receiving distributor adapted to receive in a single cycle a plurality of signals corresponding to a plurality of characters forming a part of the same item of information, means to store all of said signals; and means to record said characters consecutively on record receiving material.

29. In a printing telegraph, a plurality of type members each adapted to make an independent record; a single means to move all said type members to a selected printing position simultaneously; two selecting devices independently controlled; and means to make records from said type members under the control of each of said selecting devices.

30. In a printer, a cylindrical printing member having a plurality of type-faces circumferentially disposed; means to record from a specific typeface solely; and alternative means to record from the same specific typeface jointly with a circumferentially adjacent typeface during one printing operation.

31. In a telegraph printer, a continuously rotating typewheel; a detector moving in fixed relation with the motion of said typewheel; means to operate said detector; and means to record under control of said detector a type of said typewheel corresponding to the position at which said detector is operated.

32. In a recorder, a typewheel for printing on a continuous record receiving material; and a roll adapted to control the path of the material and mounted on the same axis as the typewheel.

33. In a telegraph printer, a typewheel for printing on a continuous record-receiving material; means for printing from said typewheel on said material and for automatically advancing said material; a spring-biased roller upon which said material is wound after printing; and automatic means operated by said printing means for maintaining a desired spring bias on said roller including a mechanism responsive to a predetermined excess in the tension of said material for disabling said bias maintaining means.

34. In a telegraph transmitter, a plurality of groups of contacts; a common distributor; a sequence device operable to connect said groups of contacts in sequence with said distributor; a perforated tape controlling the settings of said contacts; a guide frame for said tape; and means operable by opening movement of said guide frame for returning said sequence device to normal position.

35. In a recorder, means to select one of a plurality of record strips; means to select and record characters on the selected strip; a single magnet variably energized according to the strip to be selected and according to the character to be recorded; and connections entirely mechanical between the magnet, the strip selecting means, and the character selecting means.

36. In a selecting device, a series of permutation members; a series of elements to be selected according to the setting of said permutation members, said elements being composed of a plurality of variably arranged detector parts, the number of said detector parts being equal to the number of said permutation members, the arrangement of said detector parts determining the permutation in response to which each said element will be permitted to operate.

37. In a keyboard, a series of groups of keys; a series of permutation bars, each group of keys corresponding to different ones of said permutation bars; and means to set the entire group of bars in a desired permutation by the operation of a key in each group.

38. In a code translator, a permutation device comprising a series of groups of permutation elements, each group corresponding to the telegraphic code of an alphabetical character; a second permutation device comprising only a sufficient number of permutation elements to produce in the second device a number of permutations equal to approximately the number of permutations of the first device which are to be usefully employed; and means to translate settings of the first device into corresponding settings of the second device.

39. In a stock quotation system, a tape printer; means to transmit a series of printer-operating signals; a quotation board adapted to record in locations assigned to individual items signals applying to the individual items only; and means to control the quotation board from said printer-operating signals.

40. In a telegraph system, a telegraph circuit; means to transmit over said circuit a series of signals representing letters and numerals in any sequence; a recorder adapted to record all of said signals; a plurality of other recorders; and means to select ones among said other recorders and to record on a selected one of said other recorders, according to the character of the signals.

41. In a telegraph system, a telegraph circuit; means to transmit over said circuit signals representing both letters and numerals; a recorder controlled by said signals and adapted to record all of said signals; and a second recorder also controlled by said signals but adapted to record only signals for numerals.

42. In a stock quotation system, a telegraph circuit; means to transmit over said circuit a series of signals representing stock designations and prices; a type-printing recorder controlled by said signals and adapted to record said signals in continuous sequence; and a second type-printing recorder controlled by said signals and adapted to record signals in classified form.

43. In a quotation system, a first telegraph circuit; a recorder; means to transmit over said circuit a series of signals adapted to operate said recorder; a second telegraph circuit; a classified recorder; means under the control of the signals on the first circuit to transmit on the second circuit signals adapted to control the classified recorder.

44. In a news distributing system for a plurality of items, a transmitting station; distributing stations; subscriber stations; a circuit connecting said transmitting station to said distributing stations; further circuits connecting each of said subscriber stations to one of said distributing stations; means to transmit from said transmitting station to all of said distributing stations signals representing information concerning said items; means located at said distributing stations to receive and store signals corresponding to specific ones of said items only; and automatic means under the control of the stored signals to transmit on said further circuits corresponding signals.

45. In a recording system, a permutation device; a plurality of recorders adapted to be controlled by said permutation device; and a typewheel located adjacent to said recorders and also adapted to be controlled by said permutation device.

46. In a telegraph system for transmitting information relating to a series of designations, means to transmit electrical signals corresponding to each designation, and other electrical signals corresponding to information relating to various ones of said designations; means to store said signals; electrical connections between the transmitting means and the storage means; a group of movable recorders corresponding to each designation; a printing mechanism; means controlled by the stored signals to set substantially simultaneously a plurality of said recorders corresponding to a designation, and means also controlled by said stored signals to record in sequence a series of characters.

47. In a telegraph system, a series of devices to be selectively operated; a keyboard; a permutation device to select the device to be operated; a second permutation device to variably control the selected device; and electrical connection between the keyboard and both of the said permutation devices.

48. In a telegraph system, a code-controlled mechanism; an inward path for code-combinations of signals received by said mechanism; two outward paths for code-combinations of signals sent from said mechanism; a telegraph circuit; means to transmit letter-code-signals and figure-code-signals over said circuit to be received by said mechanism; said mechanism adapted to be controlled by each code and operating to send letter-code-signals solely over one of said outward paths and to send figure-code-signals solely over the other of said outward paths.

49. In an automatic printing machine, a continuously rotating typewheel, a signal controlled selector, a platen for bringing a continuous ribbon of material into printing engagement with said typewheel under control of said selector, and a means for selectively delaying the response of said platen to said selector for thereby effectuating a modified printing engagement.

50. In a printing apparatus a plurality of typewheels, a plurality of printing hammers individually associative with said typewheels, a single power shaft for actuating any of said hammers, and means under selective control for establishing operative connection between said shaft and any of said hammers.

51. In a printing apparatus, a plurality of printing hammers, a plurality of operating cams, each individual to one of said hammers, resilient connections between each of said cams and its hammer, and means for selectively operating any of said hammers by restricting the resiliency of its said connection.

52. In a printing apparatus, a continuously rotating typewheel, a printing hammer for bringing an intervening stock of material into printing relation with said typewheel, and an armature actuated upon the selective energization of its associated magnet to move said hammer toward its typewheel but within a short distance from its point of contact therewith permitting the momentum thus accumulated to propel it thereafter.

53. In a combination, a rotating typewheel having a plurality of printing characters peripherally disposed, a platen adapted to be brought into timed instantaneous printing engagement with said characters individually, and means for effecting said printing engagement duplicatively by varying the selective responsiveness of said platen.

54. In combination, a continuously rotating typewheel having a plurality of printing characters peripherally disposed, a movable platen adapted to be brought into printing engagement with said typewheel, means under control of certain electrical signals for bringing said platen and typewheel into instantaneous printing engagement during the registration of predetermined characters individually, and means responsive to certain other signals for delaying the response of said first mentioned means for thereby modifying the printing engagement.

55. In a telegraph printing apparatus, a plurality of printing ink ribbons, a common striker for effecting printing operations, means for normally maintaining one of said ribbons in printing relation with said striker, and means responsive to a special condition during a predetermined cyclic interval for shifting into printing relation another of said plurality of ribbons.

56. In a telegraphically controlled printing apparatus, a type impression printing mechanism, a pair of ink supplying elements, means for supporting said elements so as to dispose one of them in normal printing relation, and means under the control of said telegraph signals cyclically for shifting said elements so as to present the other of them in printing relation momentarily.

57. A rotatable type-head clutch mechanism comprising, a rotatable driving member, a typehead having a number of type characters arranged thereon and frictionally driven by said driving member, a stationary series of selectable stop members corresponding to said type characters, a stop arm independently movable on the axis of rotation of said driving member and engageable with an actuated one of said series of stop members, and a spring tending to maintain said stop arm in a position in advance of said type head in the direction of rotation.

58. In a telegraph printing apparatus for typing messages constituted of a predetermined number of signals, a typewheel positionable angularly in accordance with the characteristic of the signals of said messages, a plurality of inking elements alternatively associated with said typewheel for effecting variable color printing, and means initiated by an introductory signal element of each message for presenting said inking elements into cooperation with said typewheel in a predetermined manner during each message.

59. In a telegraph printing apparatus, a plurality of typewheels in axial alignment, each typewheel having a set of type characters, a plurality of ink elements presentable perpendicularly with respect to said axial alignment and shiftable transversely thereof so as to present alternative ones into registration with said alignment, signal controlled means responsive to messages comprised of a definite number of impulse intervals including a selector mechanism responsive to each signal and determinative of the angular position of said axial alignment, and a control shaft for shifting said ink elements predeterminedly during the printing interim of a message adapted to rotate one cycle during the reception of each of said messages.

60. In a telegraph system, transmitting apparatus for issuing start-stop code signals, a receiving apparatus initiated into operation at the beginning of each start-stop signal and arrested at the conclusion of each said signal, a type wheel, means for rotating said type wheel throughout at least a complete revolution within the period corresponding to each start-stop code signal, and means to make character impressions by contacting said type wheel with record receiving material under the control of said receiving apparatus, each character associated with a start-stop signal interval.

61. In a telegraph receiver, a constantly rotating type wheel, a platen, a signal controlled magnet, a series of permutation elements set in varying permutations according to signals received by said magnet, and means to make a single character recording from said type wheel in accordance with each permutational setting of said elements.

62. In a telegraph printing apparatus, a rack for supporting a plurality of record receiving strips, means for printing on each of said strips successively character by character, counting apparatus for responding to a predetermined number of characters printed on each strip, and means controlled by said counting apparatus to transfer the printing from one strip to another successively.

63. In a printing telegraph apparatus, means for supporting a plurality of printing ribbons in parallel alignment, a type carrying member associated with each ribbon, and means for rendering each type carrying member effective with respect to its associated ribbon in a definite sequence.

64. The combination set forth in claim 63 in which said rendering means is made effective only in response to a word space signal received within a predetermined final portion of a line of printing.

65. In a telegraph printing system, a primary rotatable shaft, means to transmit a code combination signal during a revolution of said shaft, a recording apparatus including an operating shaft rotatable constantly at a speed greater than the speed of rotation of said primary shaft, and means included in said recording device comprising a member rotating with said operating shaft to make a single character record coincident with each revolution of said primary shaft.

66. In a telegraph printing system, a constantly rotating type wheel, means to transmit during given periods telegraph signals representing characters carried by said type wheel, apparatus for effecting printing engagement of said type wheel under the control of said telegraph signals during an instant of revolution of said type wheel when its character corresponding to a signal is aligned in printing position, and means to prevent the second recording of the same character in the event of its passing the printing position a second time during a given signal period.

67. Signal receiving apparatus comprising a series of movable selector levers, an independently rotatable selector cam sleeve with a series of cams thereon and movable past said levers in substantial synchronism with received line impulses to operate said selector levers, means operated by said cam sleeve to initiate the rotation of a second cam sleeve, means operated by said second cam sleeve to initiate the rotation of a third cam sleeve, and means operated by said third cam sleeve to effect a printing operation and a paper feeding operation.

68. In a printing telegraph receiver, a plurality of selectors, means for selectively positioning said selectors in accordance with received code combinations of impulses comprising a first rotatable member, rotating in timed relation to received impulses, a series of code discs, means for operating said selectors to set said code discs comprising a second rotatable member rotating in timed relation to said first rotatable member, a type wheel selectively positioned under control of said code discs, a third rotatable member rotating in timed relation to said first and second rotatable members, and means operable by said third rotatable member for effecting printing and tape feeding operations.

69. Signal receiving apparatus comprising a series of movable selector levers, an independently rotatable selector cam sleeve with a cam thereon for operating each of said selector levers and movable into co-operation with said levers in substantial synchronism with received line impulses, a second cam sleeve, means operated by said cam sleeve to initiate the rotation of said second cam sleeve, a third cam sleeve, means operated by said second cam sleeve to initiate the rotation of said third cam sleeve, and means operated by said third cam sleeve to effect a printing operation and a character spacing operation.

70. Signal receiving apparatus comprising a set of movable selector levers, a set of cams corresponding in number to said selector levers and each operable upon an associated one thereof in synchronism with a corresponding set of received line impulses, a cam sleeve, means operated concurrently with said set of cams to initiate the rotation of said cam sleeve, character spacing and printing control mechanisms, a clutch through which power is communicated for operating said mechanisms, and means under the control of said cam sleeve for rendering such clutch effective whereby said character spacing and printing control mechanisms are operated to perform their respective functions.

71. In a printing telegraph receiver, a plurality of selectors, means for selectively positioning said selectors in accordance with received code combinations of impulses comprising a first rotatable member rotating in timed relation to received impulses, a series of code discs, means operating said selectors to set said code discs comprising a second rotatable member rotating in timed relation to said first rotatable member, a type wheel selectively positioned under control of said code discs, a third rotatable member rotating in timed relation to said first and second rotatable members, and means operable by said third rotatable member for effecting printing and character spacing operations.

72. In a printing telegraph receiver, a plurality of selectors, means responsive to code combinations of impulses for permutatively positioning said selectors comprising a first rotatable member released for rotation in timed relation with said received code impulses, a series of code members, means for transferring a setting from said selectors to said code members comprising a second rotatable member operative in timed relation to said first rotatable member, a type mechanism selectively positioned under supervision of said code discs, and a third rotatable member operative in timed relation to said first and second rotatable members for initiating printing and character spacing functions.

73. In a telegraph receiver selectively responsive to received permutation groups of signals and having a set of selectors selectively positioned in accordance with permutation groups of signals, a plurality of recording mechanisms in said receiver, means controlled by predetermined of said selectors for selecting a character in each of said recording mechanisms and means controlled by other of said selectors for selecting predetermined of said recording mechanisms to record the character selected by the predetermined of said selectors.

74. In a telegraph receiver selectively responsive to received permutation groups of signals, each of said groups comprising character and recorder unit selecting impulses, a plurality of recording units, means controlled by character selecting impulses for selecting a character in each of said recording units, means controlled by said recorder unit selecting impulses for selecting which of said recording units will record the characters selected by the accompanying character selecting impulses.

LOUIS M. POTTS.